United States Patent [19]
Yajima

[11] Patent Number: 5,966,127
[45] Date of Patent: Oct. 12, 1999

[54] GRAPH PROCESSING METHOD AND APPARATUS

[76] Inventor: Mantaro Yajima, 521, Teraya, Saijocho, Higashihiroshima-shi, Hiroshima-ken, Japan

[21] Appl. No.: 09/079,860

[22] Filed: May 15, 1998

[30] Foreign Application Priority Data

May 15, 1997 [JP] Japan .................................. 9-140922

[51] Int. Cl.[6] .................................. G06F 3/14; G06F 9/44
[52] U.S. Cl. .......................... 345/352; 710/103; 345/509
[58] Field of Search ................................ 395/95, 680, 98, 395/500, 701; 345/335, 441, 333, 342, 352, 114, 509; 707/102, 103, 506, 503, 100, 531; 293/139; 710/103, 37

[56] References Cited

U.S. PATENT DOCUMENTS 5,507,491  4/1996  Gatto et al. .............................. 273/139
5,517,604  5/1996  Yuura et al. ............................. 345/441

*Primary Examiner*—Daniel H. Pan
*Attorney, Agent, or Firm*—Wenderoth, Lind & Ponack, L.L.P.

[57] ABSTRACT

In accordance with the method of the present invention, a graph using an information processing apparatus is made. It includes: entering written signs in the form of characters, symbols, and/or graphicals in a document, the written signs serving as descriptors that specify a format of a graph represented by ordinary writings; recognizing unitary descriptors having a unitary meaning from the entered written signs and recognizing composite descriptors from a plurality of the unitary descriptors corresponding to a plurality of those written signs having an association with one another according to predetermined association rules; and producing graph definition data defining contents of the unitary descriptors and/or composite descriptors.

14 Claims, 55 Drawing Sheets

FIG.5

[DESCRIPTOR ELEMENTS / WRITTEN SIGNS] PART 1

| DESCRIPTOR GROUP | DESCRIPTOR ELEMENT | WRITTEN BY |
|---|---|---|
| COMMON | LINK | ——— |
| | DESIGNATE DECRIPTOR ELEMENT | ⬭ , ▚ |
| | DESIGNATE DOMAIN | ⌐ ⌐ , [ ] |
| | DATA ITEM | < > , ▨ |
| | DATA VALUE | ——— |
| | FIELD | ▭ , ▨ |
| | EXCLUDE | { } |
| | SORT | |
| | INCREASING | ↑ |
| | DECREASING | ↓ |
| | DESIGNATE OBJECT | ⌐ |
| | ⋮ | ⋮ |
| MANAGE DATA | EFFECTIVE FIGURES | NUMERIC FIGURES |
| | ROUNDING | ROUND UP |
| | | ROUND DOWN |
| | | ROUND OFF |
| | ⋮ | ⋮ |

FIG.6

[ DESCRIPTOR ELEMENTS / WRITTEN SIGNS ] PART 2

| DESCRIPTOR GROUP | DESCRIPTOR ELEMENT | WRITTEN BY |
|---|---|---|
| FORMAT DOCUMENT | CENTERING | C, CENTERING |
| | RIGHT JUSTIFICATION | R, RJ, JUSTIFY |
| | TAB | ∇ |
| | LEFT MARGIN | ] |
| | RIGHT MARGIN | [ |
| | FIX | △ |
| | CHARACTER SIZE | P |
| | ... | ... |
| EDIT DOCUMENT | INSERT | ∨ |
| | COPY | ↙ |
| | ... | ... |
| COMMAND/ PROCEDURE | SEND FACSIMILE | FAX, FACSIMILE |
| | ... | ... |

FIG.11

SALES IN TOKYO BY YEARS/ARTICLES

| YEAR | ARTICLE | SALES (M¥) | SALES IN HANSHIN | SALES RATIO TO HANSHIN |
|---|---|---|---|---|
| 93 | RADIO RECEIVER | 10.2 | 6.3 | |
| 93 | TELEVISION SET | 7.5 | 5.8 | |
| 93 | CAR NAVIGATION SYSTEM | 3.2 | 2.7 | |
| 94 | RADIO RECEIVER | 15.3 | 12.7 | |
| 94 | TELEVISION SET | 5.3 | 3.8 | |
| 94 | CAR NAVIGATION SYSTEM | 5.2 | 4.1 | |
| 95 | RATIO RECEIVER | 13.2 | 11.5 | |
| 95 | TELEVISION SET | 5.3 | 3.8 | |
| 95 | CAR NAVIGATION SYSTEM | 7.3 | 6.5 | |
| 96 | RADIO RECEIVER | 12.6 | 10.3 | |
| 96 | TELEVISION SET | 5.6 | 3.8 | |
| 96 | CAR NAVIGATION SYSTEM | 8.5 | 7.2 | |

FIG.13

SALES IN TOKYO BY YEARS/ARTICLES (BLUE) labels point to all table headers and cells.

| ⟨YEAR⟩ (BLUE) | ⟨ARTICLE⟩ (BLUE) | ⟨SALES⟩ (M¥) (BLUE) | SALES IN HANSHIN (BLUE) | SALES RATIO TO HANSHIN (BLUE) |
|---|---|---|---|---|
| 93 | RADIO RECEIVER | 10.2 | 6.3 | |
| 93 | TELEVISION SET | 7.5 | 5.8 | |
| 93 | CAR NAVIGATION SYSTEM | 3.2 | 2.7 | |
| 94 | RADIO RECEIVER | 15.3 | 12.7 | |
| 94 | TELEVISION SET | 5.3 | 3.8 | |
| 94 | CAR NAVIGATION SYSTEM | 5.2 | 4.1 | |
| 95 | RADIO RECEIVER | 13.2 | 11.5 | |
| 95 | TELEVISION SET | 5.3 | 3.8 | |
| 95 | CAR NAVIGATION SYSTEM | 7.3 | 6.5 | |
| 96 | RADIO RECEIVER | 12.6 | 10.3 | |
| 96 | TELEVISION SET | 5.6 | 3.8 | |
| 96 | CAR NAVIGATION SYSTEM | 8.5 | 7.2 | |

A, B, C (BLUE)

C = A/B (BLUE)

FIG.21 [CHARACTER STRING RECORD]

FIG.22 [GRAPHIC ELEMENT RECORD] (LINE)

FIG.28
[ ITEM DESCRIPTOR CHAIN ]
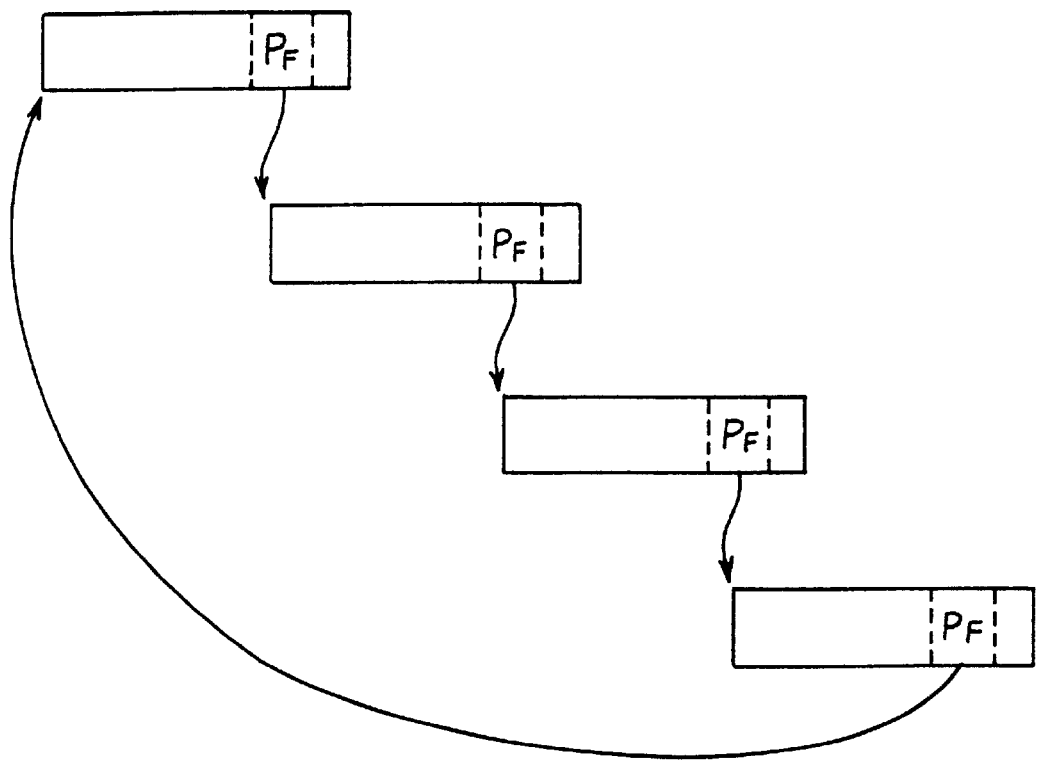
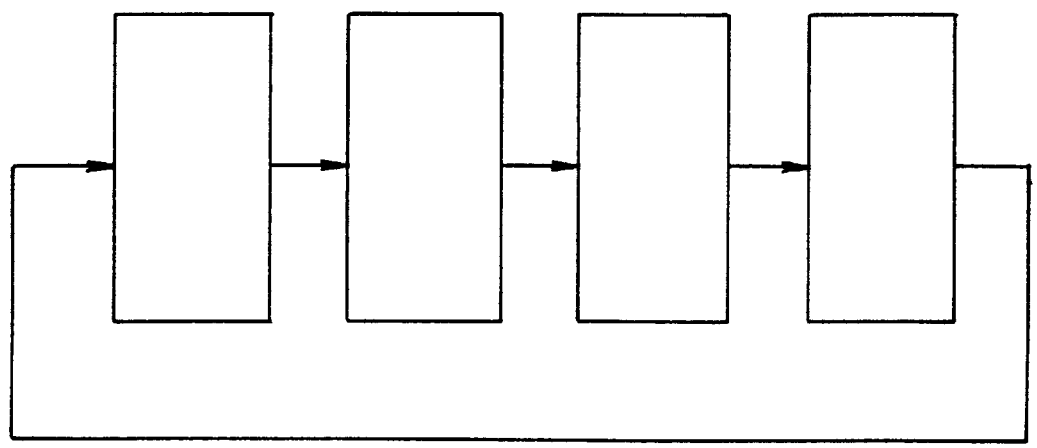

FIG.30
[ CELL DESCRIPTOR CHAIN IN FIELD ]
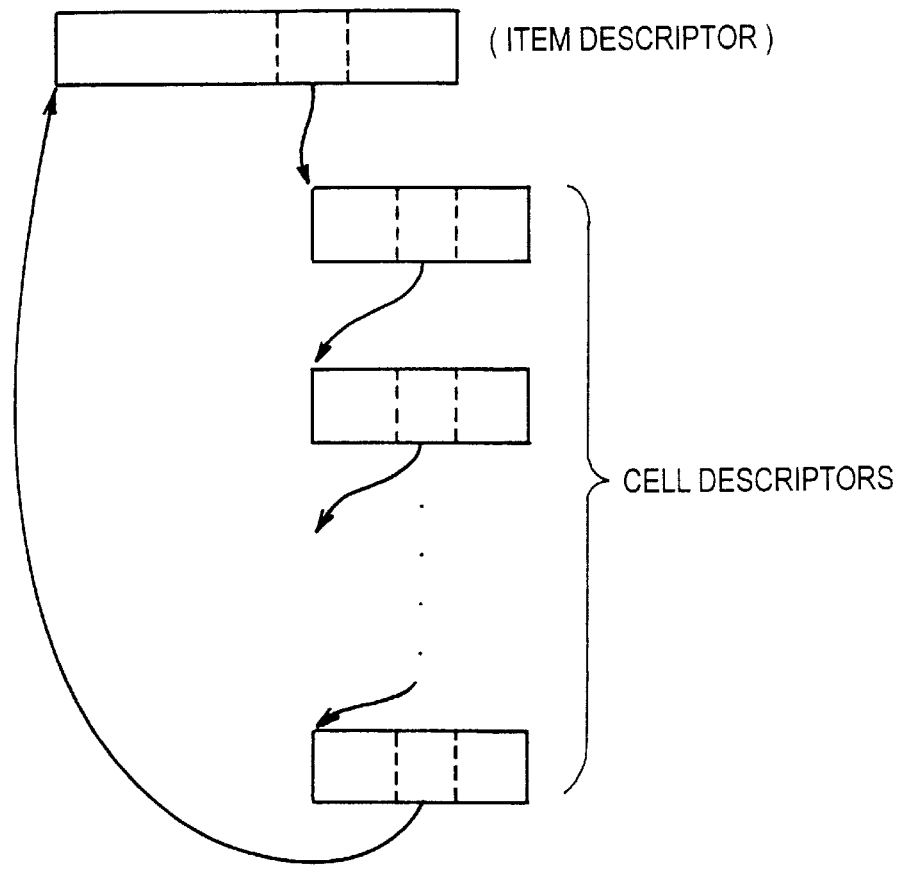
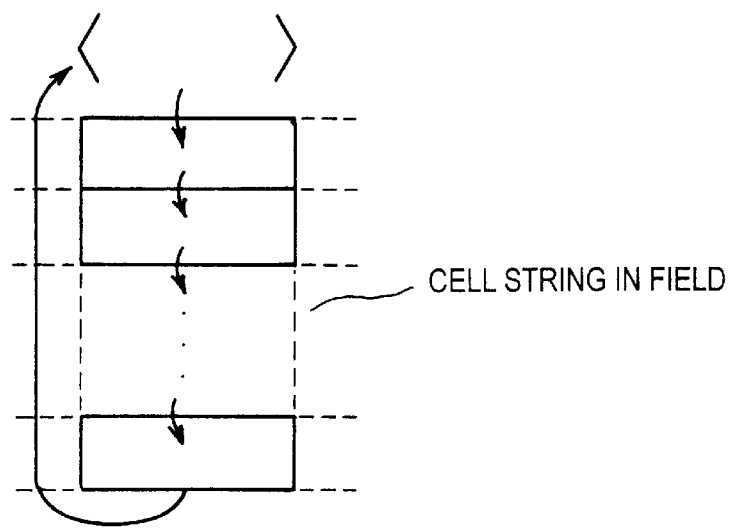

FIG.31
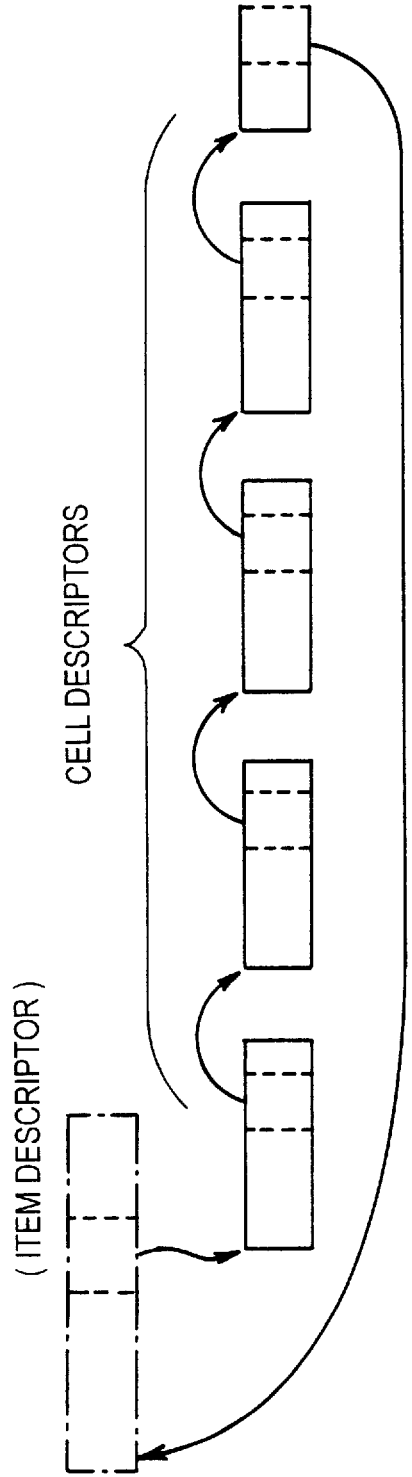
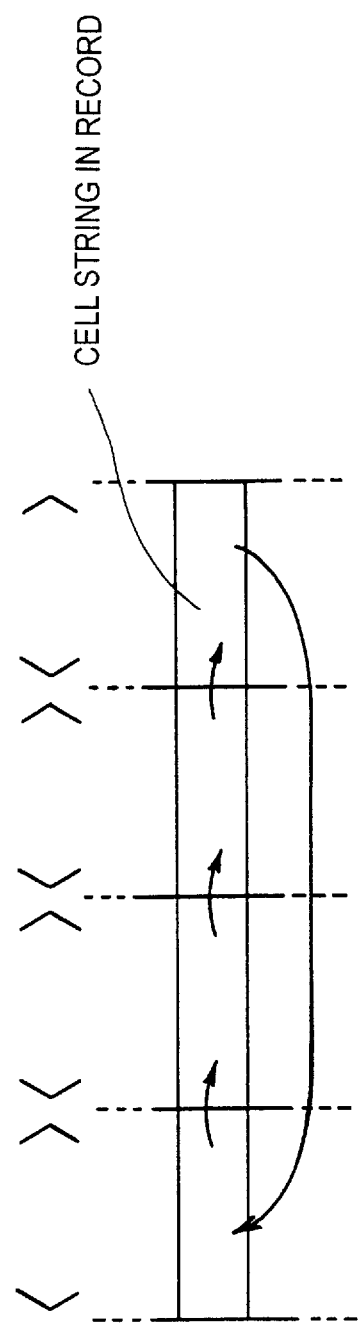

FIG.32 [ARITHMETIC DESCRIPTOR]

FIG.33

[ APPLICATION DICTIONARY ]

| ENTRY GROUP | ENTRIES |
|---|---|
| UNIT | km, m, cm, mm <br> M UNITS, N UNITS <br> M YENS, M¥, K YENS, K¥, YEN, ¥, ··· <br> M DOLLARS, M$, K DOLLARS, K$, <br> DOLLAR, $, ··· |
| ARITHMETIC | =, ×, +, ÷, ··· |
| SUM | Σ, SUM, TOTAL, GROSS, ··· |

FIG.34 [DICTIONARY ENTRY]

[ BAR NORM DESCRIPTOR ]

FIG.41 [NUMERICAL AXIS DESCRIPTOR]

FIG.43 [GRAPH MANAGEMENT DESCRIPTOR]

FIG.45 [DESCRIPTOR EXECUTING ORDER RULE BASE]

FIG.47
GRAPH MANAGEMENT DESCRIPTOR
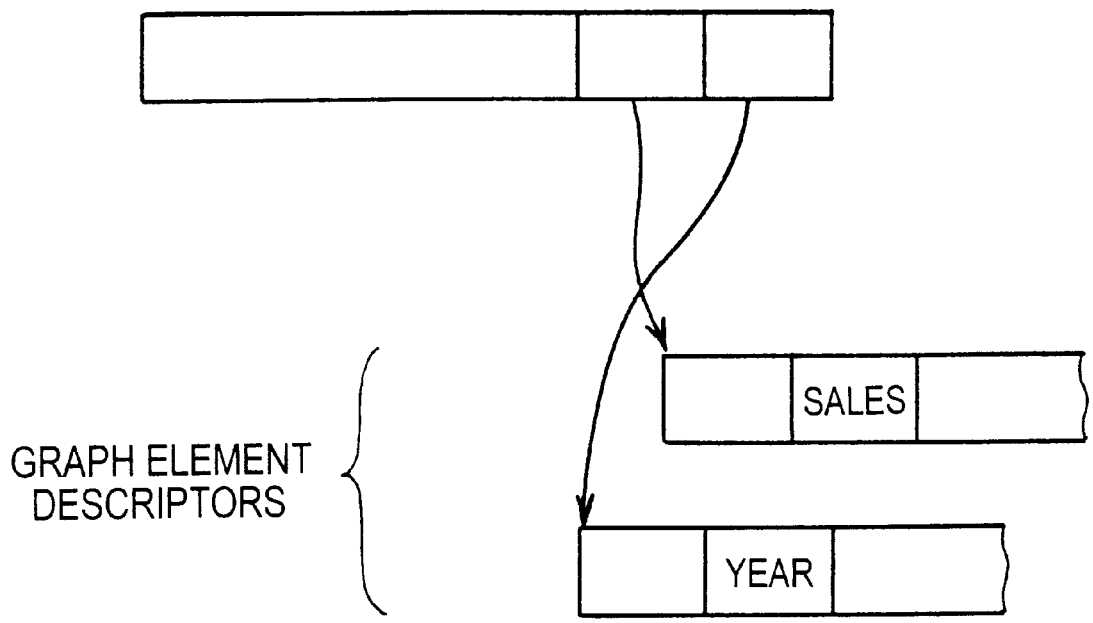
SOURCE DATA RECORD
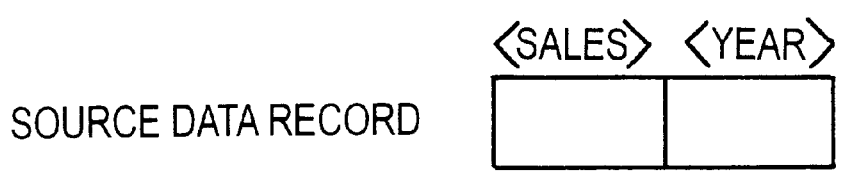
DATA POINT RECORD
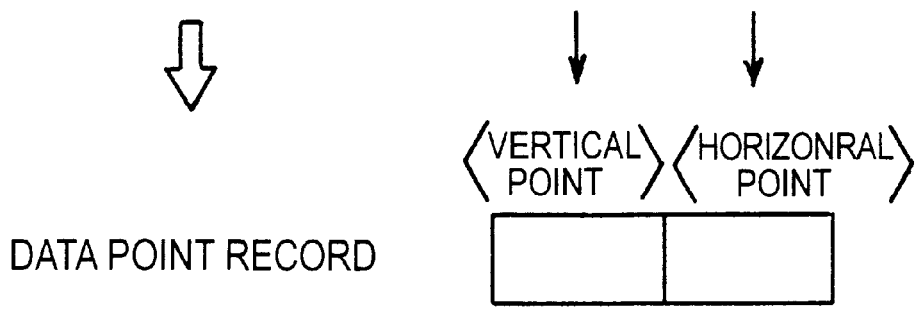

FIG.50
[ DATA POINT RECORD ]
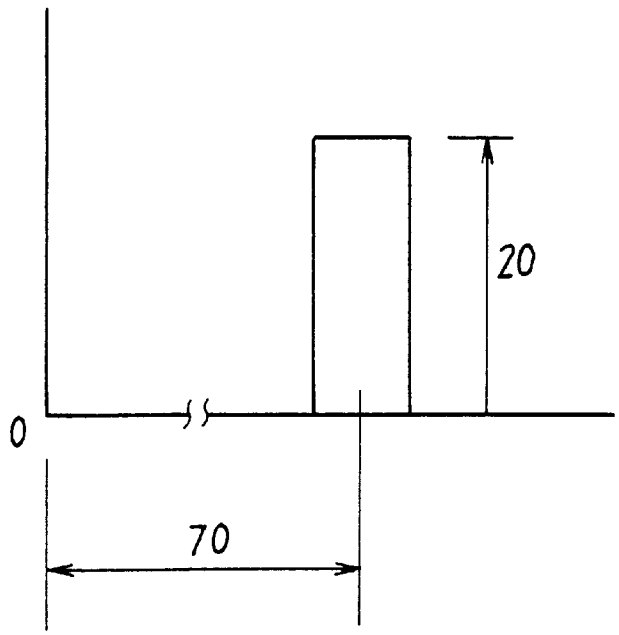
[ BAR NORM DESCRIPTOR ]
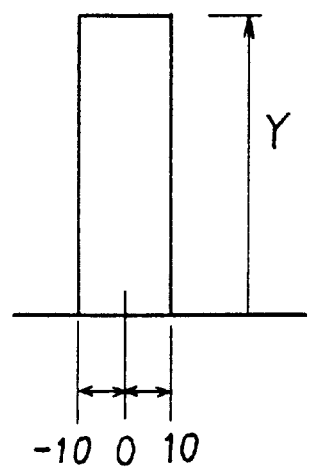
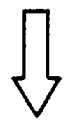
[ OBJECT BAR DESCRIPTOR ]
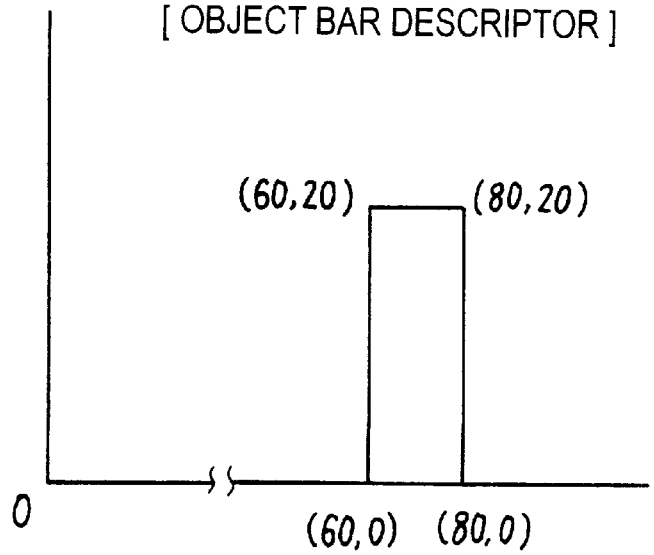

FIG.52

SALES IN TOKYO BY YEARS/ARTICLES

| YEAR | ARTICLE | SALES (M¥) | SALES IN HANSHIN | SALES RATIO TO HANSHIN |
|---|---|---|---|---|
| 93 | RADIO RECEIVER | 10.2 | 6.3 | 1.6 |
| 93 | TELEVISION SET | 7.5 | 5.8 | 1.3 |
| 93 | CAR NAVIGATION SYSTEM | 3.2 | 2.7 | 1.2 |
| 94 | RADIO RECEIVER | 15.3 | 12.7 | 1.2 |
| 94 | TELEVISION SET | 5.3 | 3.8 | 1.4 |
| 94 | CAR NAVIGATION SYSTEM | 5.2 | 4.1 | 1.3 |
| 95 | RATIO RECEIVER | 13.2 | 11.5 | 1.1 |
| 95 | TELEVISION SET | 5.3 | 3.8 | 1.4 |
| 95 | CAR NAVIGATION SYSTEM | 7.3 | 6.5 | 1.1 |
| 96 | RADIO RECEIVER | 12.6 | 10.3 | 1.2 |
| 96 | TELEVISION SET | 5.6 | 3.8 | 1.5 |
| 96 | CAR NAVIGATION SYSTEM | 8.5 | 7.2 | 1.2 |

FIG.57
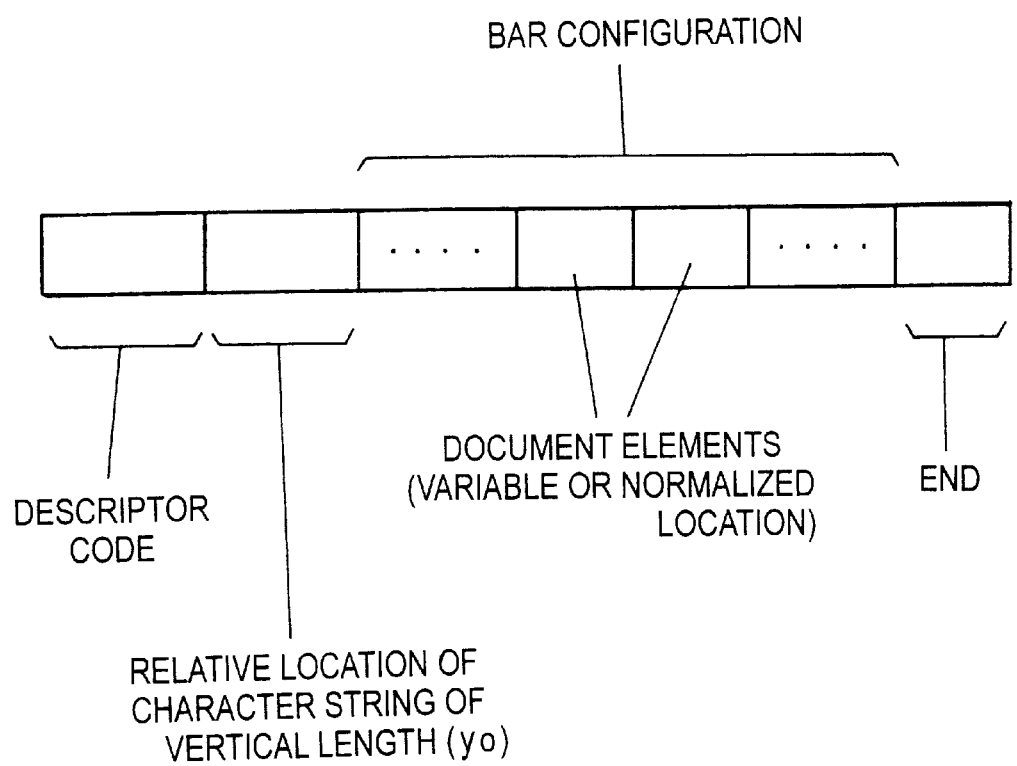
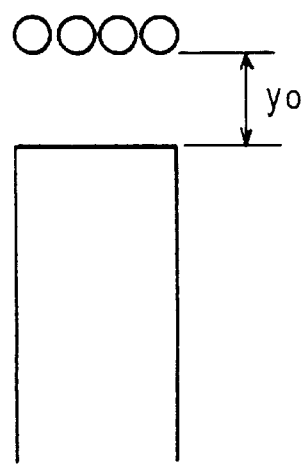

FIG. 59

SALES BY AREAS / ARTICLES IN '95

| (BLUE) ⟨AREA⟩ (BLUE) | (BLUE) ⟨ARTICLE⟩ (BLUE) | (BLUE) ⟨SALES⟩ (BLUE) | (BLUE) COMMENT |
|---|---|---|---|
| TOKYO | RADIO RECEIVER | 3.5 | (BLUE) |
| TOKYO | TELEVISION SET | 5.3 | |
| TOKYO | CAR NAVIGATION SYSTEM | 7.2 | |
| NAGOYA | RADIO RECEIVER | 2.8 | |
| NAGOYA | TELEVISION SET | 3.6 | |
| NAGOYA | CAR NAVIGATION SYSTEM | 5.7 | |
| HANSHIN | RADIO RECEIVER | 3.1 | |
| HANSHIN | TELEVISION SET | 4.3 | |
| HANSHIN | CAR NAVIGATION SYSTEM | 6.3 | (BLUE) |

(BLUE) (BLUE) (BLUE) (BLUE)

GRAPH PROCESSING METHOD AND APPARATUS

BACKGROUND OF THE INVENTION

The present invention relates to an information processing apparatus for making a graph.

Supported by powerful hardware resources, in particular, highly advanced semiconductor devices, a recent information processing apparatus (computer-based system) incorporates object-oriented architecture and software that reduce the burden of users. For example, the apparatus can present a desired graph that is selected by a user from graph forms preset in the system.

To this end, the system first presents, on a display screen, a data table from a tabular document memory. From the data table display screen, a user points to desired data items. Then, a menu screen of "make graph" (not shown) is called. From the menu screen, the user selects or enters a desired condition or value for respective graph formatting items (e.g., graph type, size). The system uses the selected condition of the graph formatting items to make an object graph of the data items selected from the data table screen and displays or prints it out.

Currently, graph forms having wide varieties are desired by users in their request for diversified and sophisticated document presentations. In view of the essential function of graphs, i.e., "visualize data", a graph may be represented in an infinite number of ways. It is highly desired to provide a graph making system which can present a desired graph having desired layout, form, size, color, patterns etc., selected from all possible graph representations. Another important feature of the desired graph making system is ease of use without the need for users to learn a number of manual instructions since graph making systems are used by general end users. It is, thus, desired to provide a graph making system which can efficiently present a desired graph with a simple operation procedure.

The prior art system can only make a graph within the limits of a predetermined graph form menu, thus limiting the freedom or options on the part of users. A recently proposed graph making system incorporates a graph correcting feature which corrects a graph after it has been made and output. The graph correcting feature is limited, however, in variation and requires a complicated procedure involving a number of manual operations.

Thus, it is not so helpful to general end users.

SUMMARY OF THE INVENTION

In view of the prior art problems, it is, therefore, an object of the invention to provide a method and apparatus for making a graph which uses improved object-oriented software and architecture, allows a user to write familiar characters, symbols, or graphicals in a document for graph definition, and makes a desired graph therefrom.

Another object of the invention is to provide a method and apparatus for making a graph which can efficiently make a desired graph from a simple writing operation by users without the need for users to learn a number of manual instructions.

In accordance with an aspect of the invention, there is provided a method for use in an information processing apparatus for making a graph, which comprises: entering written signs in the form of characters, symbols, and/or graphicals in a document, the written signs serving as descriptors that specify a format of a graph represented by ordinary writings; recognizing unitary descriptors having a unitary meaning from the entered written signs and recognizing composite descriptors from a plurality of the unitary descriptors corresponding to a plurality of those written signs having association with one another according to predetermined association rules; and producing graph definition data defining contents of the unitary descriptors and/or composite descriptors.

Another aspect of the invention provides a method for making a graph which comprises: entering written signs in the form of characters, symbols and/or graphicals in a document, the written signs serving as descriptors for data management and/or document formatting for graph definition; recognizing unitary descriptors having a unitary meaning from the entered written signs and recognizing composite descriptors from a plurality of the unitary descriptors corresponding to a plurality of those written signs having association with one another according to predetermined association rules, and producing graph definition data defining contents of the unitary descriptors and/or composite descriptors.

An aspect of the invention provides an apparatus for making a graph which comprises: entering means for entering written signs in the form of characters, symbols and/or graphicals in a sheet-carried or electronic document; first recognizing means for recognizing unitary descriptors having a unitary meaning from the written signs; second recognizing means for recognizing, from the recognized unitary descriptors, composite descriptors based on a plurality of the unitary descriptors corresponding to a plurality of those written signs having association with one another according to predetermined association rules; and producing means for producing graph definition data defining contents of the recognized unitary descriptors and/or composite descriptors.

BRIEF DESCRIPTION OF THE DRAWINGS

The above and other objects, features and advantages of the invention will become more apparent from the following description taken in conjunction with the drawings in which:

FIG. 5 shows a table of relation between descriptor elements and written signs in accordance with the embodiment;

FIG. 6 shows a table of relation between descriptor elements and written signs in accordance with the embodiment;

FIG. 11 shows a source, tabular document in which written signs for descriptors will be entered later in accordance with the embodiment;

FIG. 13 shows a source, tabular document sheet in which written signs for descriptors have been entered in accordance with the embodiment;

FIG. 28 shows a structure of an item descriptor chain in accordance with the embodiment;

FIG. 30 shows a structure of a cell descriptor chain in field in accordance with the embodiment;

FIG. 31 shows a structure of a cell descriptor chain in record in accordance with the embodiment;

FIG. 33 schematically shows an application dictionary in which term entries are illustrated in accordance with the embodiment;

FIG. 47 illustrates how graph source data records and data point records are made in accordance with the embodiment;

FIG. 50 illustrates how an object bar descriptor is made in accordance with the embodiment;

FIG. 52 illustrates an object, tabular document in accordance with the embodiment;

FIG. 57 shows a data format of a bar norm descriptor used in a two dimensional bar arrangement in accordance with the embodiment;

FIG. 59 illustrates a source, tabular document containing data used for two-dimensional bar arrangement in accordance with the embodiment.

DETAILED DESCRIPTION OF PREFERRED EMBODIMENTS

Figure 1:
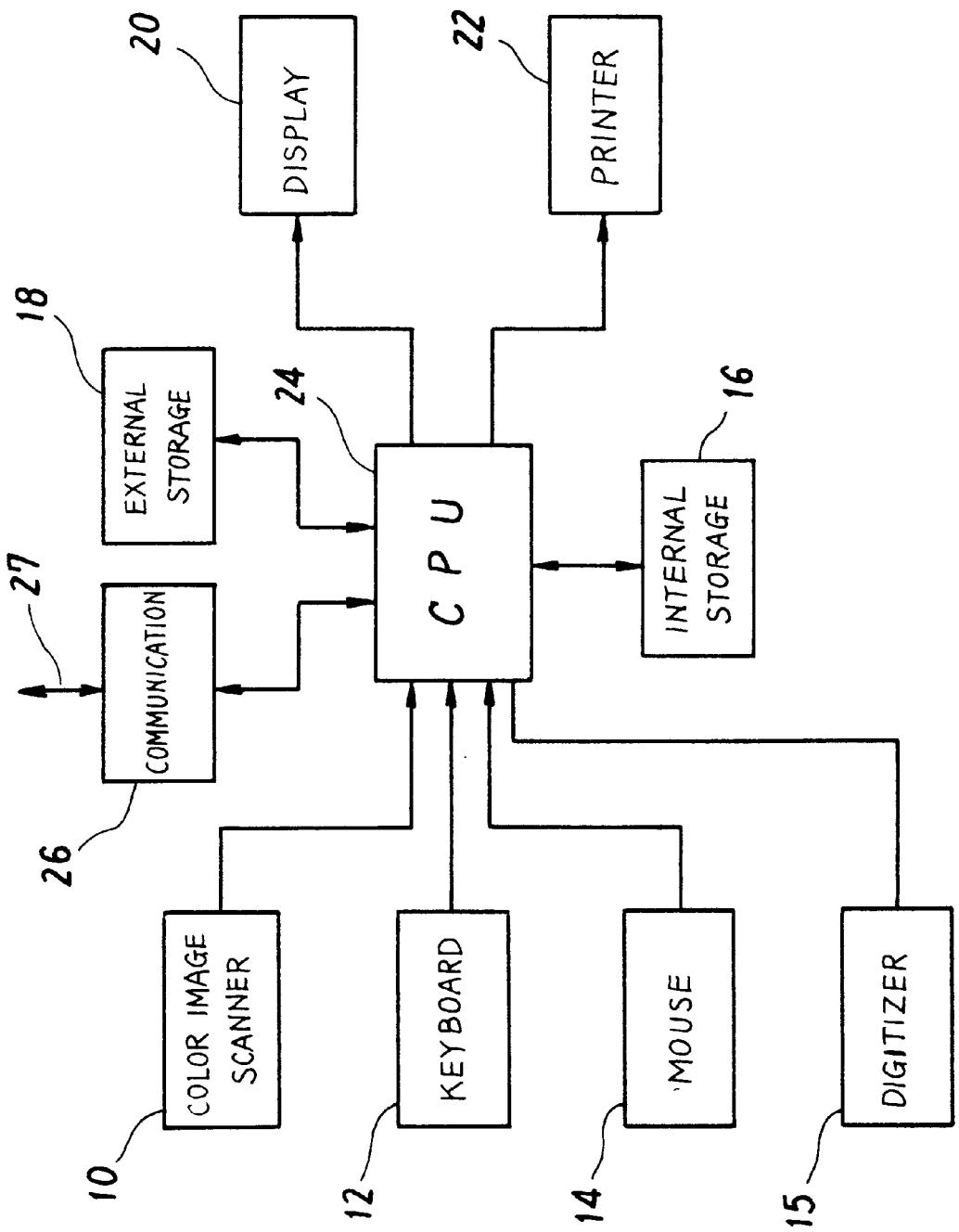
FIG. 1 is a block diagram showing a hardware organization of one embodiment of an information processing apparatus in accordance with the invention.

FIG. 1 shows a hardware organization of one embodiment of an information processing apparatus or system in accordance with the invention. In the embodiment, a color image scanner 10, keyboard 12, mouse 14 and digitizer 15 each serves as an input equipment. An internal storage 16 and external storage 18 each serves as a storage system. A display 20 and printer 22 each serves as an output device. The respective components are connected to CPU 24 via associated interface circuits (not shown). CPU 24 is also connected to a telephone or communication system 27 via a communication equipment 26.

The color image scanner 10 is used to read a source document sheet carrying characters, symbols, and/or graphical thereon as a colored image. The internal storage 16 and external storage 18 store electronic dictionaries, character fonts etc., as well as programs for controlling CPU 24. The communication equipment comprises a facsimile machine.

Figure 2:
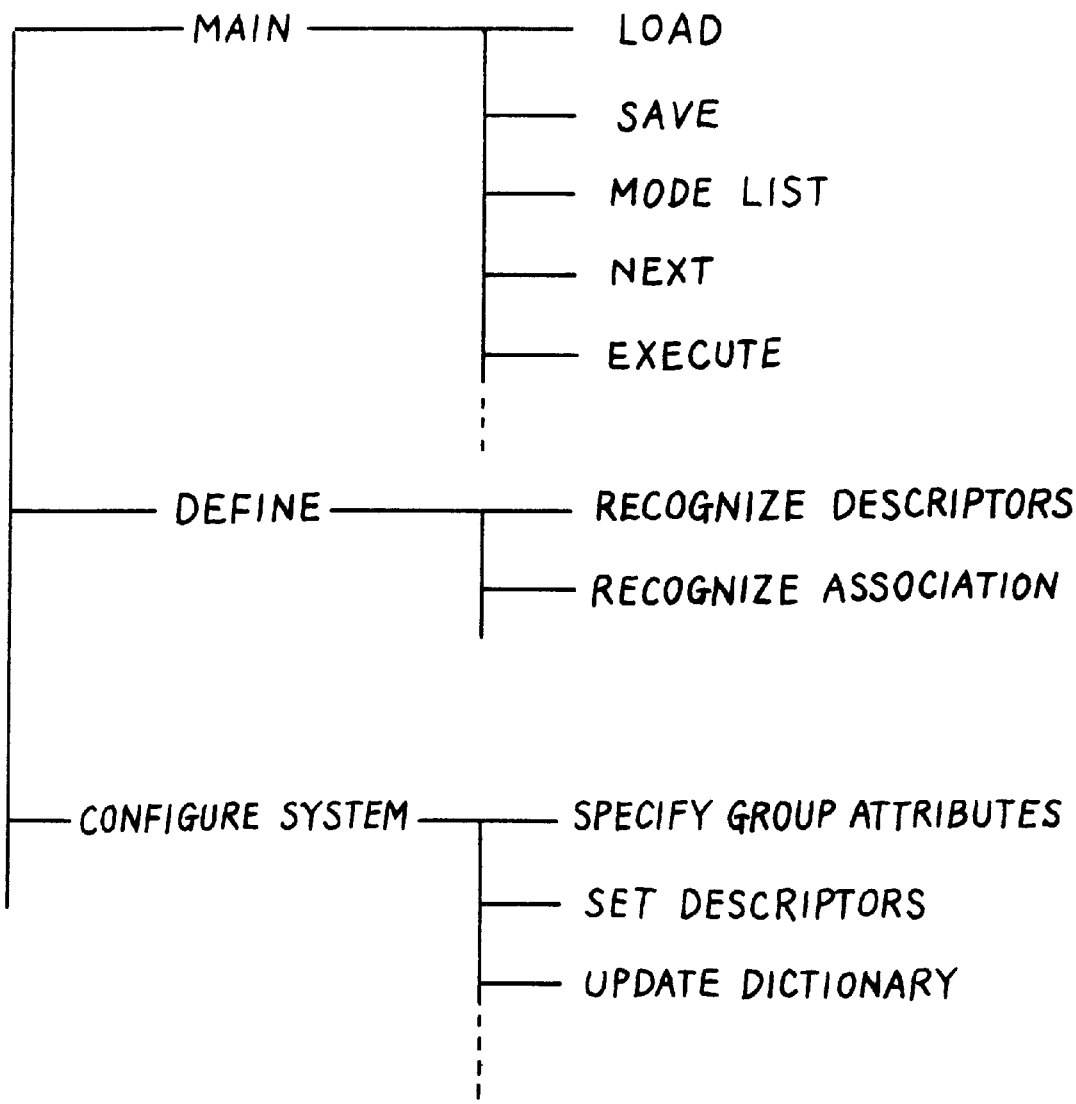
FIG. 2 is a diagram showing a list of operation modes of making graphs in accordance with the embodiment.

FIG. 2 shows a list of modes of operation in which the embodiment system makes a document. Main modes are "MAIN", "DEFINE", "CONFIGURE SYSTEM", etc. Each main mode of "MAIN", "DEFINE", "CONFIGURE SYSTEM" is subdivided into submodes of "LOAD" etc., "RECOGNIZE DESCRIPTORS" etc., "SPECIFY GROUP ATTRIBUTES", etc., respectively.

Figure 3:
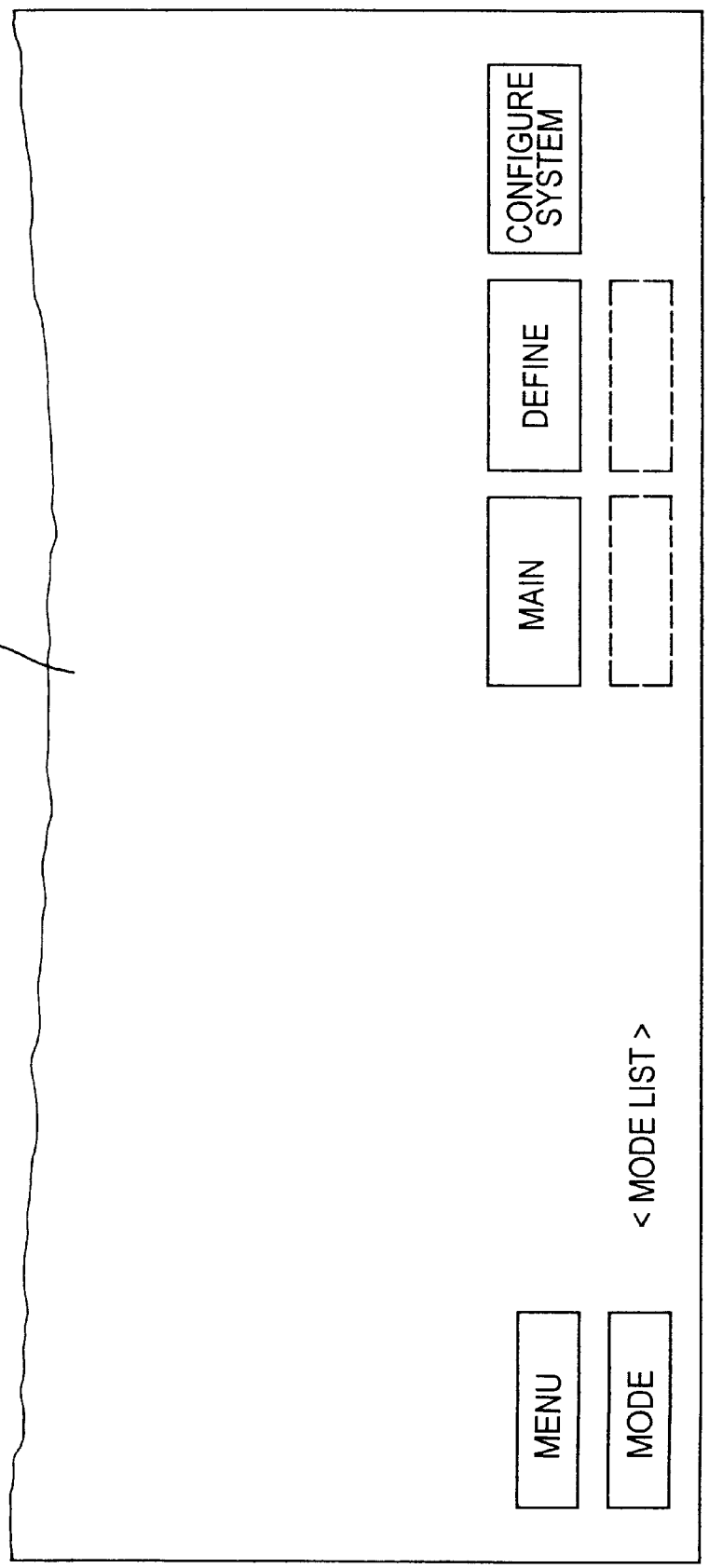
FIG. 3 is a view of a main mode menu screen in accordance with the embodiment.

FIG. 3 depicts "MAIN MODE MENU SCREEN" presented on a display screen 20a of the display 20. The "MAIN MODE MENU SCREEN" presents main mode select buttons of "MAIN", "DEFINE", "CONFIGURATION SYSTEM" etc., at bottom right of the display screen.

Figure 4:
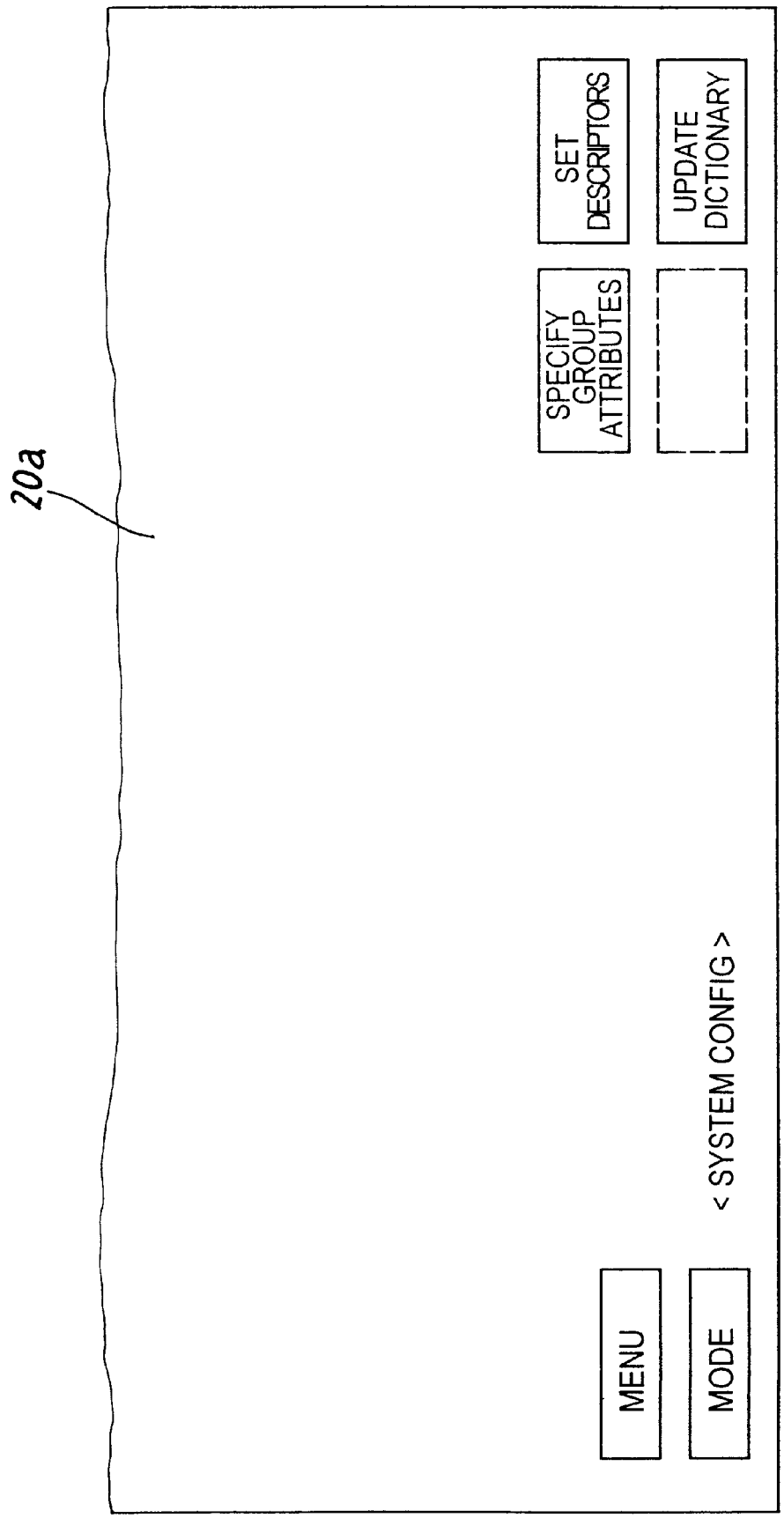
FIG. 4 is a view of a configure system mode screen in accordance with the embodiment.

When the "CONFIGURATION SYSTEM" button is clicked from the "MAIN MODE MENU SCREEN", the system enters a configure system mode, presenting "CONFIGURE SYSTEM MODE SCREEN" shown in FIG. 4 on the display screen 20a. There appears submode select buttons of "SPECIFY GROUP ATTRIBUTES", "SET DESCRIPTORS", "UPDATE DICTIONARY", etc., at bottom right of the display screen. If the "SET DESCRIPTORS" button is clicked here, the system enters a set descriptors mode, presenting on the screen a table of relation between descriptor elements and written signs, such as the one shown in FIGS. 5 and 6.

In FIGS. 5 and 6, the embodiment employs a plurality of different descriptor groups such as "COMMON", "MANAGE DATA", "FORMAT DOCUMENT", "EDIT DOCUMENT" etc. Each descriptor group contains a plurality of descriptor elements. Descriptor elements pertaining to the "MANAGE DATA" group are used to specify required data-managing of a document. Descriptors pertaining to "FORMAT DOCUMENT" and "EDIT DOCUMENT" are used to specify a required document format. Those descriptors pertaining to "COMMON" group are used in common to "MANAGE DATA", "FORMAT DOCUMENT" and "EDIT DOCUMENT."

As shown in FIGS. 5 and 6, each descriptor element is defined by a written sign in the form of a character or characters (character string), symbol(s) and/or graphical(s). Some descriptor elements, such as "ROUND UP" pertaining to the "MANAGE DATA" group, directly specify the object. Some other descriptor elements (such as the descriptor element of "DATA ITEM" pertaining to the "COMMON" group and corresponding to a written sign of "<>") mark or designate another written sign or item as an object (e.g., data item) thereof. Other descriptor elements, for example, the descriptor element of "DESIGNATE DESCRIPTOR ELEMENT" pertaining to the "COMMON" group and defined by a written sign of "○" is used to designate as descriptor element, a predetermined written item of character(s) and/or symbol(s) located in the written sign of "○". Still other descriptor elements request dictionary search for a written item of character(s) and symbol(s) for specifying contents.

Figure 7:
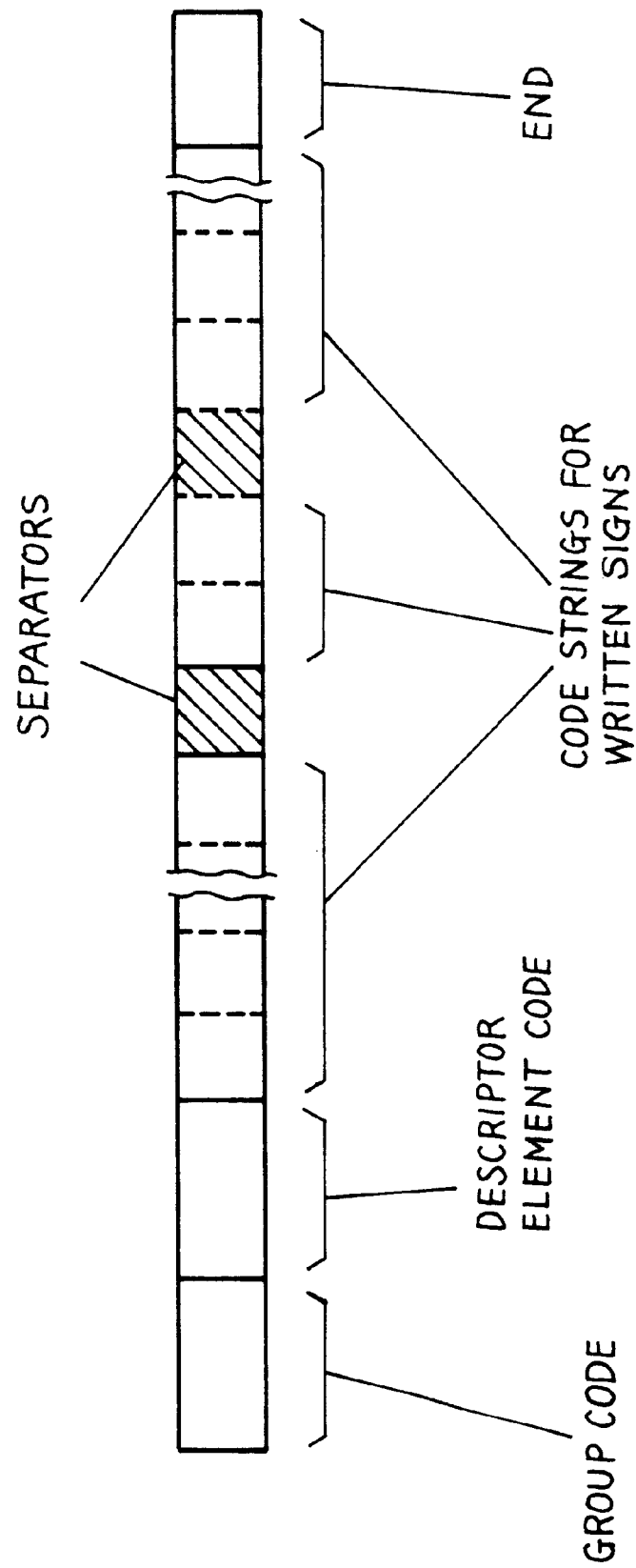
FIG. 7 is a format of a descriptor element specifier in accordance with the embodiment.

The relation between descriptor elements and written signs may be preset in the system. In the alternative, it may be user-programmable in a display- driven system. In either case, for implementation of the descriptor elements-to-written signs table shown in FIGS. 5 and 6, descriptor element specifiers having a variable length format shown in FIG. 7 are used. A set of descriptor element specifiers are stored in descriptor element specifier file storage 48 (FIG. 25) which is used for recognizing descriptors as will be described later.

As shown in FIG. 7, each descriptor element specifier record has a group code field indicative of a descriptor group code of, say, "MANAGE DATA" to which a descriptor element of, say, "RIGHT JUSTIFICATION" pertains, a descriptor element code field indicative of the descriptor element code (right justification code), written sign data field indicative of a corresponding written sign of character (character string) or symbol (e.g., "R", "RJ", "JUSTIFY") with separator codes and the last field indicative of the end of the record.

In accordance with the embodiment, descriptor elements for document definition are indicated and specified by written signs in the form of characters, symbols and/or graphical. Such written signs may also be used as ordinary written items representative of document contents. When written signs are used for descriptor elements, they are qualified with a special attribute (by color, for example) to distinguish them from ordinary written items representative of document contents. In doing so, a user can use familiar written signs as ordinary written items representative of document contents or as symbols of descriptor elements by qualifying them with unique attributes.

When a user clicks a submode select button "SPECIFY GROUP ATTRIBUTES" from the "CONFIGURE SYSTEM MODE SCREEN" in FIG. 4, the system presents "SPECIFY DESCRIPTOR ATTRIBUTES SCREEN" (see FIG. 8) on the display screen 20a.

Figure 8:
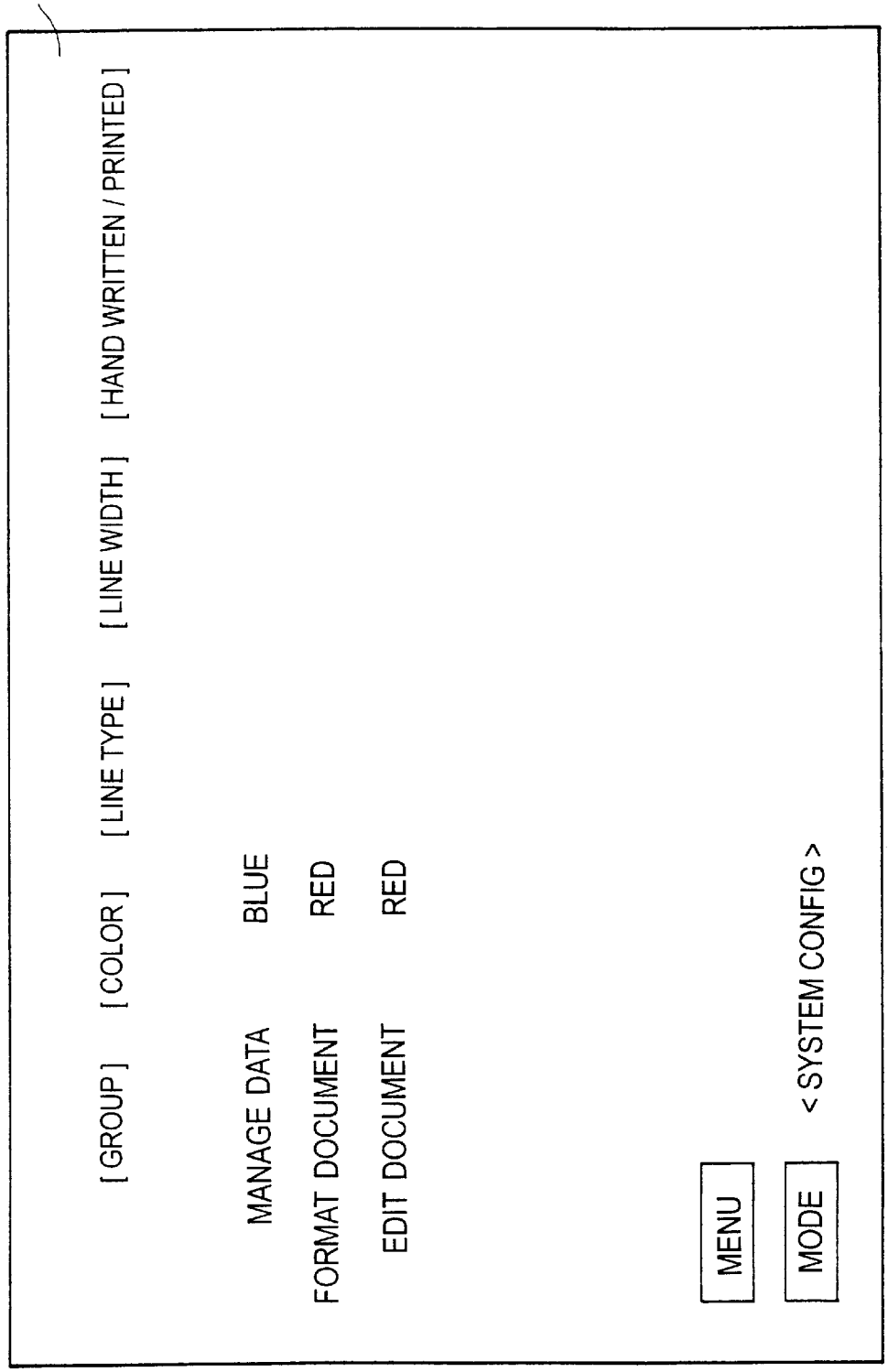
FIG. 8 is a view of a specify descriptor group attributes screen in accordance with the embodiment.

In FIG. 8 a "GROUP" column lists up descriptor groups, such as "MANAGEMENT DATA", "FORMAT DOCUMENT", "EDIT DOCUMENT", etc. The user may enter or specify attributes of respective descriptor groups, such as color, line type, line width and hand-written/printed. In the case of FIG. 8, the "MANAGE DATA" group has a color attribute of "BLUE", and the "FORMAT DOCUMENT" and "EDIT DOCUMENT" group each has a color attribute of "RED", as entered in the screen of FIG. 8. Since common descriptor elements are commonly used in "MANAGE DATA", "FORMAT DOCUMENT" AND "EDIT DOCUMENT", there is no need of qualifying them as "COMMON."

Figure 9:
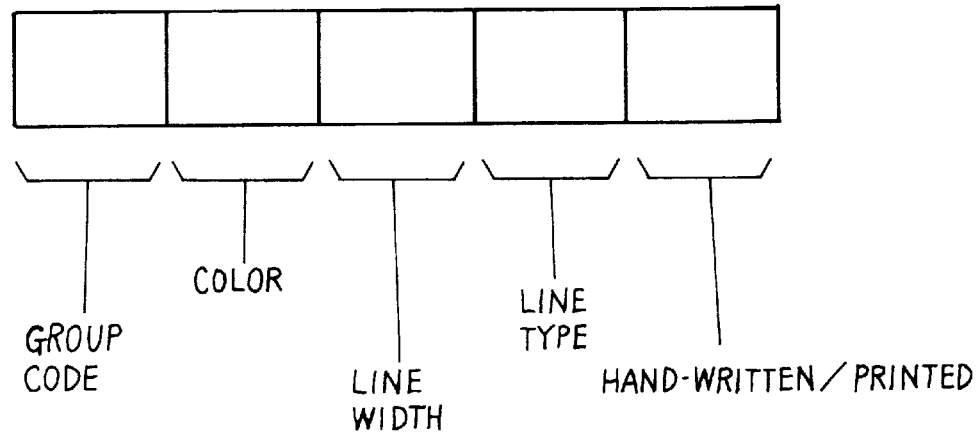
FIG. 9 shows a data format of a descriptor group attributes specifier in accordance with the embodiment.

In response to the entered descriptor group attributes, the system makes descriptor group attribute records, such as one shown in FIG. 9, for respective descriptor groups. A set of descriptor group attribute records are stored into a group attribute file storage 50 (FIG. 25), which will be used for creating descriptor records.

Figure 10:
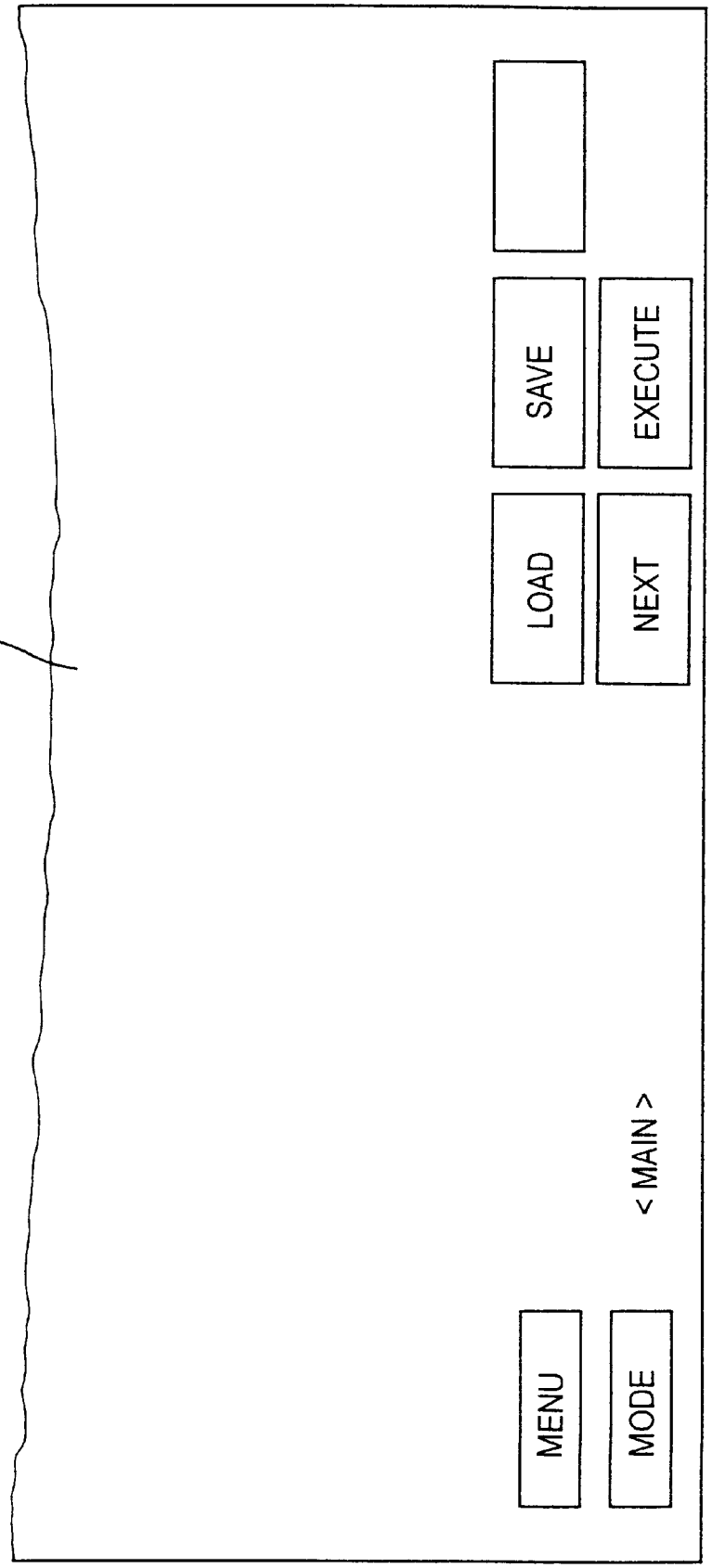
FIG. 10 is a view of a main mode screen in accordance with the embodiment.

FIG. 10 shows a MAIN MODE SCREEN. The MAIN MODE SCREEN presents submode buttons of "LOAD", "SAVE", "NEXT", "EXECUTE" etc., at the bottom right. When a submode select button is clicked, the system enters a corresponding submode. The MAIN MODE SCREEN is invoked at the time of power on as default reply. When the "MODE" button (the one normally displayed at bottom left) is clicked, the "MAIN MODE MENU SCREEN" is invoked.

The document making feature and graph making feature of the embodiment will be described in the following. To make an object graph, data of different sheets are processed. For example, numerical data set forth in a source document in tabular form, such as the one shown in FIG. 11, are used or transferred to make an object graph having the form of a source graph, such as the one shown in FIG. 12. A source document and a source graph may be printed or hand-written in black on separate sheets.

Figure 14:
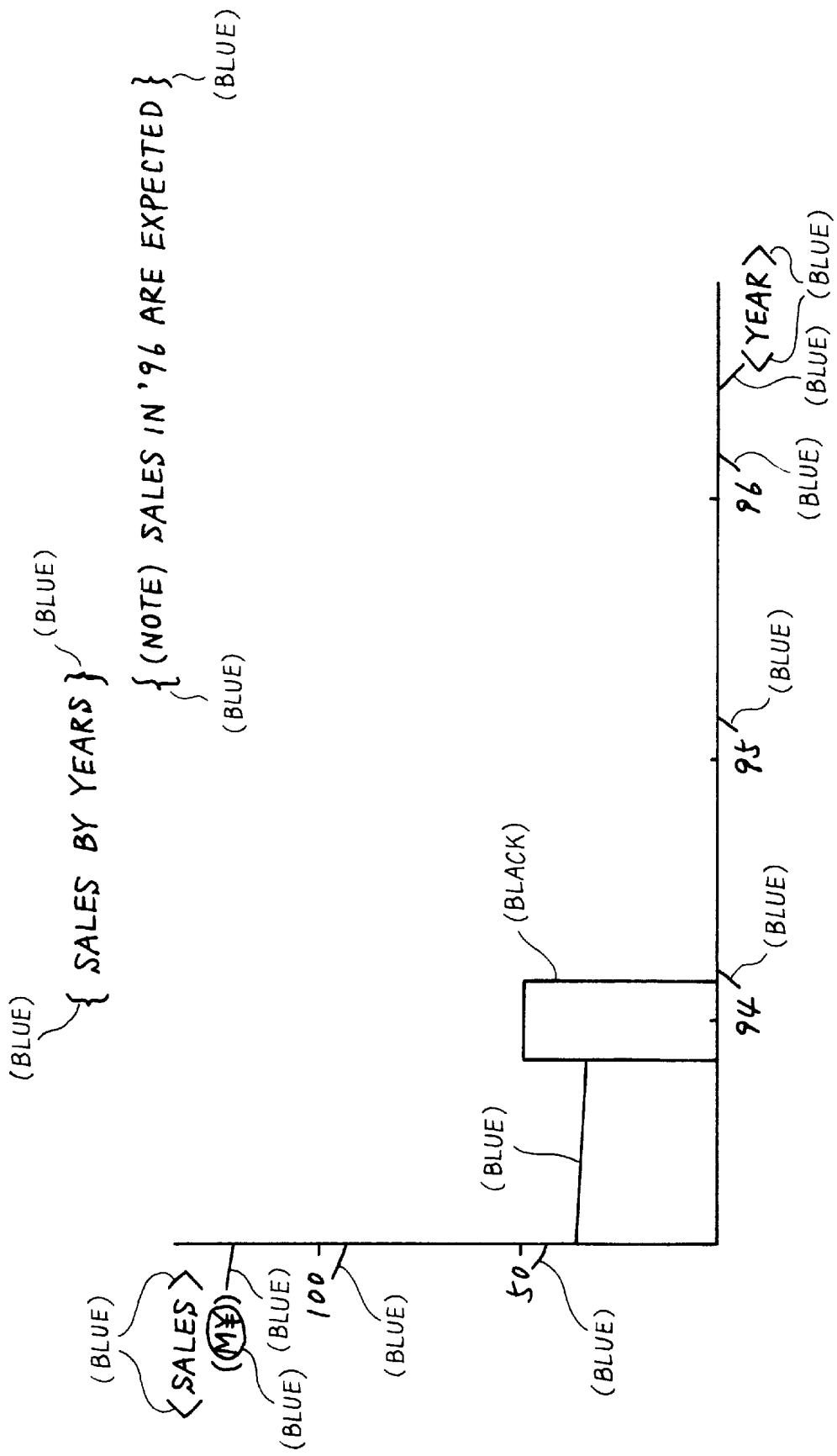
FIG. 14 is a source graph in which written signs for descriptors have been entered in accordance with the embodiment.

To get a desired object graph, a user enters or hand-writes written signs for descriptors in the source document and graph sheets for document and graph definition. Source document and graph sheets with written signs entered are illustrated in FIGS. 13 and 14, respectively.

In the source document of FIG. 13, the item name character strings of "YEAR", "ARTICLE" and "SALES" are each enclosed by blue colored written signs "<" and ">" for descriptor element of "ITEM", as "<YEAR>", "<ARTICLE>" and "<SALES>" . Thus, the "<YEAR>", "<ARTICLE>" and "<SALES>" are defined as data item names for data management.

A symbol "M¥" in the cell of "<SALES>" is enclosed by a blue colored written sign "◯" for descriptor element "DESIGNATE DESCRIPTOR ELEMENT". This defines a unit of the data item "SALES" as M¥ (one million yens).

In each column of item "YEAR", "ARTICLE", "SALES", "SALES IN HANSHIN", "SALES RATIO TO HANSHIN", top and bottom cells are marked by blue colored written signs "["and"]" for descriptor element "DESIGNATE DOMAIN". Each domain of the top to bottom cell is now defined as data field for receiving data of a corresponding item.

Blue colored characters "A", "B", "C" are entered in a bottom blank of the source document. These characters "A", "B" and "C" are connected to fields of "SALES", "SALES IN HANSHIN" and "SALES RATIO TO HANSHIN", respectively, by a blue colored written sign "–" for descriptor element "LINK" . Also, a formula "C=A/B" is written in blue in a blank. This means that in each data record of the document, a number (C) in a cell of "SALES RATIO TO HANSHIN" is computed by dividing a number (A) in a cell of "SALES" in Tokyo by a number (B) in a cell of "SALES IN HANSHIN".

The year data of "93 ", "94 ", "95" and "96" stand for years of 1993, 1994, 1995 and 1996, respectively.

In this manner, a user can format and define a tabular document as desired, using familiar written signs of characters, symbols, or graphicals according to predetermined association rules. Thus, the operation for document definition is simple and easy and can be done very quickly.

In FIG. 14, a user has entered written signs for descriptors to define a graph which is, here, a bar graph representation of sales of articles (television set, radio receiver, and car navigation system) in Tokyo by years of "94", "95", and "96", in which sales data may be read from the sales document of FIG. 13. In the format-defined source graph of FIG. 14, a first data item having predetermined data is "YEAR" whereas a second data item with undetermined data is "SALES".

In general, a graph comprises variable or undetermined graph elements which depend on data of the second data item, such as length or height of bars in a bar graph and data points of lines in a linear graph, and common or fixed graph elements independent from data of the second data item. A source graph without written marks for descriptors, such as the one shown in FIG. 12 carries common or fixed graph elements.

Figure 12:
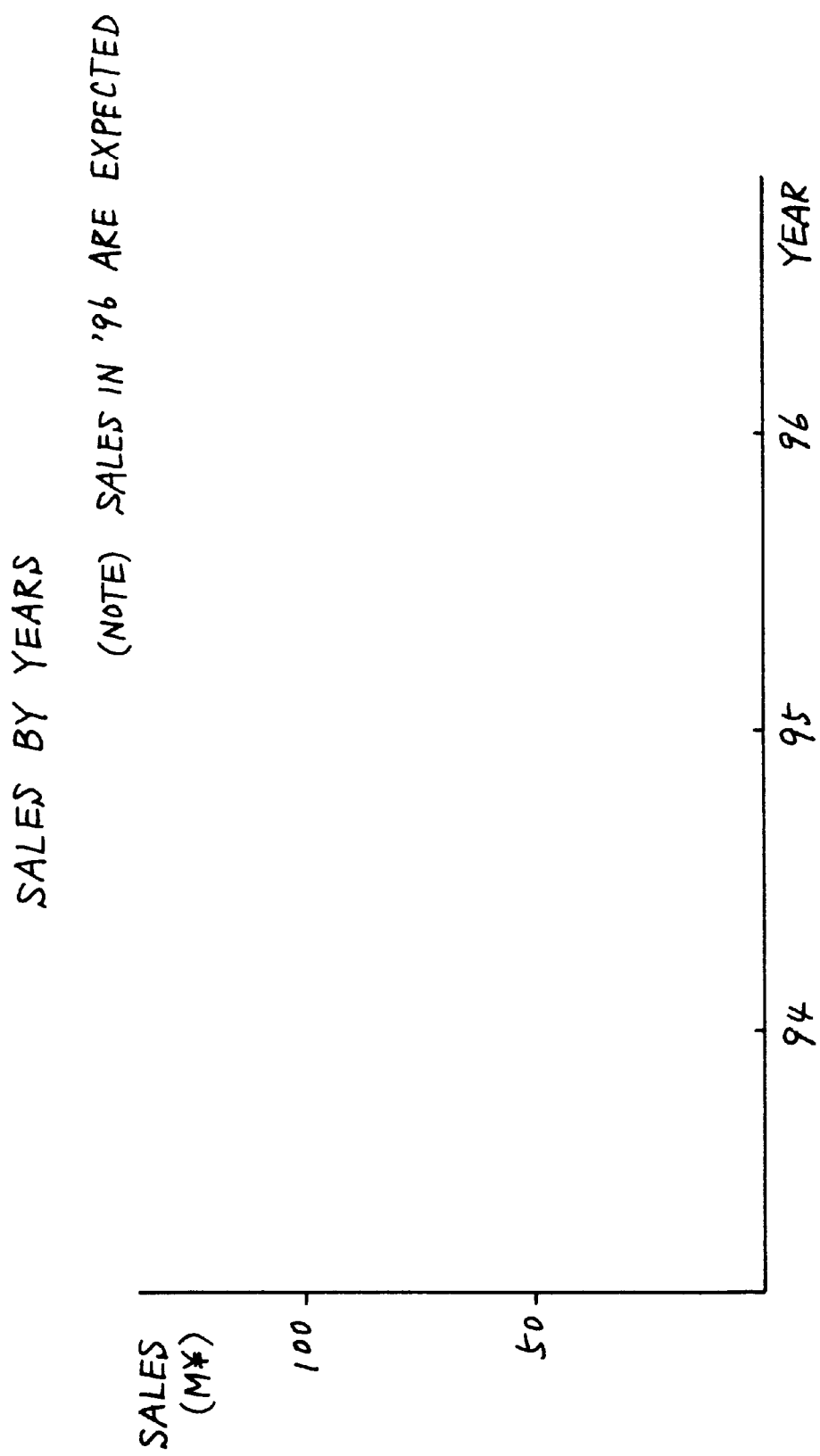
FIG. 12 shows a source graph in which written signs for descriptors will be entered later in accordance with the embodiment.

The fixed graph elements of the source graph in FIG. 12 are as follows:

(1) A horizontal or X axis of the graph is a determined data axis of the first data item of "YEAR";

(2) A vertical or Y axis of the graph is an undetermined data axis of the second data item "SALES";

(3) A character string "YEAR" set forth by the determined data axis is a data item name character string of the first data item "YEAR" whereas a character string "SALES" set forth by the undetermined data axis constitutes a data item name character string indicative of the second data item name "SALES";

(4) A character strings "94", "95" and "96" set forth by graduation markings "|" on the determined data axis constitute data name character strings indicative of respective data "94", "95" and "96" of the first data item "YEAR" . Graduation markings "|" on the determined data axis also constitute common or fixed graph elements;

(5) Numeric character strings "50" and "100" indicated by graduation markings "–" on the undetermined data axis constitute numerical graduation marks. The graduation markings "–" on the undetermined data axis also constitute common or fixed graph elements; and (6) A character string "M¥" indicated by the data item name character string "SALES" constitutes a unit name character string.

Then, a user writes in a source graph (FIG. 12) having common graph elements, an instance of variable graph elements for formatting variable graph elements of an object graph, as shown in FIG. 14.

In FIG. 14, a rectangle extending from the determined data axis at the year location of "94" indicates a variable graph element instance or bar instance. The variable graph element instance is used to specify a form of variable graph elements of an object graph with respect to the second data item "SALES". A single instance is enough to specify a form a variable graph elements of an object graph. In a bar graph representation of sales, for example, bars having the same form are arranged along the determined data axis of year at respective year locations. Thus, a single bar instance has been entered in FIG. 14 for a single year of "94". Other bar instances for other years are omitted. If it is desired, however, to have different forms of bars dependent on years, a user may enter a plurality of bar instances having such different forms dependent on years.

A source graph having common graph elements and a variable graph element instance represents a form of an object graph by means of ordinary writings. In other words, it represents a graph format as viewed from users. The present system cannot, however, recognize the object graph format directly from such a source graph consisting of ordinary writings since it reads it as document image.

In accordance with the present system, a user enters in such a source graph, written signs for descriptors for graph definition so that the system can recognize the intended graph format and definition.

In the formatted and defined source graph of FIG. 14, data item name character strings "YEAR" and "SALES" written in black are each enclosed by a blue written mark "<>" for a descriptor element "DATA ITEM". Thus, the "YEAR" and "SALES" are defined as data items. The data item name character strings "<YEAR>" and "<SALES>" are connected to the determined data axis and the undetermined data axis, respectively, by a blue colored written sign "–" for descriptor element "LINK". Now, the determined data axis corresponds to the first data item "YEAR" whereas the undetermined data axis corresponds to the second data item "SALES".

Character strings (black) "94", "95" and "96" set forth by graduation markings "|" on the determined data axis are each connected to the determined data axis by a blue colored link "–" to make connection to the data item character string "<YEAR>". This means that "94", "95" and "96" are marks on the determined data axis, indicative of individual data of the first data item "YEAR".

Character strings (black) "50" and "100" set forth by graduation markings "–" on the undetermined data axis are each connected to the undetermined data axis by a written sign of link "–". These characters "50" and "100" now define numeric graduation marks on the determined data axis of the data item "SALES".

A blue written sign "Δ" for descriptor element "FIX" is entered by a numeric graduation mark character string "100" of sales. This means that the location of the character string "100" is fixed on the undetermined data axis, as a reference.

A blue written sign "○" for descriptor element "DESIGNATE DESCRIPTOR ELEMENT" encloses a character string "M¥" set forth by the second data item name character string "<SALES>". This defines a unit of sales on the undetermined date axis as M¥ (one million yens).

A title character string "SALES BY YEARS" and annotation character string "(NOTE) SALES IN '96 ARE EXPECTED" written in black in an upper blank of the graph are each enclosed by a written sign "{ }" for descriptor element "exclude". This means excluding the title and annotation character string from data management of an object graph. Thus, they merely constitute ordinary writings.

In this manner, a user can format or define an object graph as desired, using familiar written signs for descriptors in the form of characters, symbols, or graphicals according to predetermined association (syntax) rules. Thus, the operation for graph definition is simple and can quickly be done.

A defined source document (FIG. 13) and a defined source graph (FIG. 14) are entered into the present system via the color image scanner 10.

Figure 15:
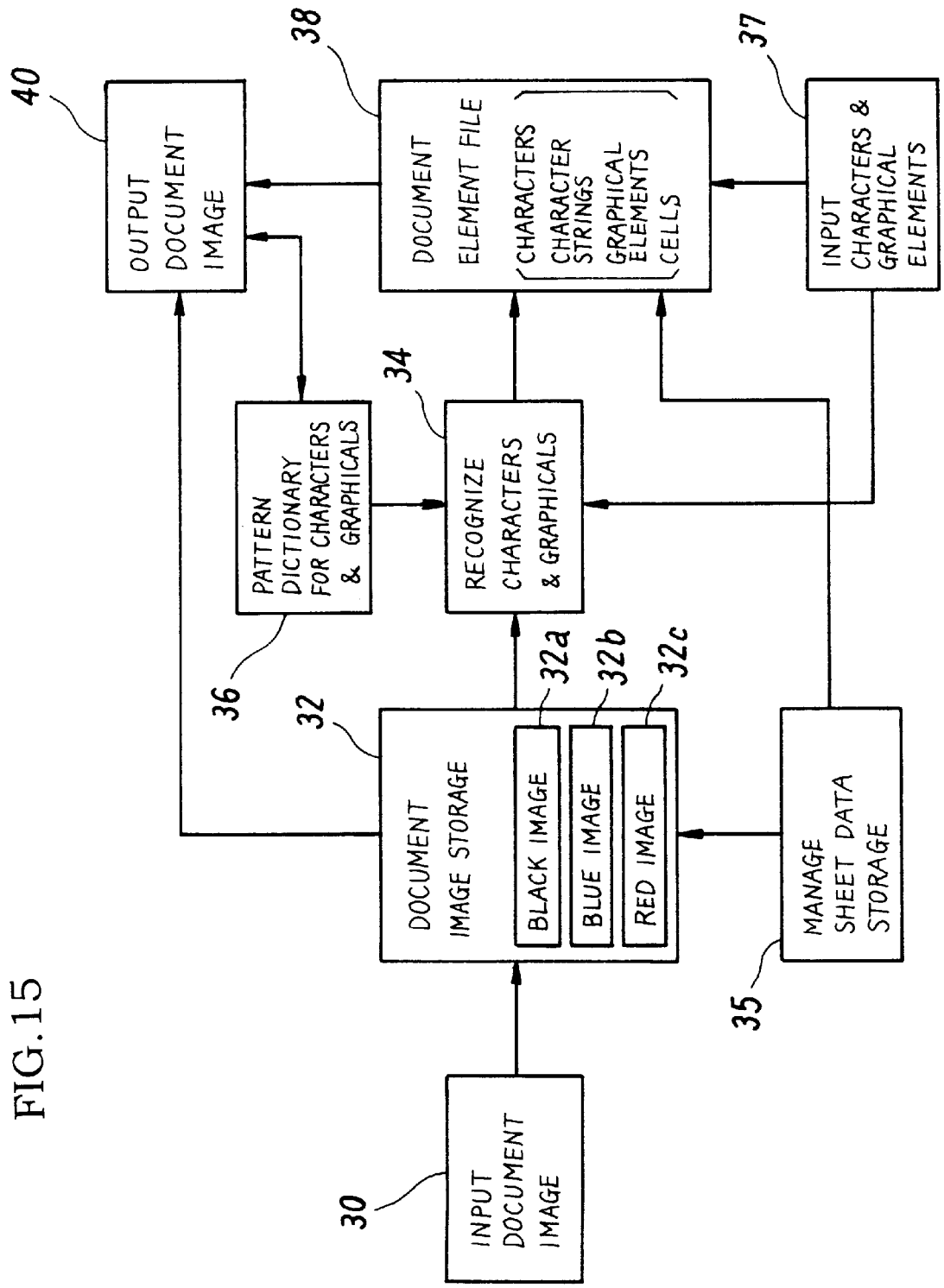
FIG. 15 is a block diagram showing functions of a subsystem in the embodiment for inputting a source document and creating a document element file.

FIG. 15 shows a function of a subsystem in the embodiment system for inputting a document and creating a document element file therefrom. An input document image block 30 is implemented by input devices including the color image scanner 10, keyboard 12 and/or mouse 14, and a CPU 24 for executing input routines and an internal or external storage device 16, 18 for receiving the entered color image. A document image storage 32, pattern dictionary 36 for characters and graphicals and document element file storage 38 each resides in the internal or external storage device 16, 18. A recognize characters and graphicals block 34 is implemented by CPU 24 for executing a recognize characters and graphicals routine. A display document image block 40 is implemented by CPU 24 for executing a display control program and the display unit 20 for displaying a document image under the control of CPU 24 or the communication equipment 26 for transmitting the document image.

Figure 16:
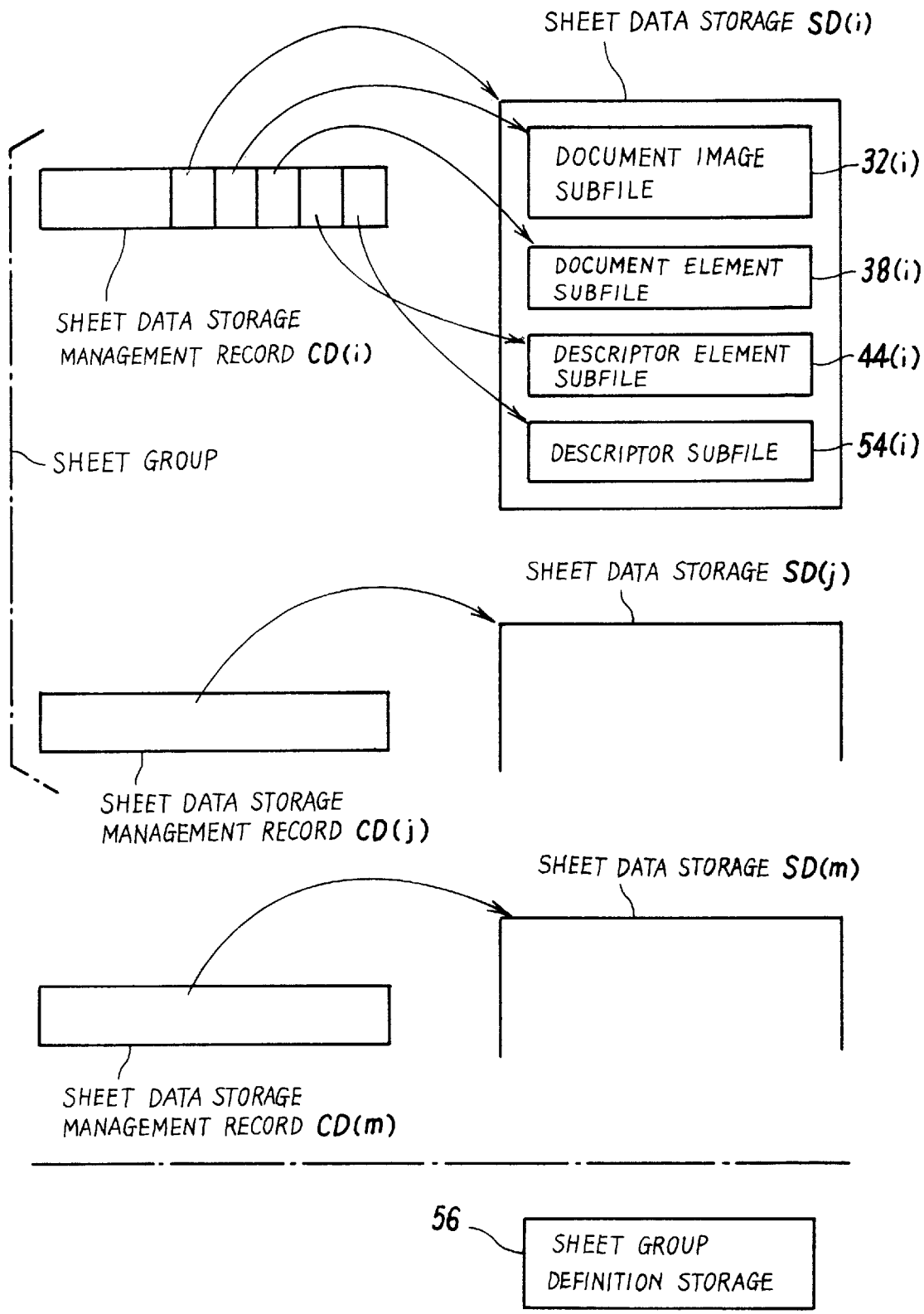
FIG. 16 schematically illustrates sheet data storage management in accordance with the embodiment.
Figure 17:
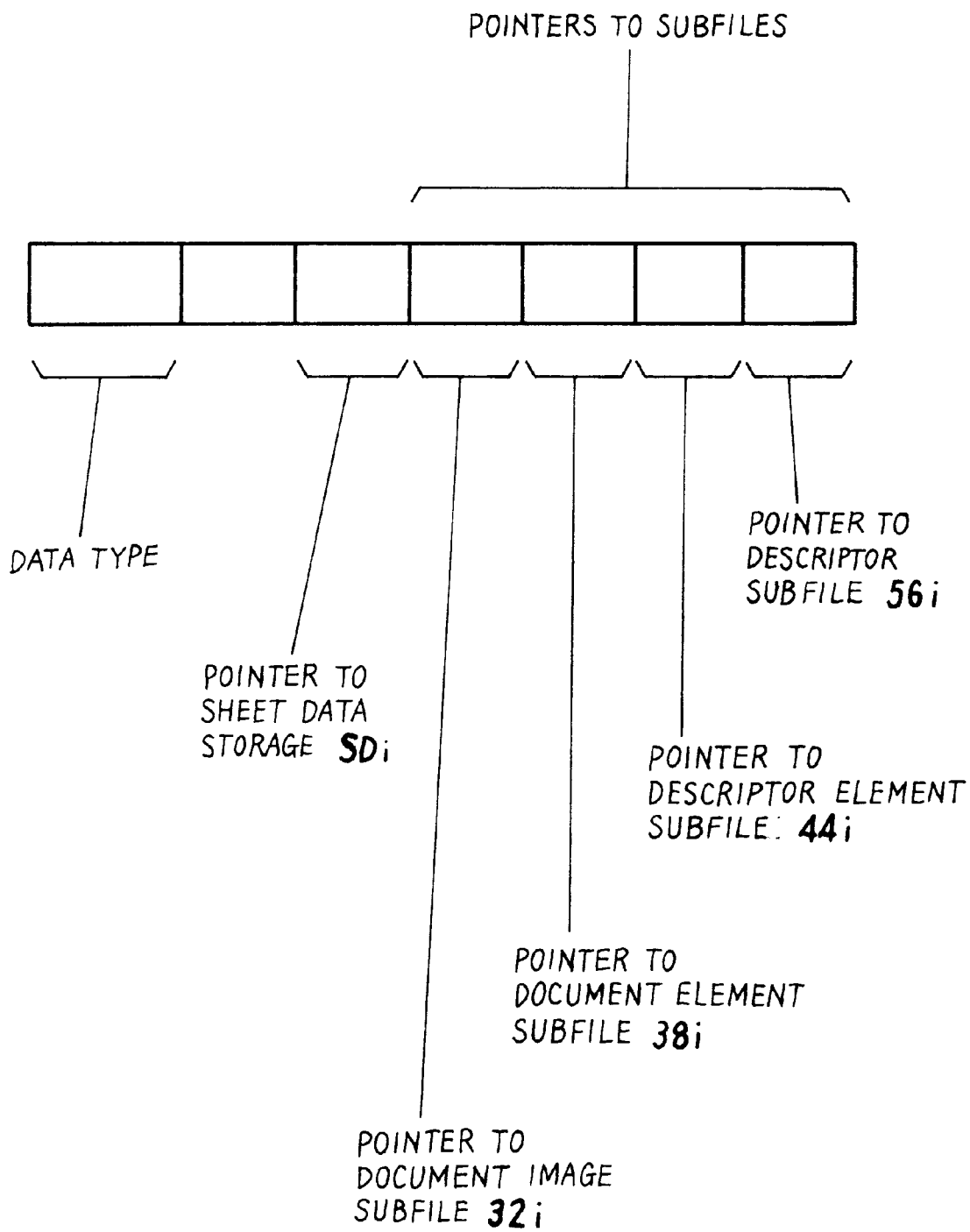
FIG. 17 shows a data format of a sheet data storage management record in accordance with the embodiment.

The document image storage 32 and the document file storage 38 are divided into document image subfiles 32(i) and the document element subfiles 38(i) according to individual sheets or pages PAi. As shown in FIGS. 16 and 17, sheet data management records CD(i) are used to manage the storage of document image subfiles 32(i) and document element subfiles 38(i). The manage sheet data storage block 35 creates such that data storage management records for individual sheet or pages PAi.

In the present system, the color image scanner 10 reads format-defined source documents (FIGS. 13 and 14) on a sheet-by-sheet basis. A plurality of such source documents are processed by the present system to make an object document or graph. The process involves data transfer. To this end, such a plurality of source documents are grouped into a sheet group. A message for grouping a plurality of document sheets may be provided to the system in several ways. For instance, a user operates a predetermined button.

Then, the image scanner 10 reads a plurality of source document sheets in succession. The plurality of source document sheets are recognized by the system as pertaining to the same sheet group.

The color image scanner 10 reads a format-defined source document (FIGS. 13, 14). The color image data from the scanner 10 is stored into a document image storage in the input black 30. The color image data representative of a source document sheet is decomposed into black, blue and red color image components, respectively which are respectively stored into a block image storage 32a, blue image storage 32b, and red image storage 32c within the document image storage block 32.

The recognize characters and graphical block 34 recognizes from respective image color components of black, blue, and red from the document image storage block 32, individual characters and graphical elements. The graphical elements refer to simple graphical symbols such as line, rectangle, circular loop etc., having a shape which is easy to be pattern-recognized.

Figure 18:
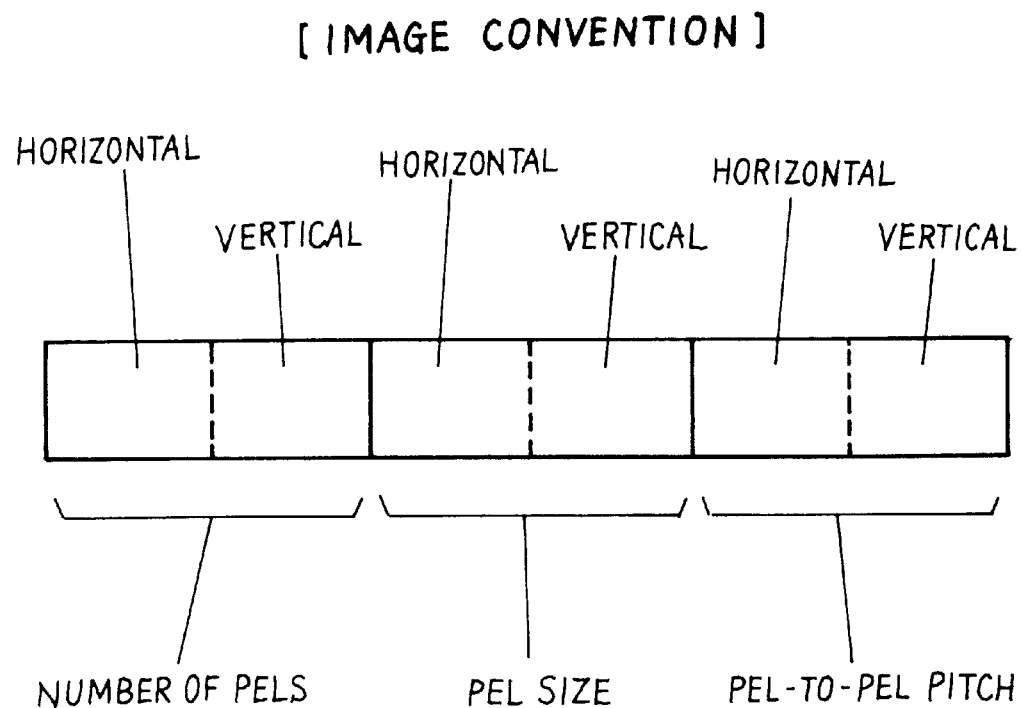
FIG. 18 shows a data format of an image convention record in the embodiment.
Figure 19:
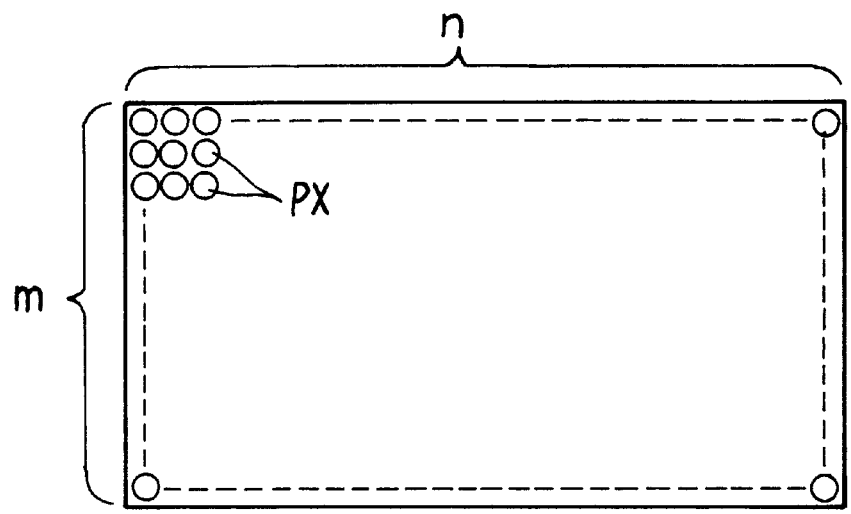
FIG. 19 is a diagram showing a screen image configuration specified by the image convention record.

In connection with the image pattern-recognition, an image convention record, such as the one shown in FIG. 18 is referenced. The image convention record specifies the entered image data structure which is configured by a matrix of large number of pels PX shown in FIG. 19, specifying the number of pels PX; pel size, pitch etc.

The recognize characters and graphicals block 34 recognizes individual characters and graphical elements based on stroke analysis by which strokes constituting a character or graphical element are found. Any suitable prior art stroke analysis may be employed. For example, a group of dots having a specific color is first located. Then a nearby or surrounding area is searched to find an extending direction of the dot group. The process of the dot group tracing repeats until the stroke drawn by such dot group terminates. In the tracing, when the stroke has changed suddenly, the point is identified as a deflection or vertex.

Each stroke is classified into one of predetermined stroke patterns, depending on shape and size. In the embodiment, the pattern dictionary 36 for characters and graphicals, as an electronic dictionary, has stored stroke features and special relationship between constituent strokes for respective characters and graphical elements. The recognize characters and graphicals block 34 repeat the matching process involving matching a combination of adjacent strokes found in the stroke analysis against entries in the pattern dictionary 36 to thereby recognize individual characters, symbols, and graphicals.

Ruled lines of a tabular document are recognized as follows. At first, the stroke analyzer recognizes straight lines. If such a straight line is much longer than an ordinary line and generally extends horizontally (X axis) or vertically (Y axis), the line is considered a horizontal or vertical ruled line. The direction of the found ruled line is adjusted in parallel to a horizontal or vertical line. In the case when a ruled line end is found close to an end or point of another ruled line within a predetermined limit, the ruled line end is considered meeting or coinciding with another ruled line end or point and the ruled line location is adjusted correspondingly.

The recognize characters and graphicals block 34 recognizes characters and graphicals from respective image color components (black, blue, red) of the entered source document, as mentioned above, to thereby create document element records of character, character string, graphical element, mark, etc., according to the data format shown in FIGS. 20 to FIGS. 27.

Figure 20:
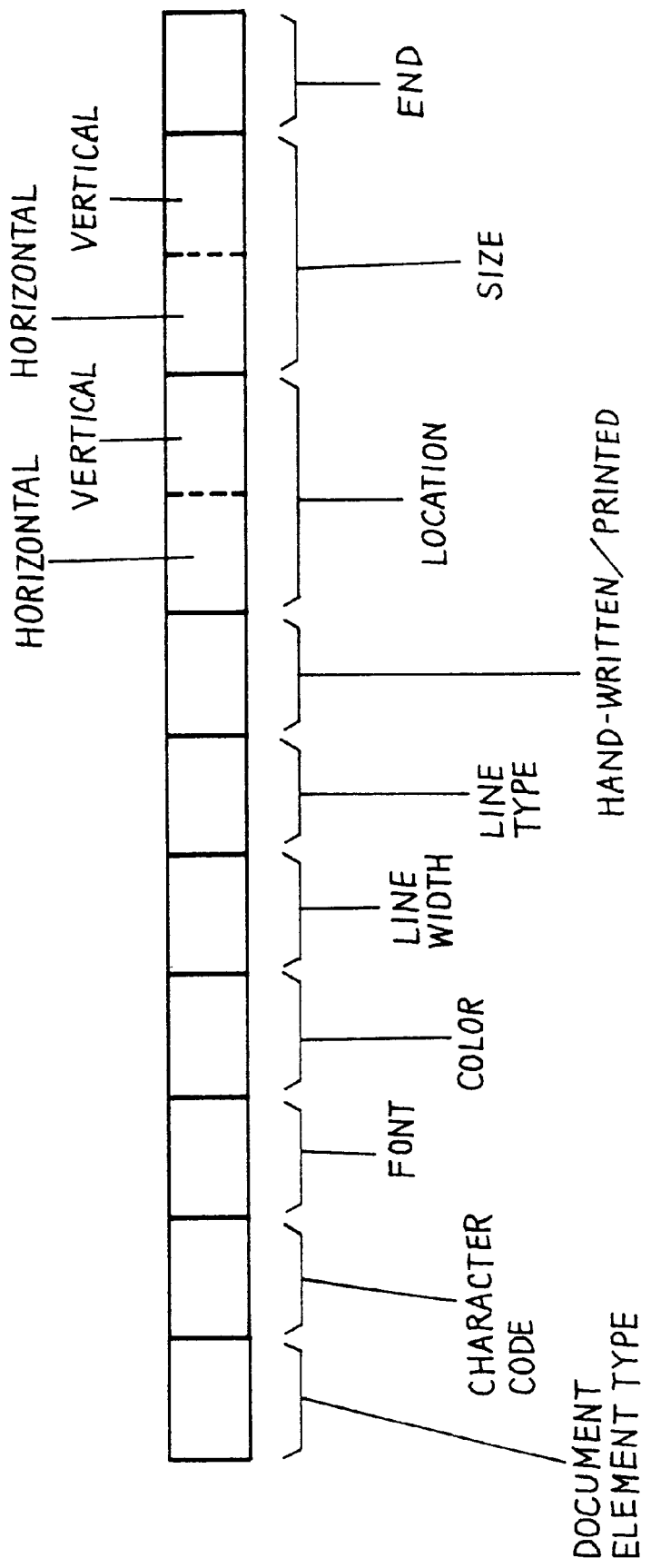
FIG. 20 shows a data format of a character record in accordance with the embodiment.

FIG. 20 shows a document element record (character record) of a single character. The character record includes a character code, font, color, line width, line type (solid, dotted, chained etc.,), hand-written/printed (meaning that the character is handwritten or printed), location, and size (character size) in respective data fields, and ends with an end of record "END".

Figure 21:
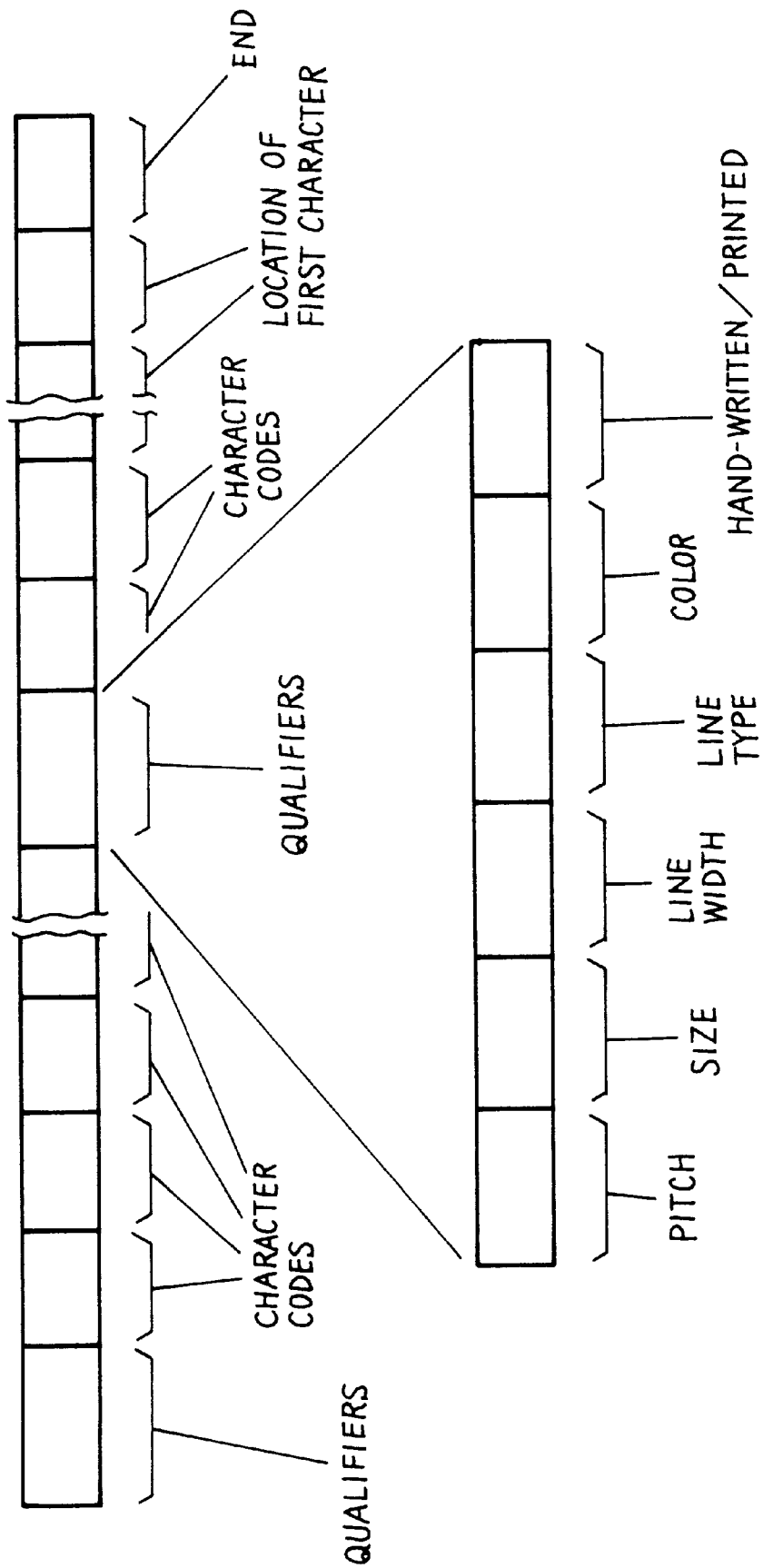
FIG. 21 shows a data format of a character string record in accordance with the embodiment.

FIG. 21 shows a document element (character string) record of a character string. The character string record starts with qualifiers for specifying character string attributes such as character-to-character pitch, size (character size) etc., followed by character codes for the character string. A composite character spring such as "2000KM" is constructed by partial strings "2000" and "KM" having different character size and pitch attributes. Such a composite character string is represented by a chain of character string records each corresponding to a partial string of the composite character string.

Figure 22:
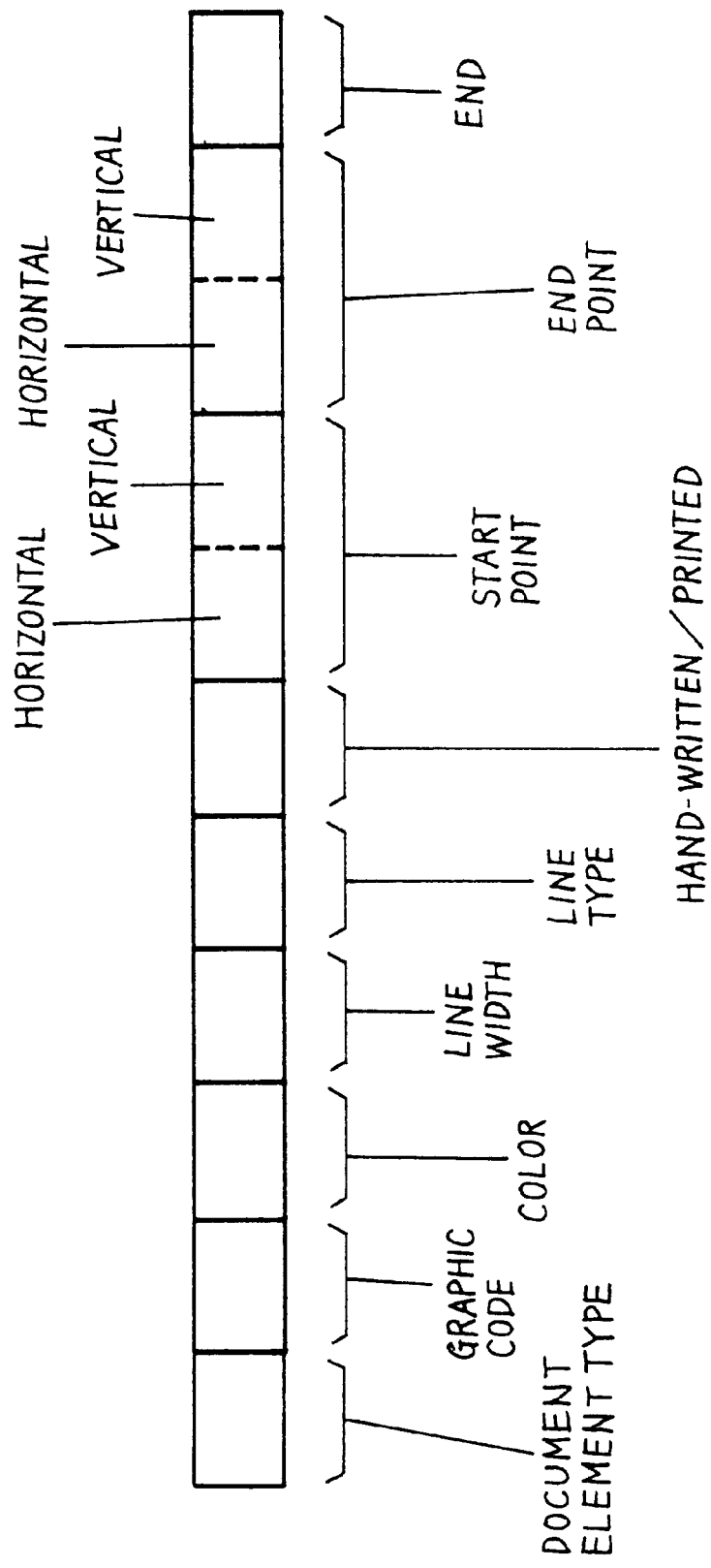
FIG. 22 shows a data format of a graphic element record of a line in accordance with the embodiment.
Figure 23:
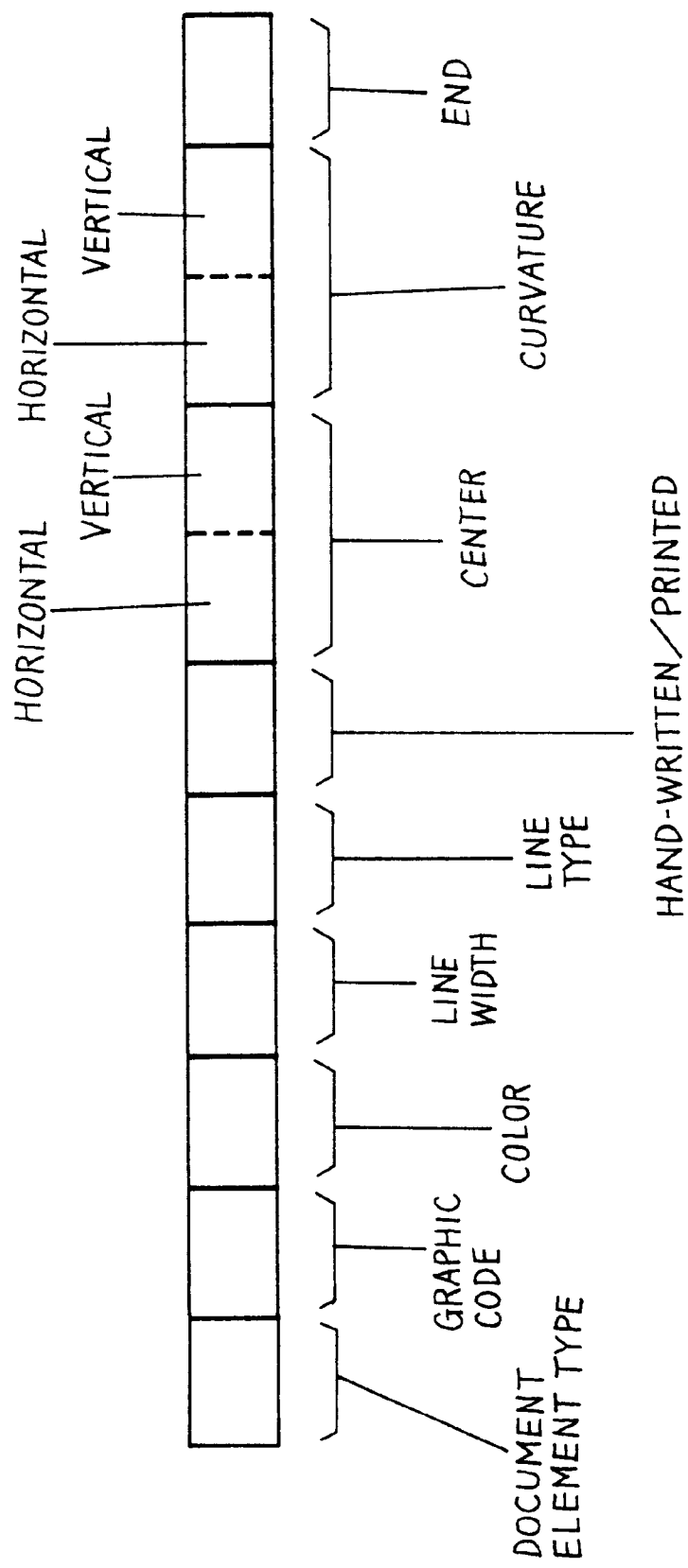
FIG. 23 shows a data format of a graphic element record of a circular loop in accordance with the embodiment.
Figure 24:
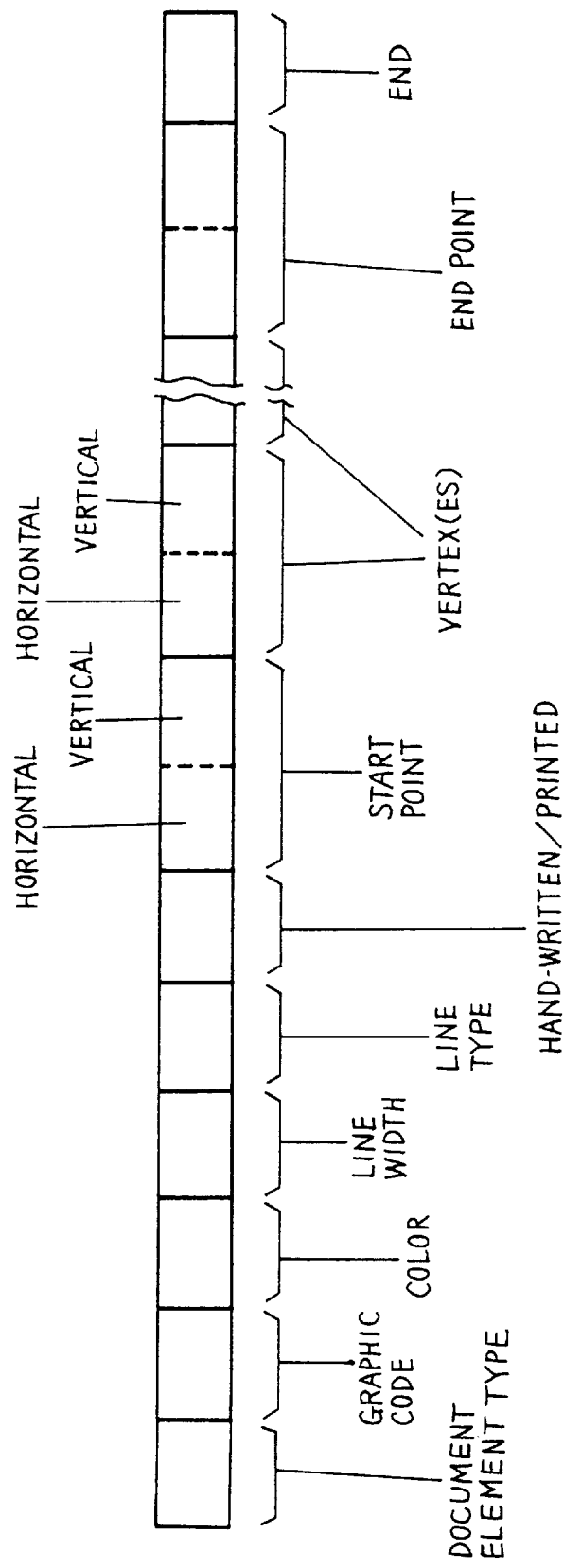
FIG. 24 shows a data format of a graphic element record of a rectangle etc., in accordance with the embodiment.

FIGS. 22, 23, and 24 show document element (graphic element) records each corresponding to a single graphical element or symbol. As shown in FIG. 22, a graphic element record of a line includes start and end point data of the line. As shown in FIG. 23, a graphic element record of a circular loop includes data of a center location (x, y) and curvature size (for x and y direction). As shown in FIG. 24, a graphic element record of a rectangle, "<" or the like, includes data of deflection point or vertex (where the stroke direction sharply changes) in addition to start and end points.

In this manner, the recognize characters and graphicals block 34 recognizes individual characters (character strings), symbols, and graphicals included in the entered source document sheet image, thus making document element records thereof. The collection of the document element records made from a source document sheet is stored into the storage 38 as a document element subfile for that sheet. Those image entries of written signs or items whose elements have been recognized into document element records may be deleted from the document image storage 32.

The display document image block 40 may display, on the screen 20a of the display unit 20, an image of an entered source document based on the image data in the document image storage 32. It may also display an image of a document from the document element file storage 38 by reconstructing image data from the stored document element records using the pattern dictionary 36.

Figure 25:
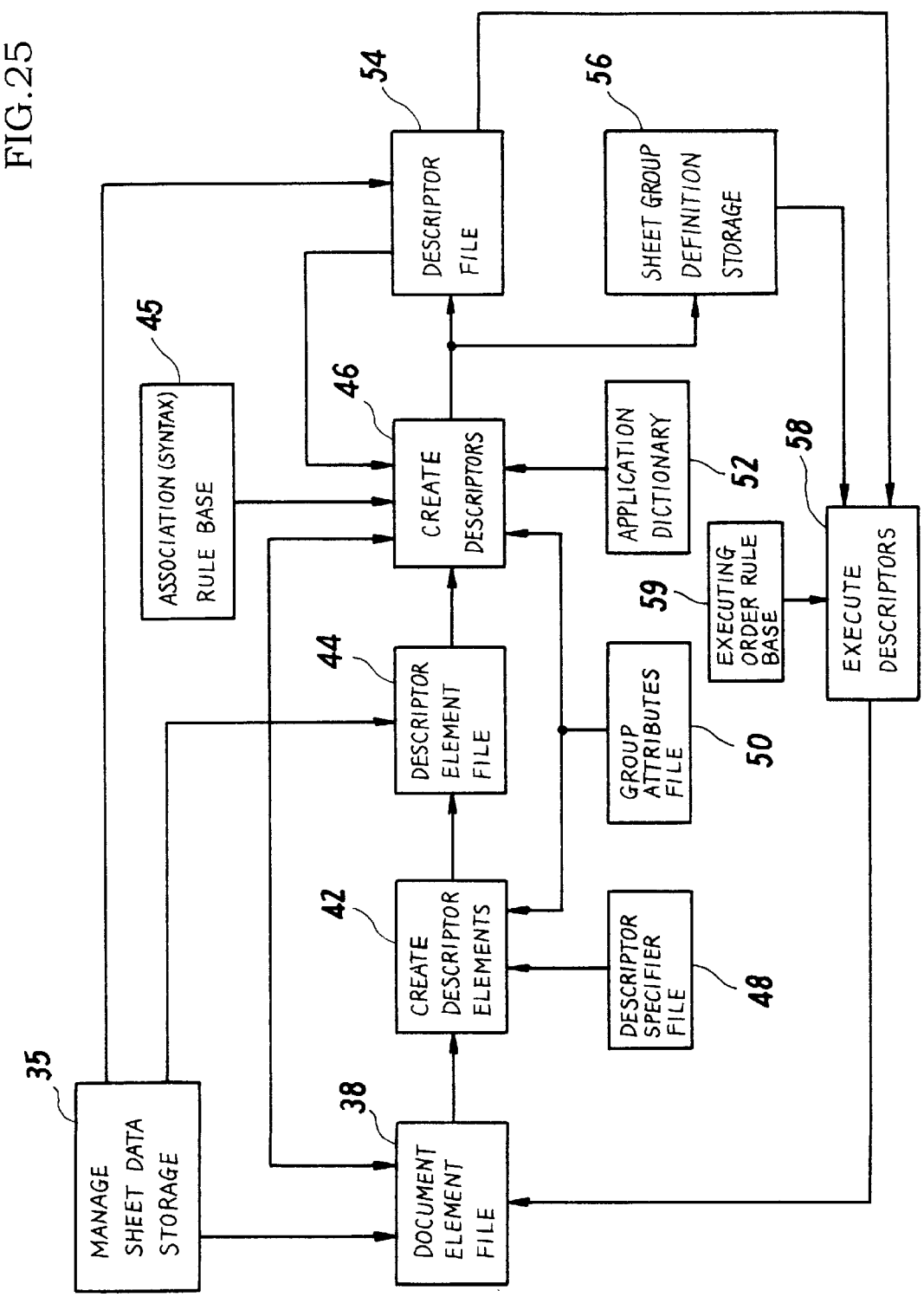
FIG. 25 is a block diagram showing functions of a subsystem in the embodiment for recognizing descriptors, formatting, and executing descriptors.

FIG. 25 shows a feature of the embodiment for recognize descriptors and formatting a document. A create descriptor elements block 42 and create descriptor command block 46 are implemented by a CPU 24 for executing the process of creating descriptor elements and descriptors. The association (syntax) rule base storage 45, descriptor element specifier file storage 48, group attribute file storage 50, application dictionary storage 52, descriptor file storage 54, and sheet group definition storage 56 reside in internal and/or external storage devices 16, 18.

The descriptor element file storage 44 and the descriptor file storage 54 are divided into descriptor element subfiles 44(i) and descriptor subfiles 54(i) according to source document sheets or pages PAi. As shown in FIGS. 16 and 17, sheet data storage management records CD(i) are used to manage descriptor element subfiles 44(i) and descriptor subfiles 54(i). The manage sheet data storage block 35 creates sheet data storage management records CD(i) for respective source document sheets or pages PA(i).

In the arrangement of FIG. 25, the create descriptor elements block 42 looks up the descriptor element specifier file 48 of descriptor element specifier records (FIG. 7) and the group attribute file 50 of descriptor group attribute specifier records (FIG. 9), for descriptor element identification, and creates descriptor element records of a source document sheet or page from document element records (FIGS. 21 to 24) of that sheet stored in the document element file storage 38.

Figure 26:
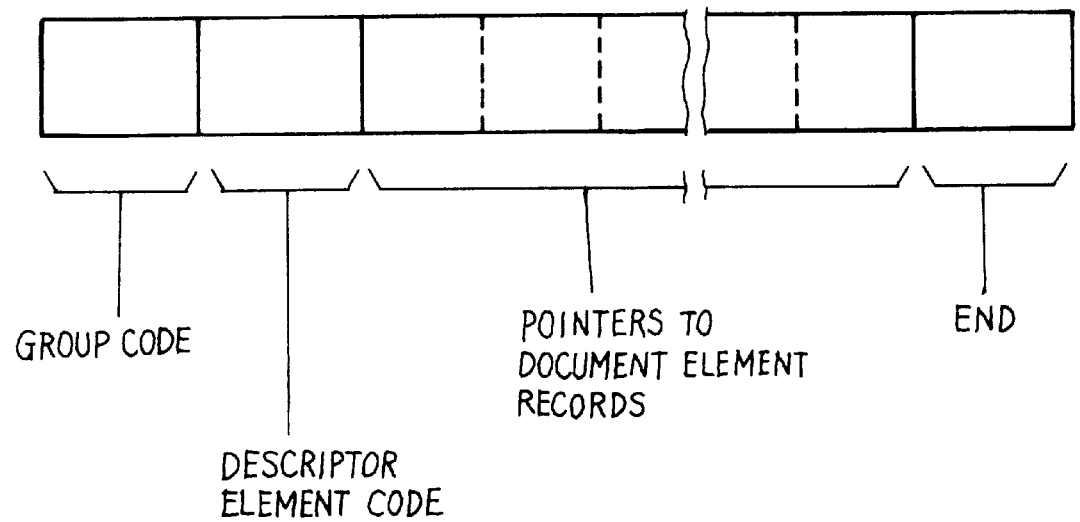
FIG. 26 shows a format of a descriptor element record in accordance with the embodiment.
Figure 27:
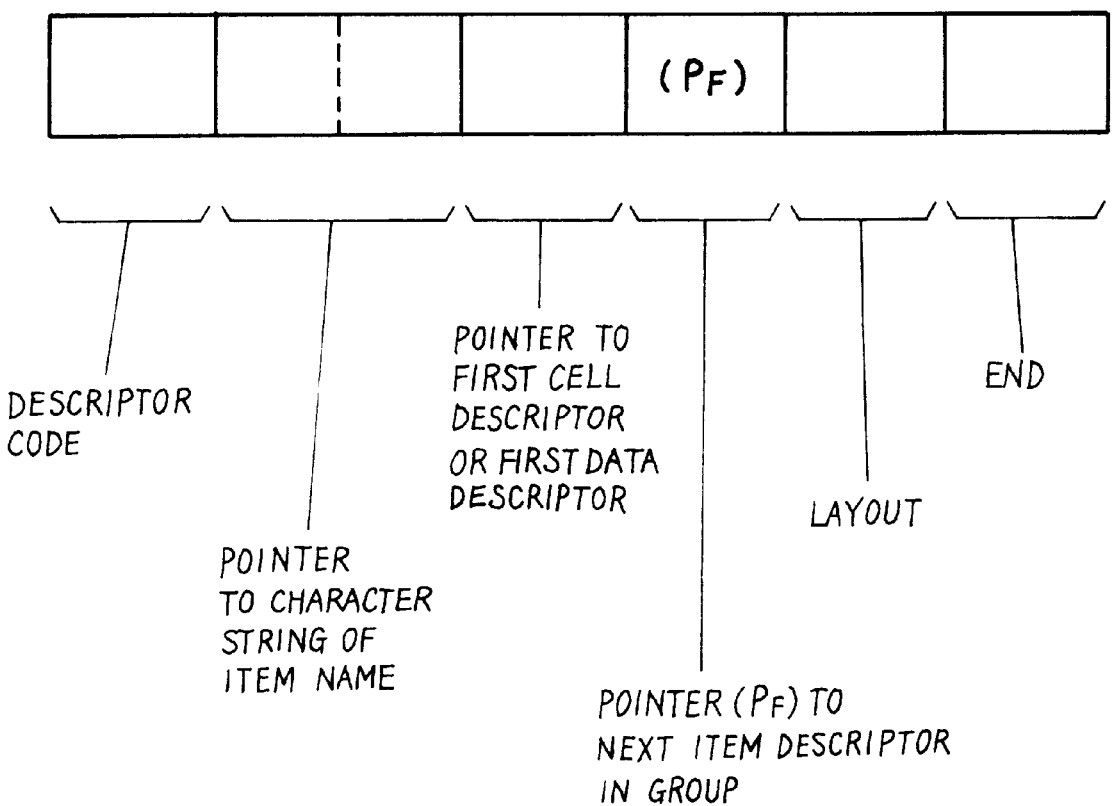
FIG. 27 shows a format of an item descriptor in accordance with the embodiment.

FIG. 26 shows a descriptor element record data format. The descriptor element record includes a descriptor group code and descriptor element code for identifying the descriptor element, and pointer(s) to document element record(s) that specify or constitute the descriptor element. For example a descriptor element record "DESIGNATE DOMAIN" includes points to document element records of written signs "["and "]" which specify the descriptor element.

To create descriptor element records, the system first searches for those document element records having a specific qualifier, e.g., a red color qualifier. In the search, if a written sign "["has been found, the system searches for another written sign "]" to be paired, thus identifying written signs "[ ]" indicative of a descriptor element "DESIGNATE DOMAIN." A descriptor group code and a descriptor element code have now been determined and pointers to document element (graphical element) records of "["and "]" in the document element file storage have also been determined.

The descriptor element records of a source document sheet from the create descriptor elements block 42 are stored into the storage 44 as a descriptor element subfile under management of sheet data storage block 35.

Then, the create descriptors block 46 creates or constructs descriptor records (unitary and composite descriptor records) of a source document sheet or sheet group according to association or syntax rules stored in the association rule base storage 45, from the descriptor element records (FIG. 26) stored in the descriptor element file storage 44 and from the document element records (FIGS. 21 to 24) stored in the document element file storage 38 while looking up the group attribute file 50 storing group attribute specifiers (FIG. 9).

Figure 29:
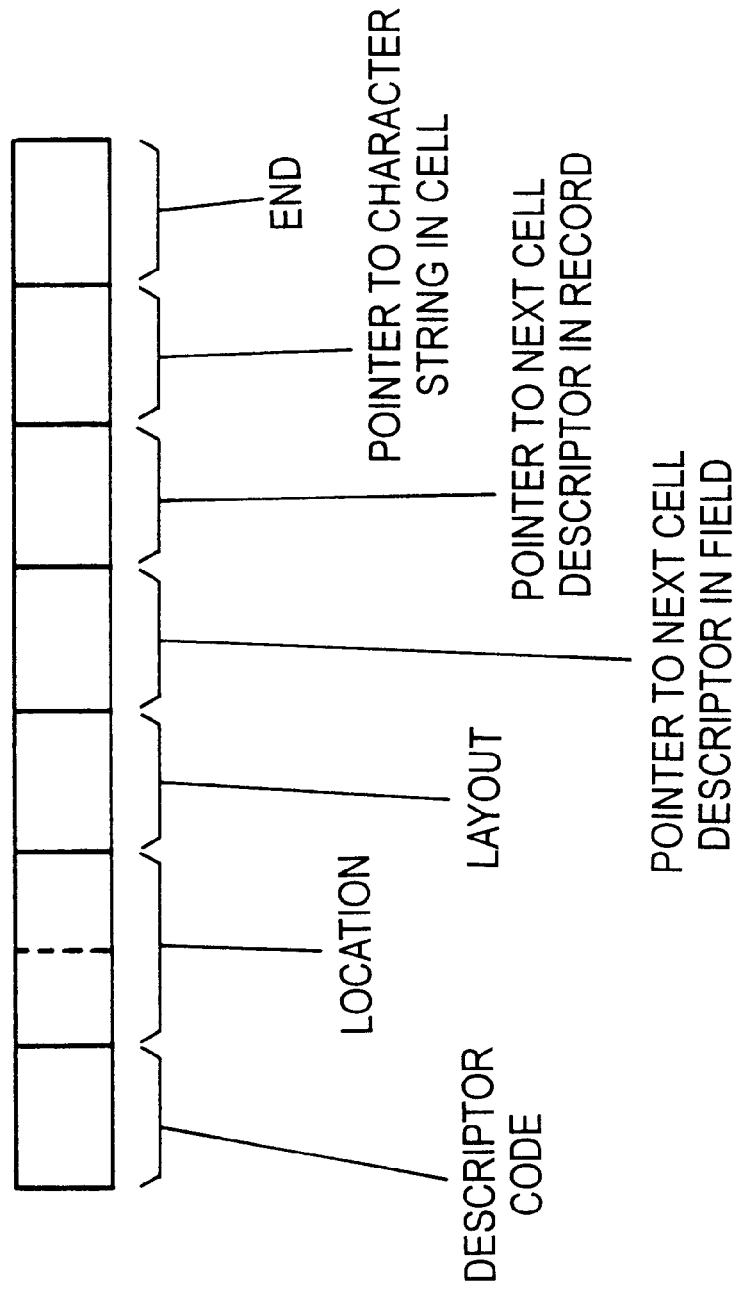
FIG. 29 shows a format of a cell descriptor in accordance with the embodiment.
Figure 35:
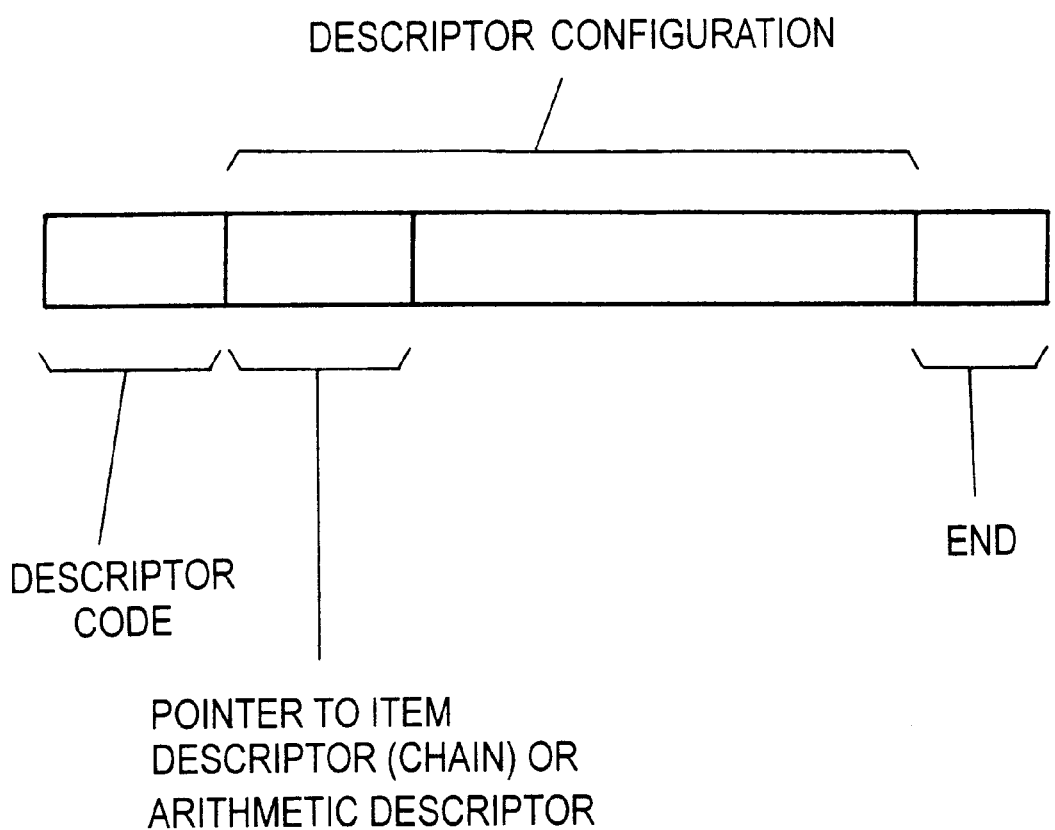
FIG. 35 shows a data format of a document management descriptor in accordance with the embodiment.

From a source document of tabular form (FIG. 13), the following descriptors are created, item descriptor (FIG. 27), item descriptor chain (FIG. 28), cell descriptor (FIG. 29), cell descriptor chain in field (FIG. 30), cell descriptor chain in record (FIG. 31), arithmetic descriptor (FIG. 32), and document management descriptor (FIG. 35).

The cell descriptor (FIG. 29) is created as follows. The system searches those document elements that represent a cell (data entry cell), thus identifying a cell. The location of the cell, a pointer to the next cell descriptor in the same field, and a pointer to the next cell descriptor in the same data record are recorded in a cell descriptor. The system checks if the cell contains a character string using the document element file. If this is the case, a pointer to a character string in the cell (document element record) is recorded in the cell descriptor.

The system also finds a cell string delimited or demarcated by a blue colored filed sign "[ ]", thus identifying a field. Then, the system checks if a character string enclosed by a blue colored item sign "< >" is located by the field in the direction of the field or it is connected to the field by a blue colored link sign "–". If such a character string is found, the system identifies it as data item name of the field according to an association rule, thus creating an item descriptor (FIG. 27) and a cell descriptor chain in field (FIG. 30).

The system also finds a cell string normal to the field, identifies a cell string in the same data record, and creates a cell descriptor chain in the record (FIG. 31). The system also creates an item descriptor chain (FIG. 28).

Figure 32:
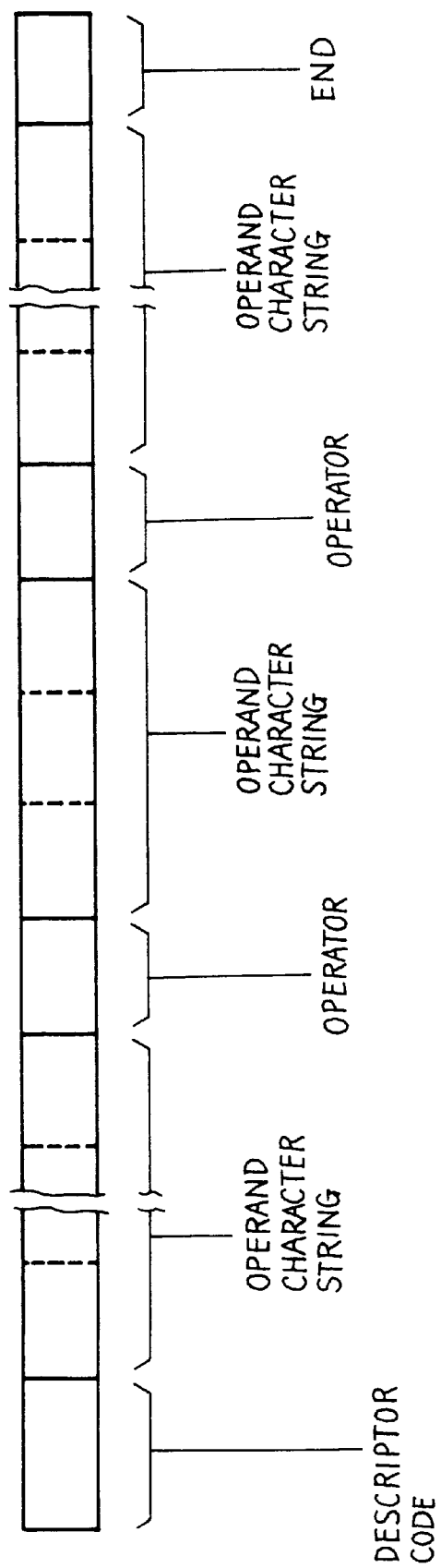
FIG. 32 shows a data format of an arithmetic descriptor record in accordance with the embodiment.

From a blue colored formula "C=A/B", the system matches operator symbols "=" and "/" against entry terms in the application dictionary 52 and identifies the meaning of the formula according to an association rule, thus creating an arithmetic descriptor (FIG. 32).

Figure 34:
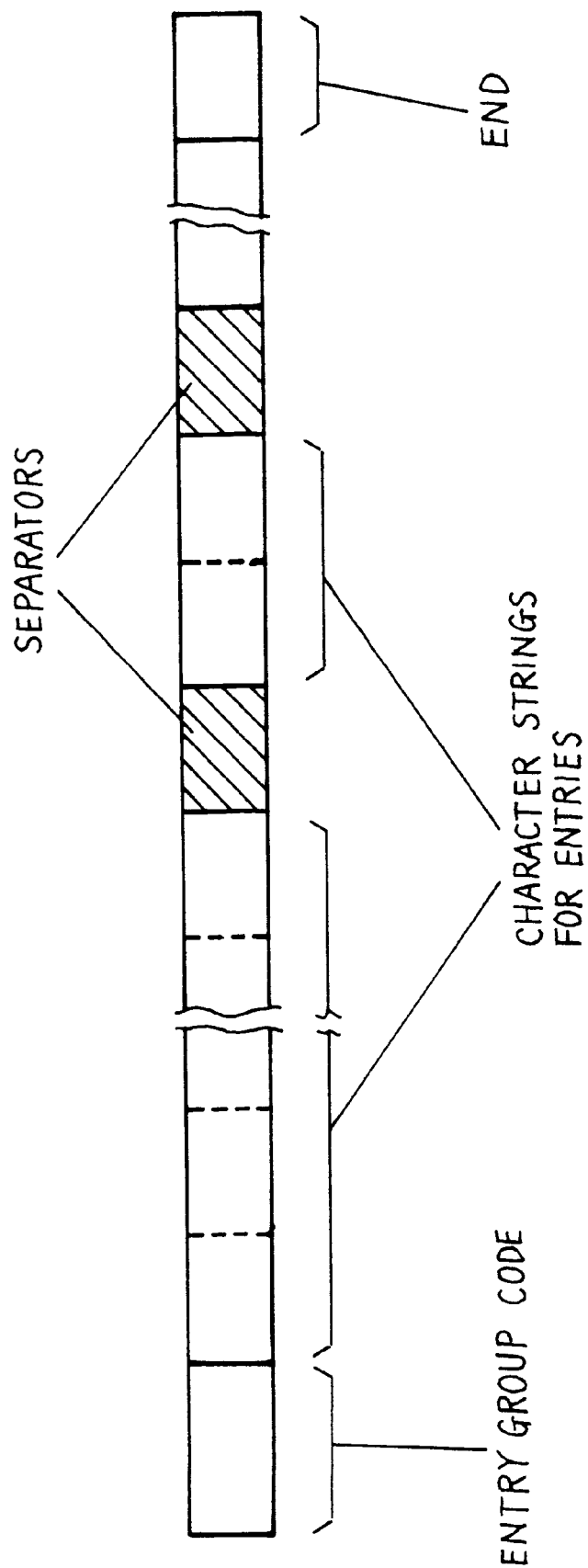
FIG. 34 is a data format of a dictionary entry record in accordance with the embodiment.

FIG. 33 illustrates an application dictionary 52 with entries. The application dictionary storage 52 stores available terms (character, character string, mark or symbol) or nomenclature for each entry group. FIG. 34 illustrates a dictionary entry record in the application dictionary storage 52. The dictionary entry record includes an entry group code such as "UNIT", "ARITHMETIC" and "SUM" etc. The entry group code, as header, is followed by a set of character strings for entries (in the form of character, character string and/or symbol) indicative of entry terms pertaining to the entry group. The separators shown in FIG. 34 correspond to alternative marks (,) in FIG. 33 for separating entry terms.

Having created unchained or chained item descriptors and arithmetic descriptors from a tabular document (FIG. 13), the block 46 creates a tabular document management descriptor (FIG. 35) that manages all such descriptors. Each arithmetic descriptor created from a tabular document, such as the one of a formula (C=A/B) in FIG. 13, is also managed by the tabular document management descriptor, as part of the tabular document, since operand symbols A and B in the formula points to data fields in the item descriptor chain.

A formatted and defined source graph (FIG. 14) is also processed by the system using the arrangement of FIGS. 15 and 25. From a format-defined source graph, the present system (1) recognizes document elements (characters, graphicals), (2) corrects or adjusts document elements (characters, graphicals), (3) recognizes descriptor elements (creates descriptor element records), and (4) recognize descriptors (create or construct descriptors).

Figure 36:
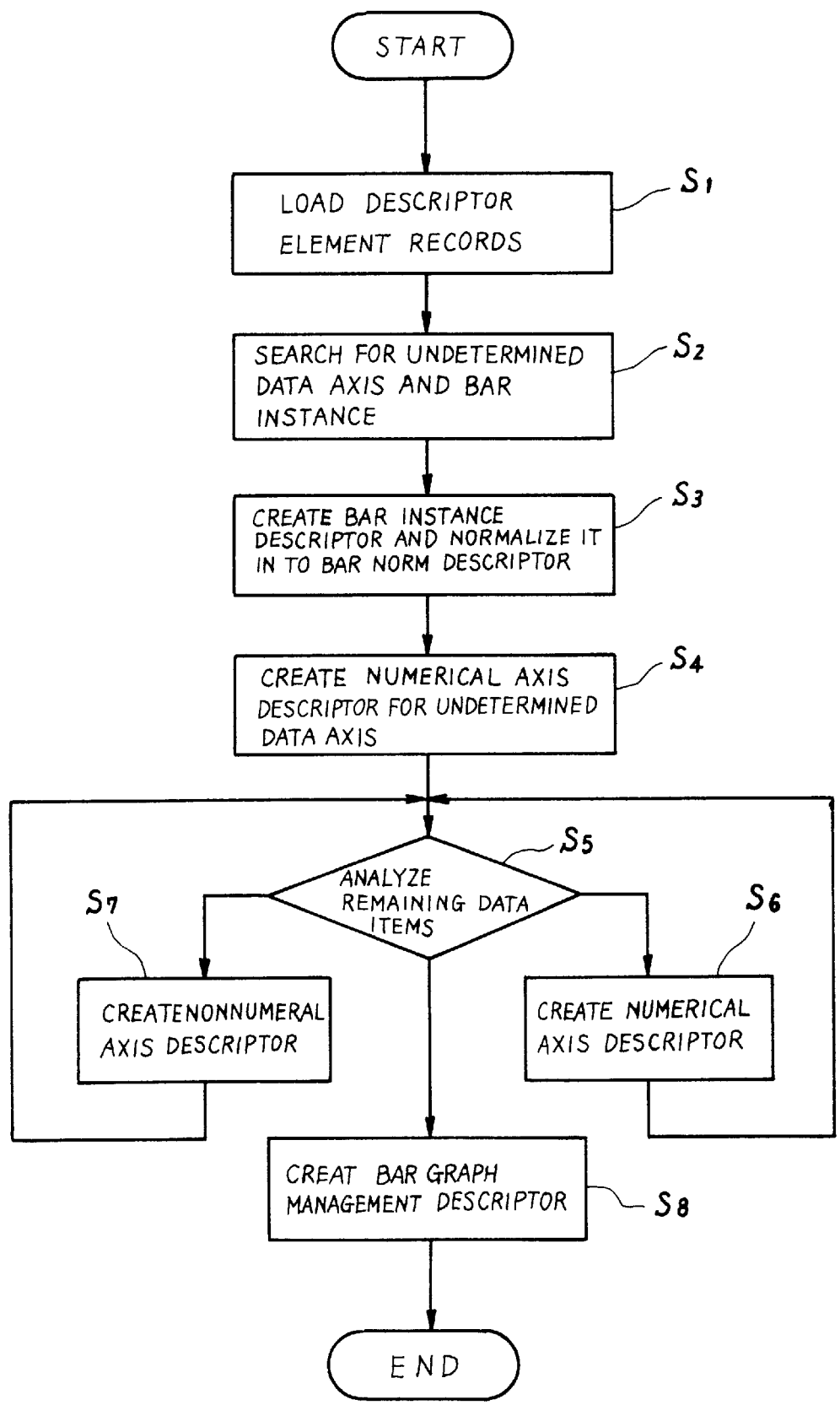
FIG. 36 is a general flowchart of constructing graph element descriptors for bar graph definition in accordance with the embodiment.

FIG. 36 shows a general flowchart of the descriptor recognition or the analysis of a bar graph.

At first, the system loads descriptor element records from the descriptor element file 44 (step S1). The descriptor element records correspond to blue colored written marks in a format-defined source graph (FIG. 14).

Using the loaded descriptor element records, the system searches for and identifies graph axes and bar instance (step S2). A graph axis is identified as follows. Each data name character string ("YEAR", "SALES") delimited and defined as such by a blue colored written sign "< >" in a format-defined source graph (FIG. 14) is tested to see whether it is connected to a straight line by a blue colored link "–". If such a straight line is found, it is considered a graph axis. A data item name character string may be accessed by looking up a descriptor element record of a blue colored item sign "< >" to find the location and by searching through the document element file storage 38 to find a character string located within the item sign "< >". A graph axis may be identified by searching links in the document element file storage 38 and by checking locational relationship among data item name, link, and straight line to find a straight line constituting a graph axis.

Having found the graph axes, the system identifies the type thereof. A graph axis is identified as numerical axis if it is connected by a link "–" to a numeric character string, or numeric character string and unit name (e.g., m) recorded in the application dictionary 52.

Figure 37:
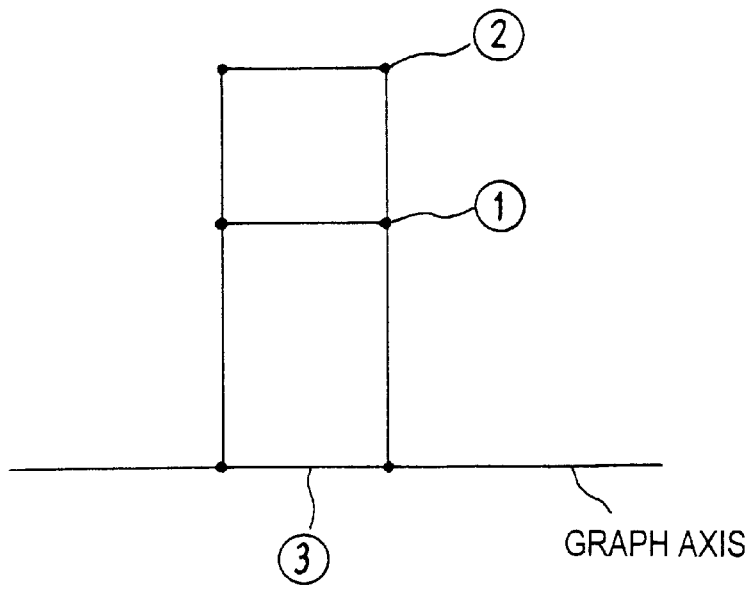
FIG. 37 illustrates conditions for identifying a bar in accordance with the embodiment.

Having identified a numerical axis, the system identifies a bar instance (step S3). To this end, the system finds a group of line segments meeting conditions (1), (2), and (3) shown in FIG. 37 and takes it as a bar instance candidate. The condition (1) is that the ends of a line segment are located on other line segments. The condition (2) is that the ends of a line segment meet an end of other line segments. The condition (3) is that a line segment is located on a graph axis. This analysis involves searching document element file storage 38 for line segments and comparing end points of respective line segments according to a known algorithm.

Then, the system checks a bar graph instance candidate to see whether it is connected to a numerical axis by a blue colored link "–". If this is the case, the system takes the numerical axis as the undetermined data axis and takes the bar graph instance candidate as a bar graph instance. The direction of the undetermined data axis determines the longitudinal direction of bars.

Figure 38:
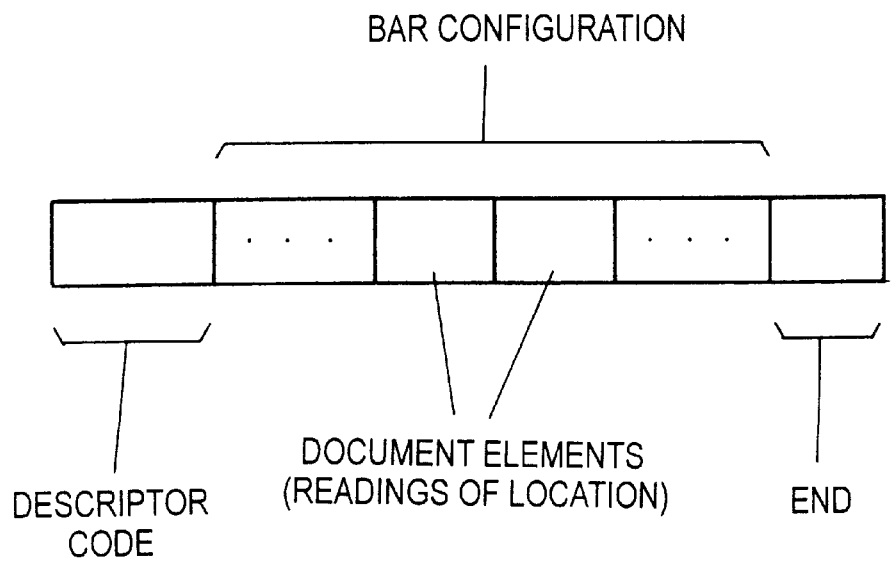
FIG. 38 shows a data format of a bar instance descriptor in accordance with the embodiment.

Then, the system creates a bar instance descriptor (FIG. 38) using the document elements of line segments and a bar interior constituting the bar graph instance. An object bar descriptor of an object graph (to be described) has the same form as that of the bar instance descriptor.

In the bar instance descriptor, the location of respective line segments is read from the bar instance entered in the source graph. Then, the system normalizes the location data to make a bar norm descriptor (FIG. 40) specifying common attributes of bars in a bar graph.

Figure 39:
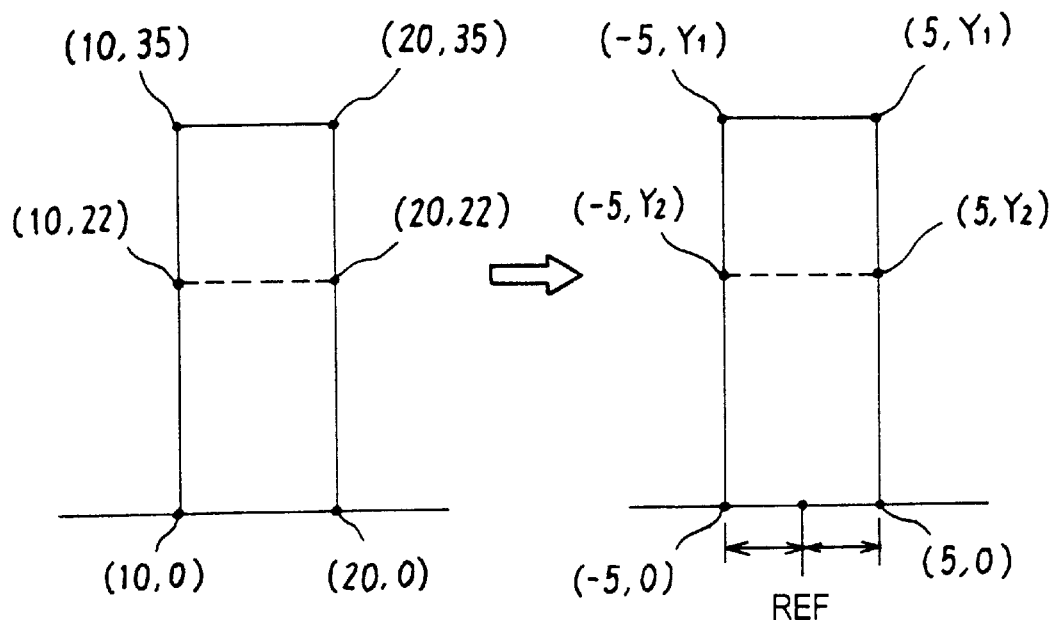
FIG. 39 illustrates how a bar instance is normalized into a bar norm in accordance with the embodiment.

The common attributes of bars include bar dimensions (in particular, width), line segment attributes (solid, broken, etc.), and bar interior attributes (patterned, filled etc.). To make the bar norm descriptor, the system changes location data of the line segments of a bar instance into a variable or a normalized value as shown in FIG. 39. Since the undetermined axis extends in the Y direction in the format-defined source graph of FIG. 14, each Y point data is changed to a variable (Yi). On the other hand, each X point is normalized so as to represent an offset or displacement from the bar center in the X direction since the determined date axis extends in the direction. In this manner, the bar norm descriptor defines common attributes of bars in an object bar graph.

Figure 41:
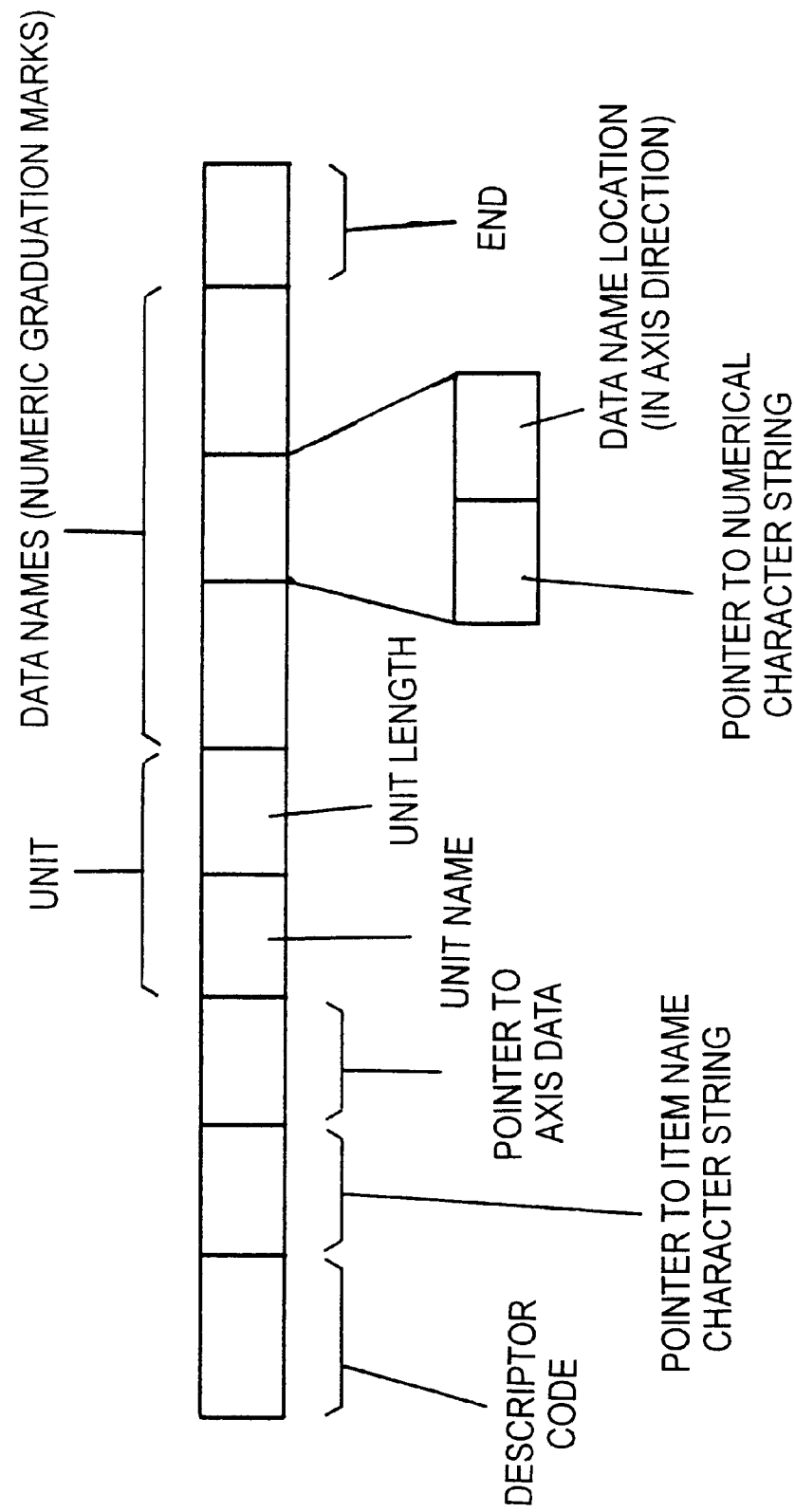
FIG. 41 shows a data format of a numerical axis descriptor in accordance with the embodiment.

Then, the system analyzes the undetermined data axis (step S4). In the analysis, the system creates a numerical axis descriptor (FIG. 41) for the undetermined data axis, using the undetermined data axis and locating document elements having an association with the undetermined data axis, such as data item name character string, unit name character string, graduation markings, numeric graduation marks etc.

In the present example, "M¥" is a unit name, and "100" and "50" are numeric graduation marks or data names. The unit name character string (M¥) is identified by finding a character string "M¥" encircled by a blue colored written sign "○" for descriptor element "designate descriptor element" and matching such a character string against unit name entries in the application dictionary 52. A data name character string (e.g., 100) can be identified by finding a numeric character string which is connected to the graph axis by a link "–". A line segment is identified as a graduation marking if it intersects with the graph axis and is located by a data name character string. The distance between a graduation marking and the origin of a graph is determined from appropriate document element records. Dividing the distance by a number of the data name character string (e.g., 100) corresponding to the graduation marking yields the length of unit (length of 1M¥) in the direction of the graph axis. The unit length thus determined is recorded in the numerical axis descriptor.

Then, the system analyzed the remaining data items (i.e., those character strings defined as data items in a format-defined source graph (FIG. 14), other than the data item of the undetermined data axis) (step S5), and branches according to analyzes results to create an appropriate axis descriptor.

If a data item name character string is connected to a straight line by a blue colored link "–", the straight line is identified as a graph axis. If the graph axis is a numerical axis descriptor according to the criteria stated above, the system creates a numerical axis descriptor of that graph axis (step S6) in the manner as described. In the present example, however, the format-defined source graph of FIG. 14 has no numerical axis other than the undetermined data axis. Thus, step S6 is not executed.

Figure 42:
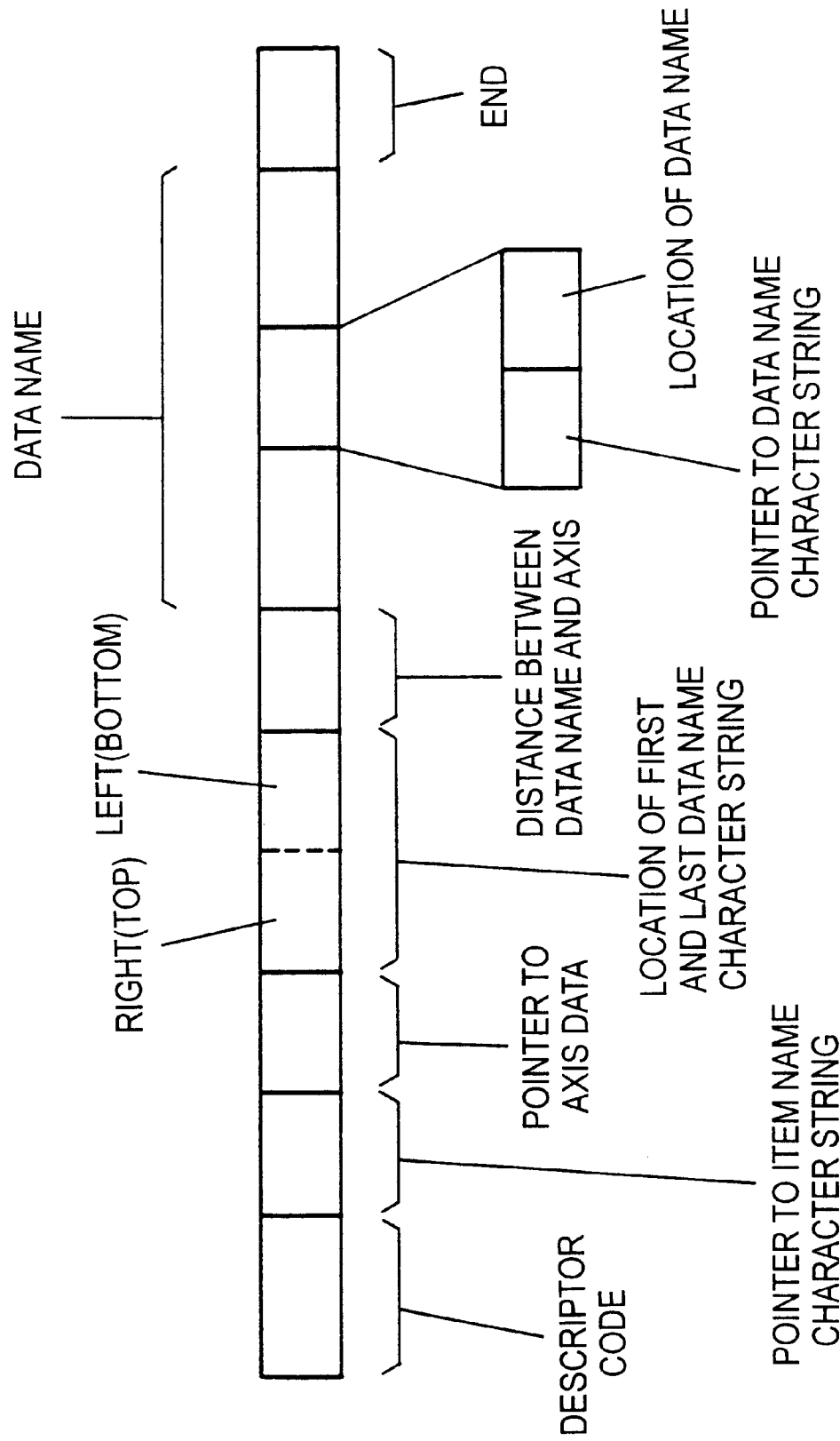
FIG. 42 is a data format of a nonnumeral axis descriptor in accordance with the embodiment.

If the graph axis is not a numerical axis, it is a nonnumeral axis. Then, the system creates a nonnumeral axis descriptor (step S7). In the present example of FIG. 14, the graph axis that is connected to data item name character string <YEAR>by a blue colored link "–" is a nonnumeral axis. The nonnumeral axis descriptor (FIG. 42) is created by identifying and locating appropriate data name character strings and graduation markings in the manner as described with respect to the numeral axis descriptor.

In the nonnumeral axis descriptor, the location of the first and last data name character strings and the location of other data names coincide with or specify the locations of appropriate graduation markings. The locations of graduation markings are adjusted before being recorded into the nonnumeral axis descriptor. To this end, the measured distance between the first and last graduation marks corresponding to the first and last data name character strings (94, 96) is divided by a number of graduation divisions (2) formed therebetween to determine the distance or pitch between adjacent graduation markings. Graduation markings are relocated along the graph axis with the pitch between adjacent graduation markings.

If a graduation marking is pointed to by a red colored written mark "Δ" for descriptor element "FIX", the location of that graduation marking (measured) is used as reference to correct location of other graduation markings. Each data name character string is uniform in character size and pitch. The location of each data name character string is corrected so as to coincide with the adjusted location of an appropriate graduation marking.

Figure 43:
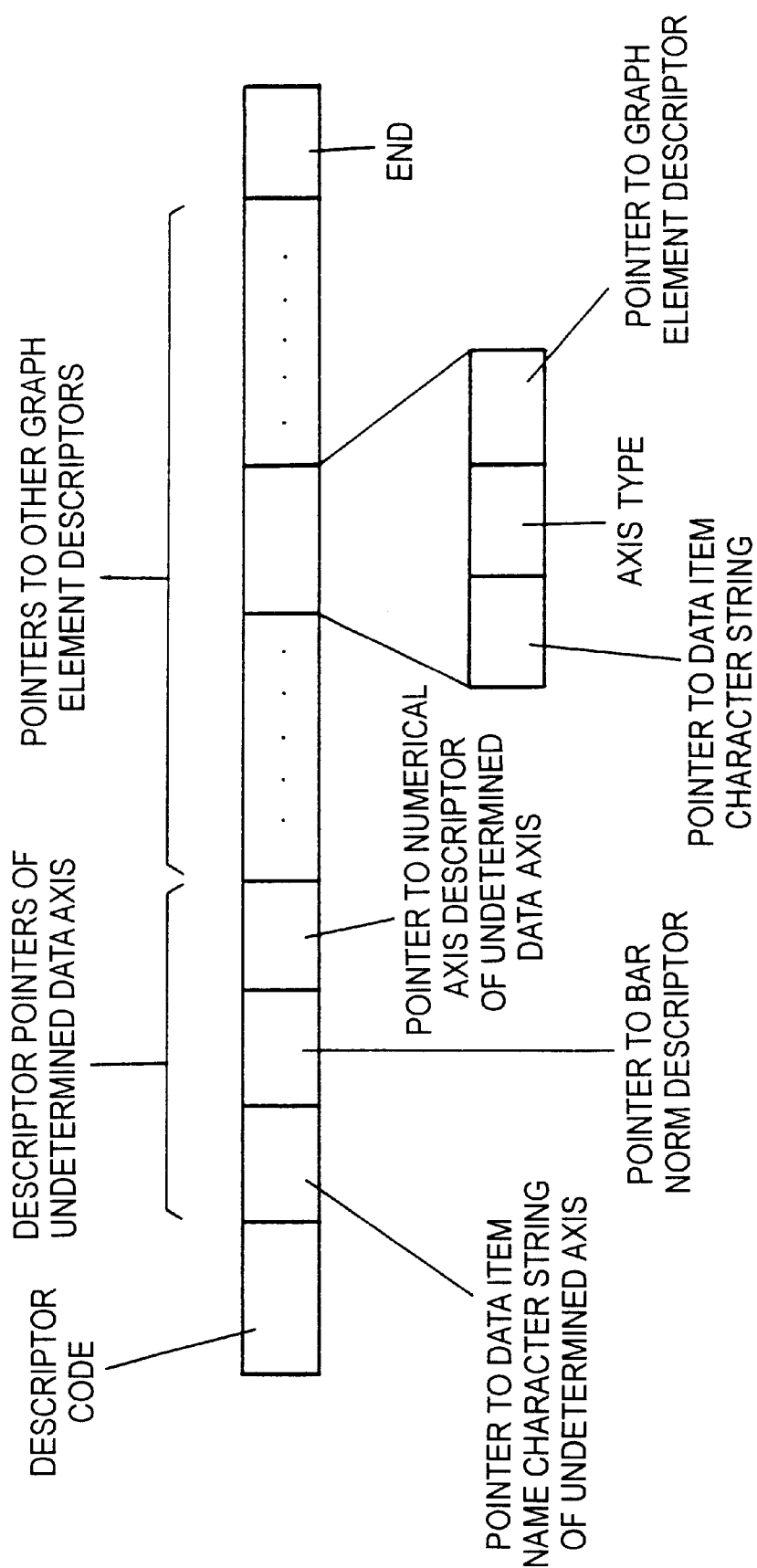
FIG. 43 shows a data format of a graph management descriptor in accordance with the embodiment.

Finally, the system creates a graph management descriptor (FIG. 43) which manages descriptors of graph elements recognized or created from a format-defined source graph, including bar norm descriptor (bar instance descriptor), and descriptors of axes (step S8). In the graph management descriptor, the descriptor pointers of the undetermined data axis are placed before pointers to other graph element descriptors for distinguishing the undetermined data axis descriptors from other graph element descriptors. The other graph element descriptor pointers may freely be arranged, for example, in the order of creating them.

The system makes an object graph by executing the graph definition. To this end, the system has taken a source tabular document (FIG. 13) with written marks for descriptors and a format-defined source graph (FIG. 14) as pertaining to the same sheet group.

Thus, the system has created the tabular document management descriptor and graph management descriptor within the same sheet group. The following conditions are found in these management descriptors: (1) the data item set (year, sales) of the graph management descriptor is included in the data item set (year, article, sales) of the tabular document management descriptor; and (2) for common data items (year, sales), sales data has been recorded on the tabular document but not entered in the other sheet (format-defined source graph).

Figure 44:
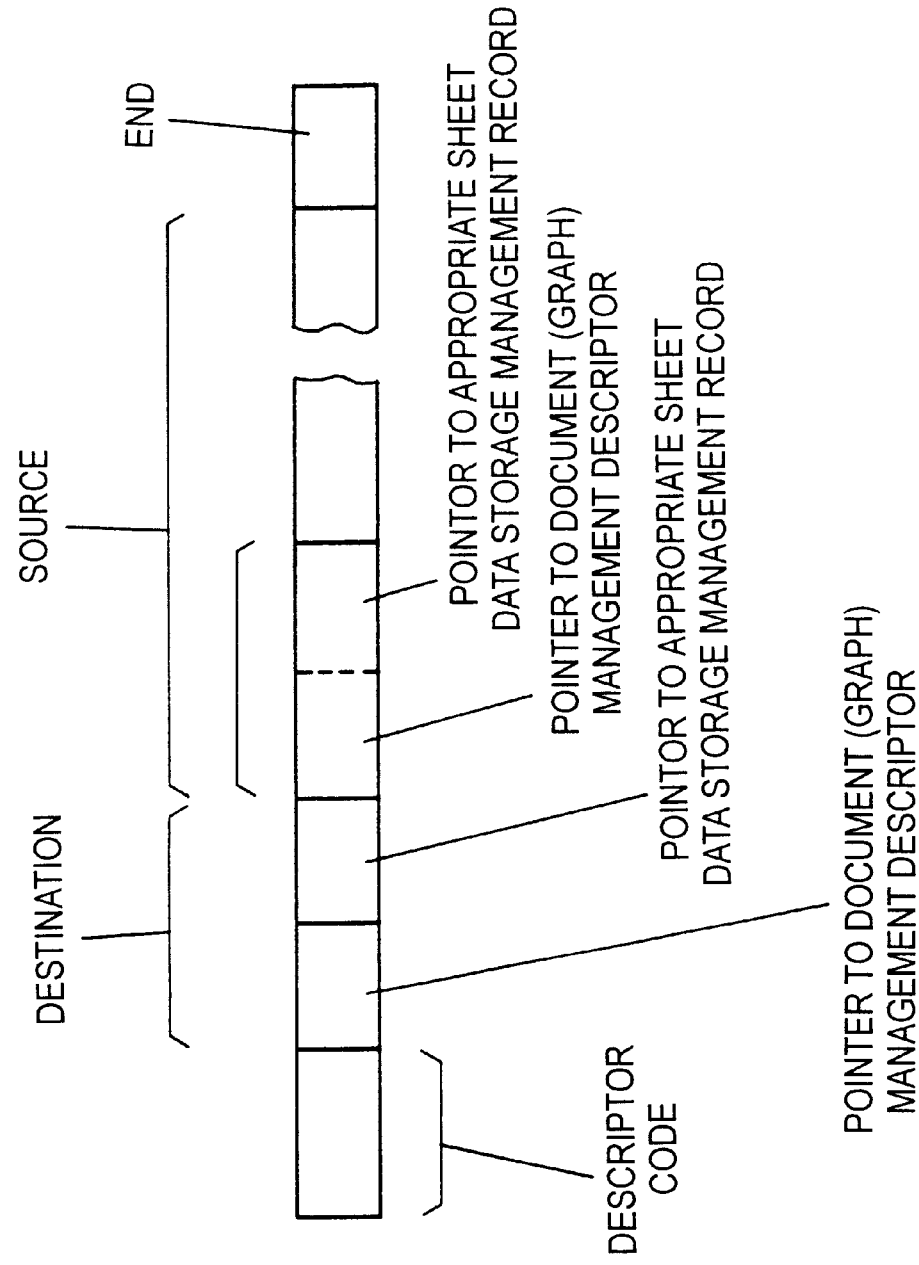
FIG. 44 shows a data format of a data transfer descriptor in accordance with the embodiment.

Since the conditions (1) and (2) are met, the create descriptors block 46 recognizes the need of sales data transfer from the tabular document managed by the tabular document management descriptor to a graph managed by the graph management descriptor according to association rules and creates a higher level descriptor "data transfer descriptor" (FIG. 44) for sheet group definition.

Figure 45:
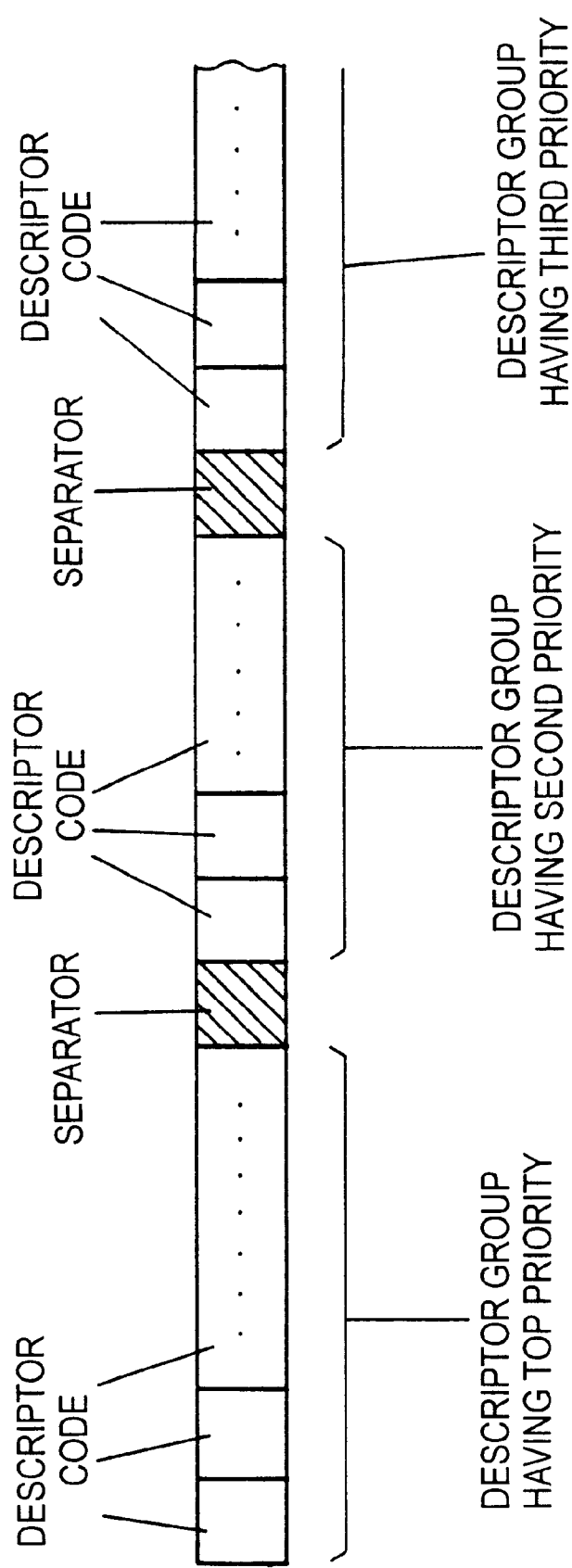
FIG. 45 shows a data format of a descriptor executing order rule base in accordance with the embodiment.

Having created the data transfer descriptor, the system reports to a user the recognized results obtained so far. When an execute button is operated, the execute descriptors block 58 determines the order of executing descriptors of command type according to the executing order rule base 59 (implemented by either program or data). FIG. 45 shows a format of the descriptor executing order rule base.

In the present example, the execute descriptors block 58 first executes the arithmetic descriptor of C=A/B for the tabular document (FIG. 13) as a source of the data transfer and then executes the data transfer descriptor for common items (year, sales) from the tabular document to graph, thus making an object graph.

The arithmetic descriptor is executed as follows. The block 58 identifies those fields which are connected to the operand character or characters ("A", "B") in the formula (C=A/B) by a link "–" or contain the operand character or characters. Then, it identifies the operand field cells in each data record and uses data in the operand field cells to compute the formula (A/B) set forth in the arithmetic descriptor to obtain numeric data of C.

Then, the execute descriptors block 58 converts the computed numeric data of C to corresponding numeric character strings using a numeric data to character code conversion table (not shown), determines character size and arrangement of the numeric character strings according to a predetermined format to thereby create document element (numeric character string) records and stores them into document element file storage 38.

Figure 46:
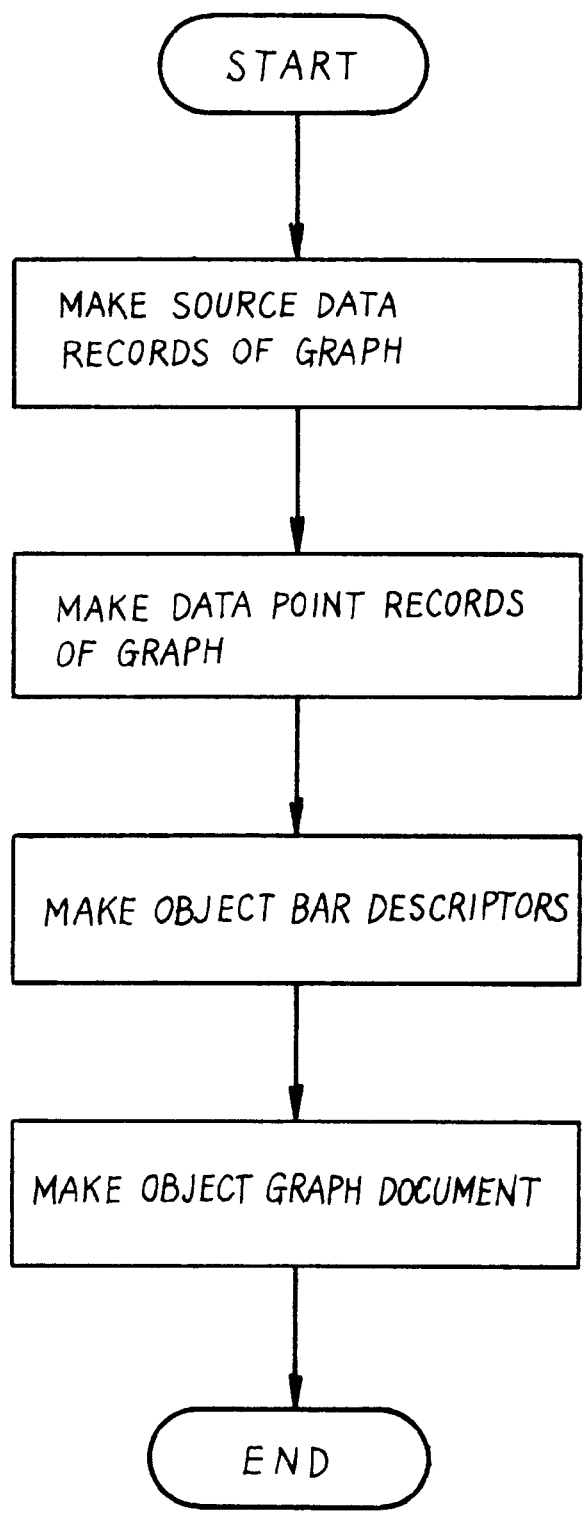
FIG. 46 is a general flowchart of making an object graph in accordance with the embodiment.

The system makes an object graph by executing the data transfer descriptor according to a flow chart of FIG. 46. Specifically, the system (1) makes source data records of the graph, (2) makes data point records of the graph, (3) makes object bar descriptors, and (4) makes the object graph document.

The system makes source data records of an object graph as follows. The system selective tabular document storage source, tabular document storage, those data records having data names entered in the format-defined source graph according to cell descriptors (FIG. 29) and cell descriptor chains in records (FIG. 31). In the present example in which the tabular document of FIG. 13 and the format-defined graph of FIG. 14 are involved, those data records having the year of "94", "95" or "96" are retrieved whereas the data record of the year of "93" is excluded.

Then, the system collects those retrieved records of the same data name (year) and sums or accumulates sales data thereof. For instance, in the year of "94", sales data of radio receiver, sales data of television set, and sales data of car navigation system are accumulated to make a source data record of graph, representative of sales in the year of "94". The operations repeat for respective groups of table data records pertaining to the common year, thus making a set of source data records of the graph.

There are a plurality of records (i.e., three data records of radio receivers, television sets, and car navigation systems) in the tabular document, as source of data transfer, to each graph source data record having data items of sales and year (e.g., 94). Thus, sales data in the tabular document is taken as an item to be summed.

In the alternative, a descriptor element written sign (for instance "●" for explicitly designating an item to be summed may be preset in the system. In this case, a user may enter such a written mark "●" by a character string indicative of the name of a data item to be summed (for instance <SALES>●).

Each source data record of graph has graph data items (year and sales) declared by the graph management descriptor created from the format-defined source graph (FIG. 14). The data item of the year in the source data records is either 94, 95 or 96. As stated, graph management descriptor (FIG. 43) manages or points to the data items of graph and corresponding graph element or axis descriptors.

The data items in the source data records are sorted according to an arrangement of graph element or axis descriptors in the graph management descriptor.

In the graph management descriptor (FIG. 43), the pointer to the undetermined data axis descriptor of "SALES" is placed before the pointer to the nonnumerical axis descriptor of "YEAR". Thus, in the source data records of graph, sales data is placed before year data, as shown in FIG. 47.

Figure 48:
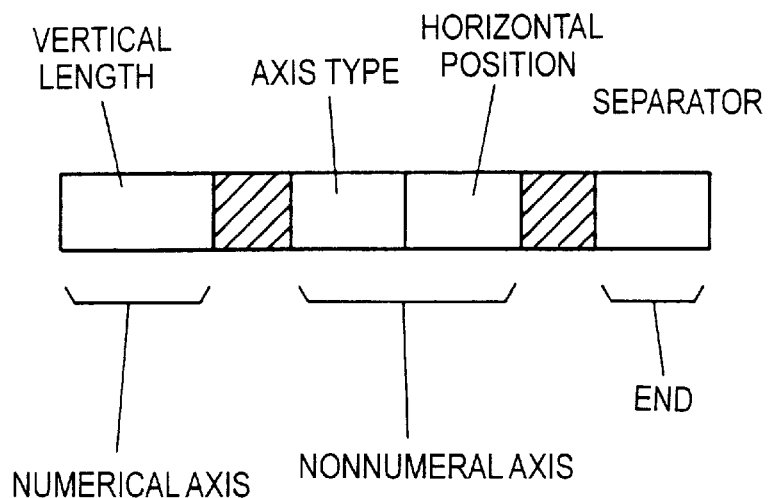
FIG. 48 shows a data format of a data point record in accordance with the embodiment.

Then, the system makes data point records (FIG. 48) of graph from source data records of graph. Each data point record has data items of graph parameters which are specified by converting data items of source data records of graph. The data items of the graph source data records are "sales" and "year" whereas graph or bar parameters of the data point records are vertical point or length and horizontal point. For example, sales data of 15 (M¥) and year date of 95 in a source data record may be converted to the vertical length of 20 (mm) and horizontal point of 70 (mm).

The numerical axis descriptor (FIG. 41) is referenced to convert the sales data in a graph source data record into a vertical length whereas the nonnumeral axis descriptor (FIG. 42) is referenced to convert the year data in a source record into the horizontal point.

Figure 40:
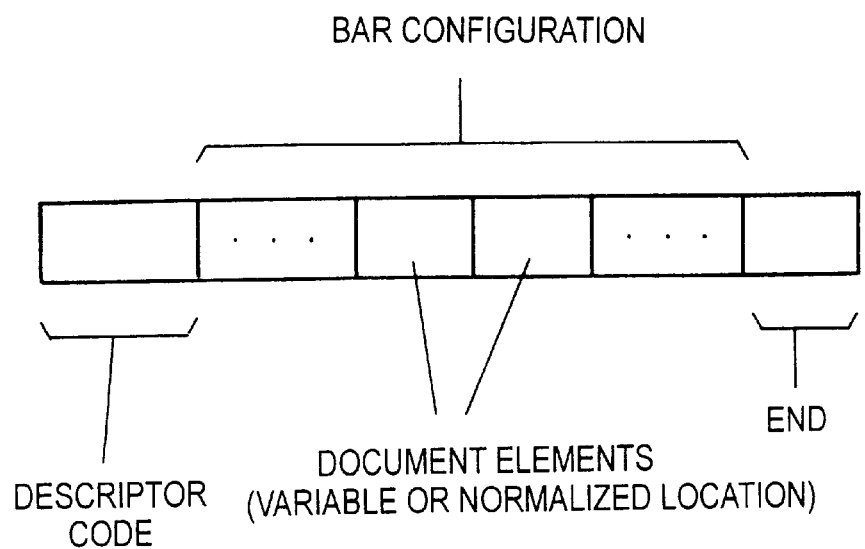
FIG. 40 shows a data format of a bar norm descriptor in accordance with the embodiment.
Figure 49:
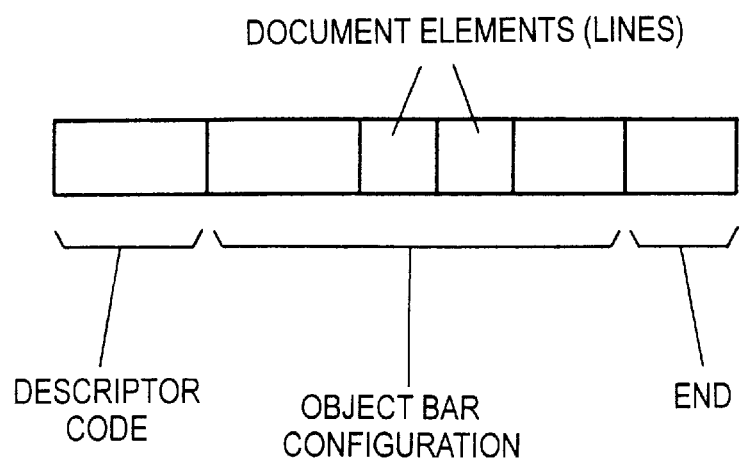
FIG. 49 shows a data format of an object bar descriptor in accordance with the embodiment.

Having created data point records of graph, the system makes object bar descriptors (FIG. 49) therefrom. Each object bar descriptor has the same form as that of the bar norm descriptor (FIG. 40).

As shown in FIG. 50, an object bar descriptor is created from a data point record and a bar norm descriptor. This is done by specifying the line location data of the bar norm descriptor (variable or normalized) using the data point data of the data point records.

Having created object bar descriptors (FIG. 50), the execute descriptors block 58 stores them into the document element file storage 38, as variable graph elements. Specifically, the variable graph elements data are stored into the document element subfile 38(*i*) in an appropriate sheet data storage (SDi). It is preferred that the variable graph element data is stored in a second area different from a first area where document element data (i.e., common graph element data of the format-defined source graph) are stored. Further, the common graph element data are copied into the second area from the first area, so that the data stored in second area includes common and variable graph elements and thus represents an object graph. After the descriptors have been executed, it is convenient to output black colored ordinary writings only, thus excluding blue or red colored writings (written signs for descriptors). To this end those document element records of written signs for descriptors are not transferred to the second area.

Figure 51:
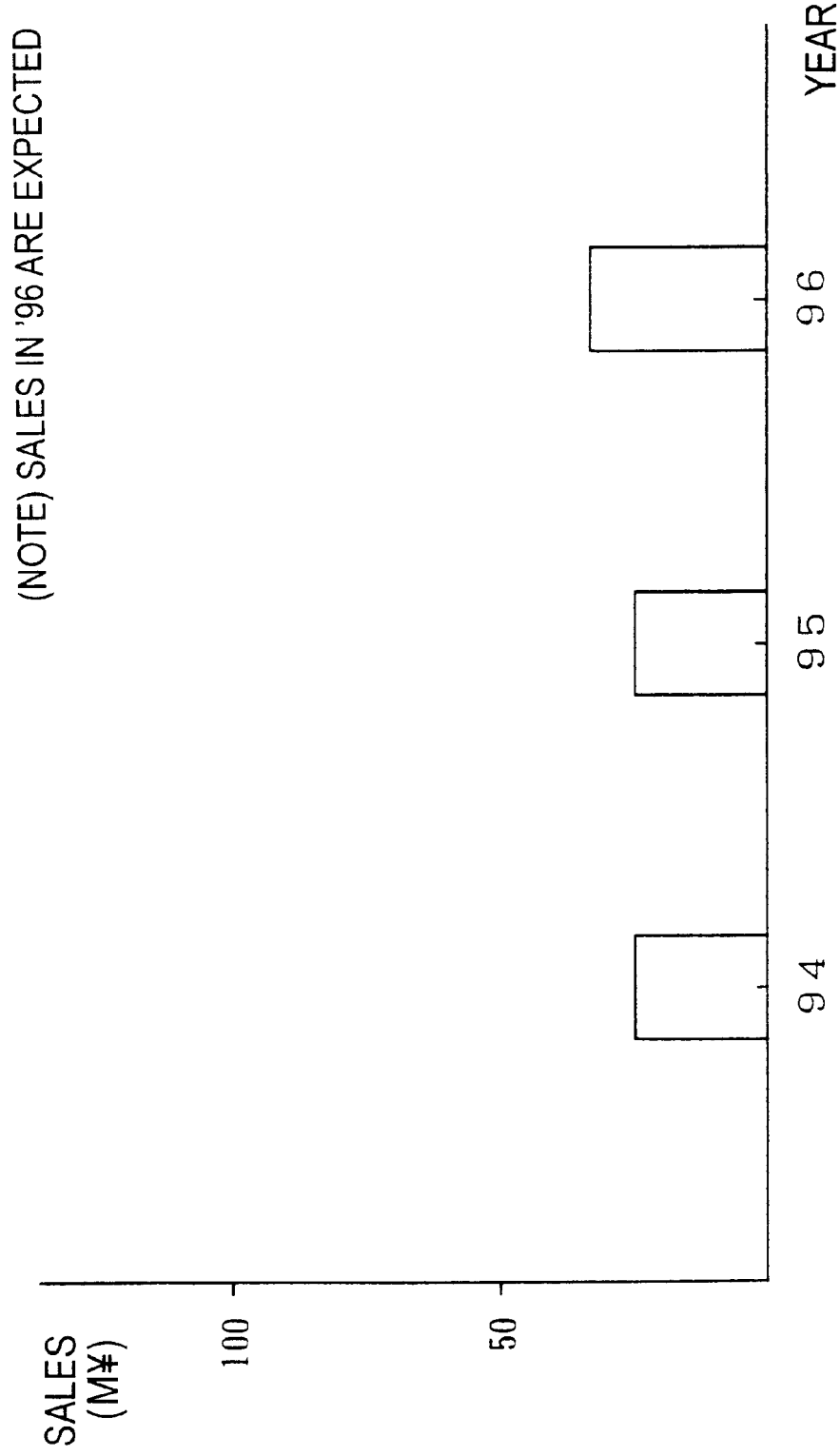
FIG. 51 illustrates an object graph in accordance with the embodiment.

Then, the output document image block 40 retrieves document element records stored in second area, converts them into corresponding image segments via the pattern dictionary 36, and composes them into a bit-mapped image according to an image scanning program, thus outputting an object graph, such as the one shown in FIG. 51.

An object tabular document, made from a source tabular document (FIG. 13) and output after executing descriptors, is illustrated in FIG. 52.

Descriptor-dedicated written signs for data management may also be entered in a source tabular document or graph. It is also possible to make and transfer desired data from a master file or source data file to a field of an object tabular document or use them as data of an object graph.

In the present example, an object graph is a bar graph. The present system can make other graphs, such as a linear graph, using the graph definition technique described above.

Figure 53:
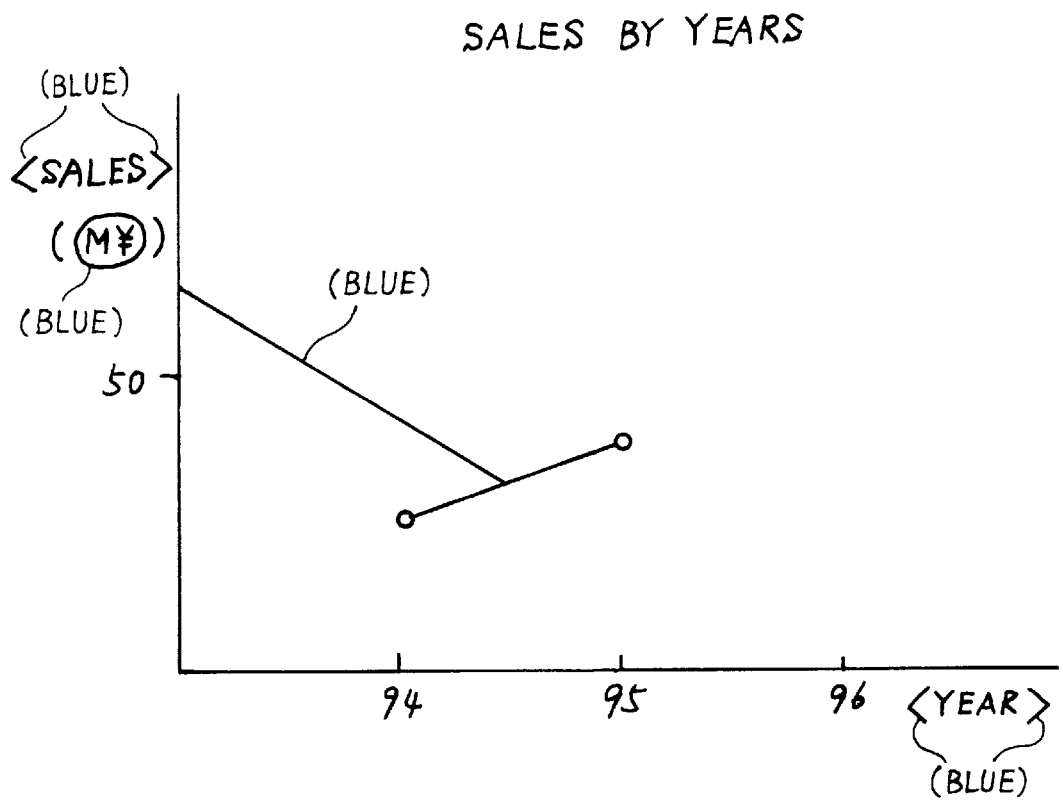
FIG. 53 shows a source linear graph in which written marks for descriptors have been entered for graph definition in accordance with the embodiment.

FIG. 53 shows a linear graph format defined source graph. In the source graph, the blue colored writings constitute written signs for descriptors.

Figure 55:
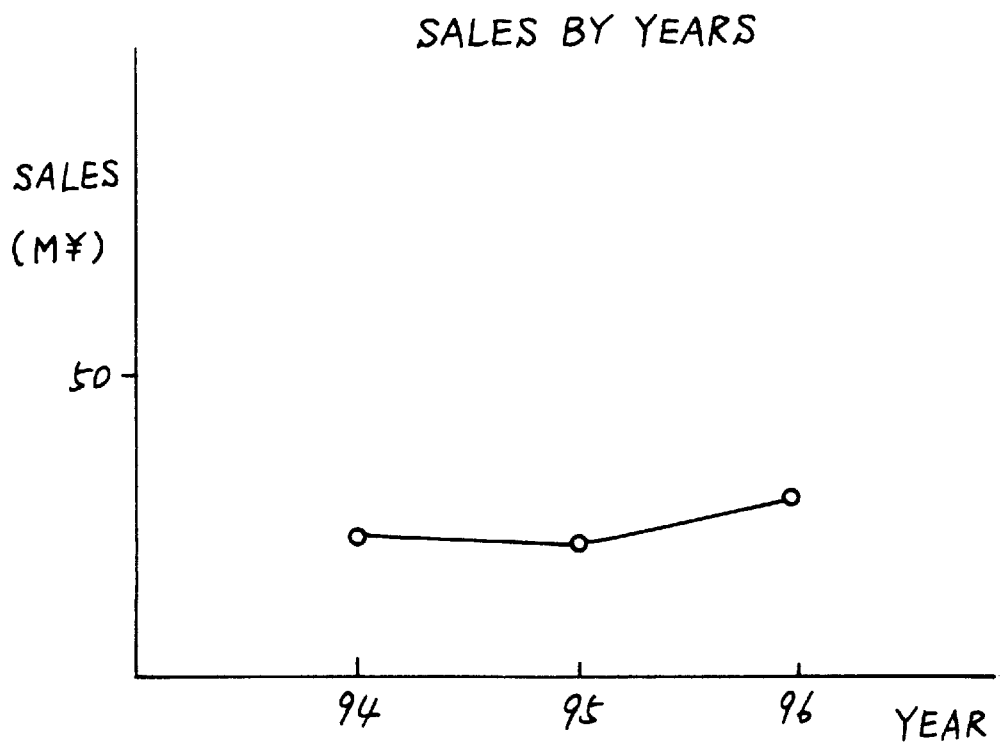
FIG. 55 shows an object linear graph in accordance with the embodiment.
Figure 54:
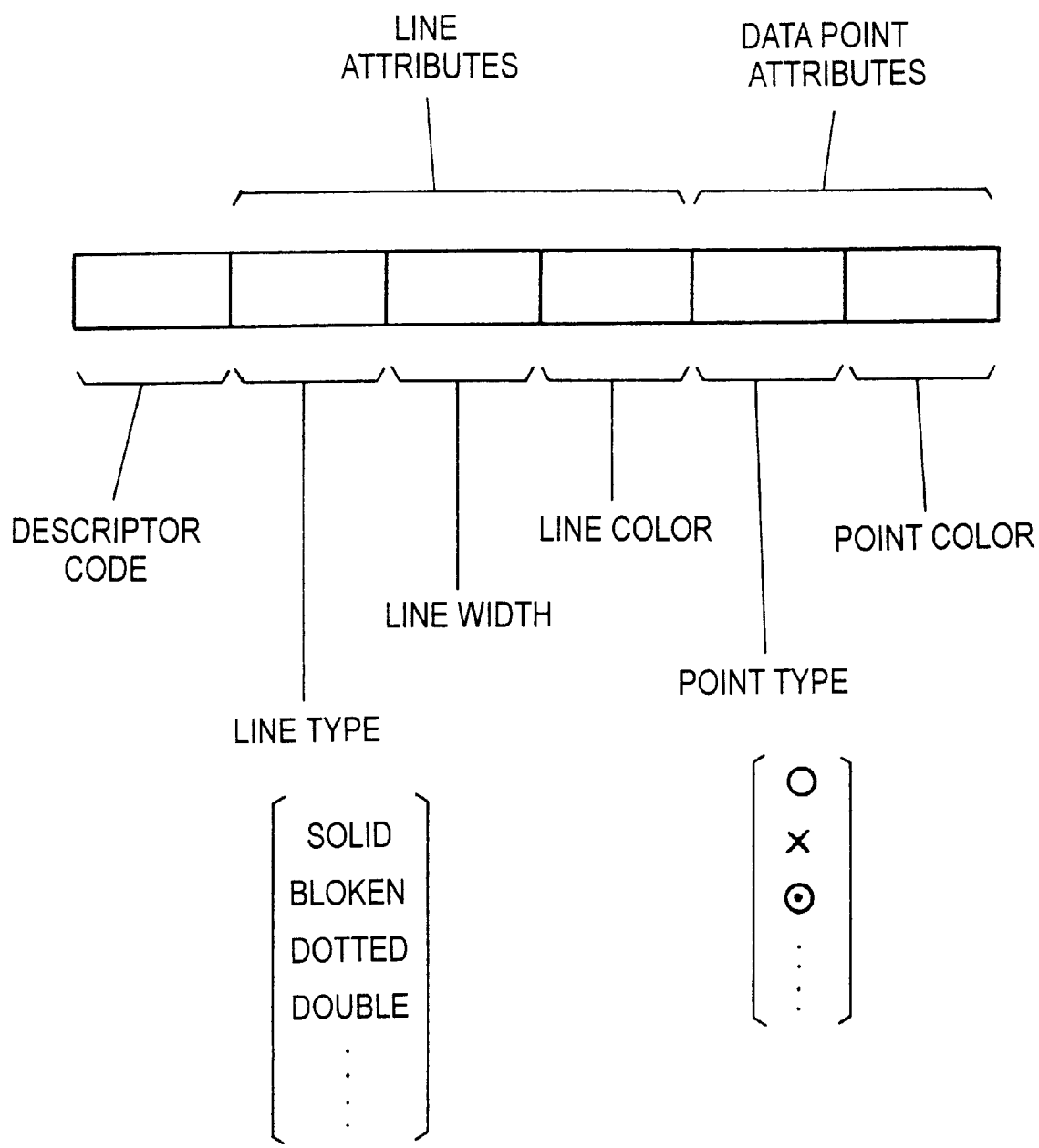
FIG. 54 shows a data format of a linear graph norm descriptor in accordance with the embodiment.

FIG. 54 shows a linear graph norm descriptor recognized by the present system from such a linear graph format defined source graph. Using the linear graph norm descriptor and data point records (FIG. 47), the system makes and outputs an object linear graph, such as the one shown in FIG. 55.

Figure 56:
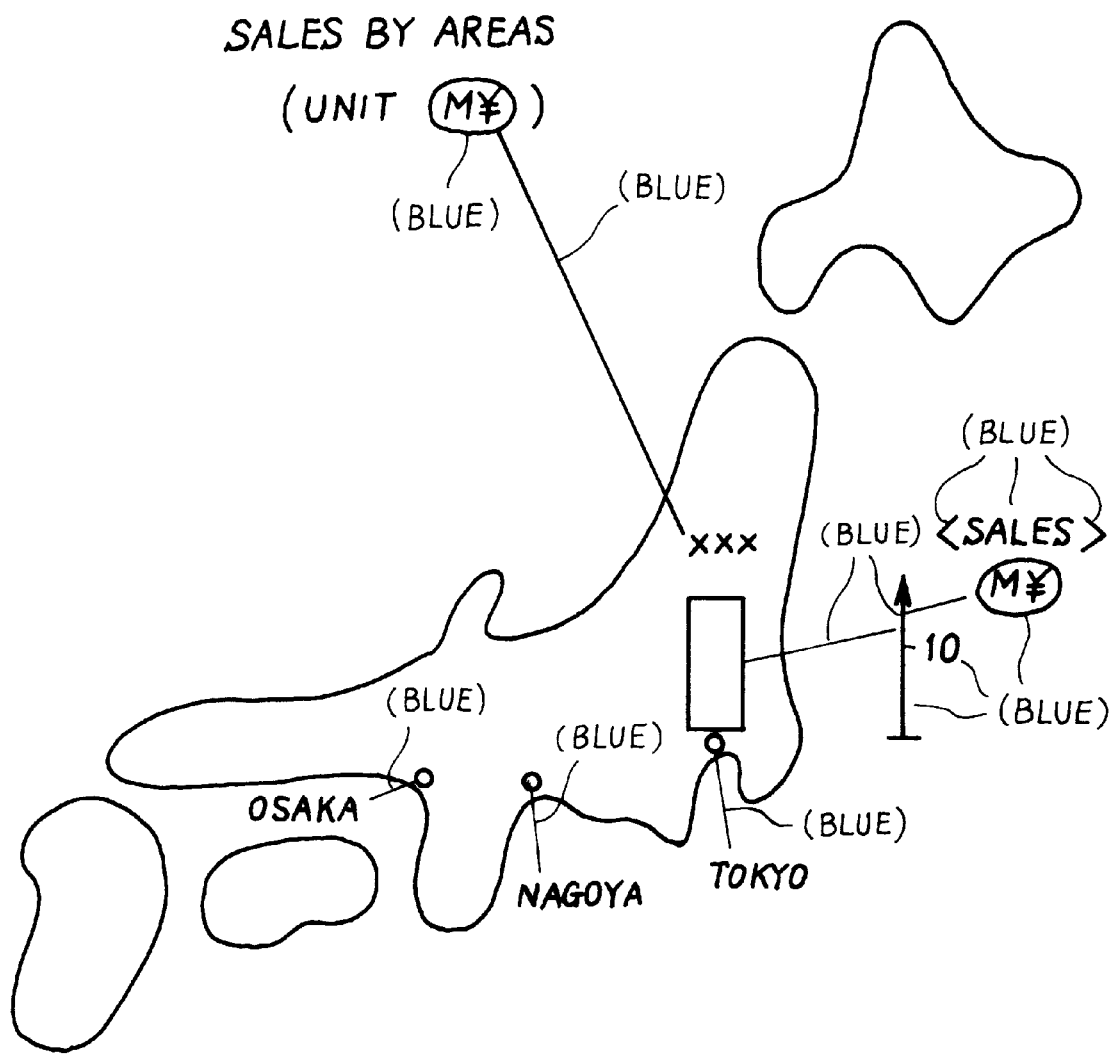
FIG. 56 illustrates a source map on which written marks for descriptors have been entered for arranging bars in two dimensions in accordance with the embodiment.
Figure 58:
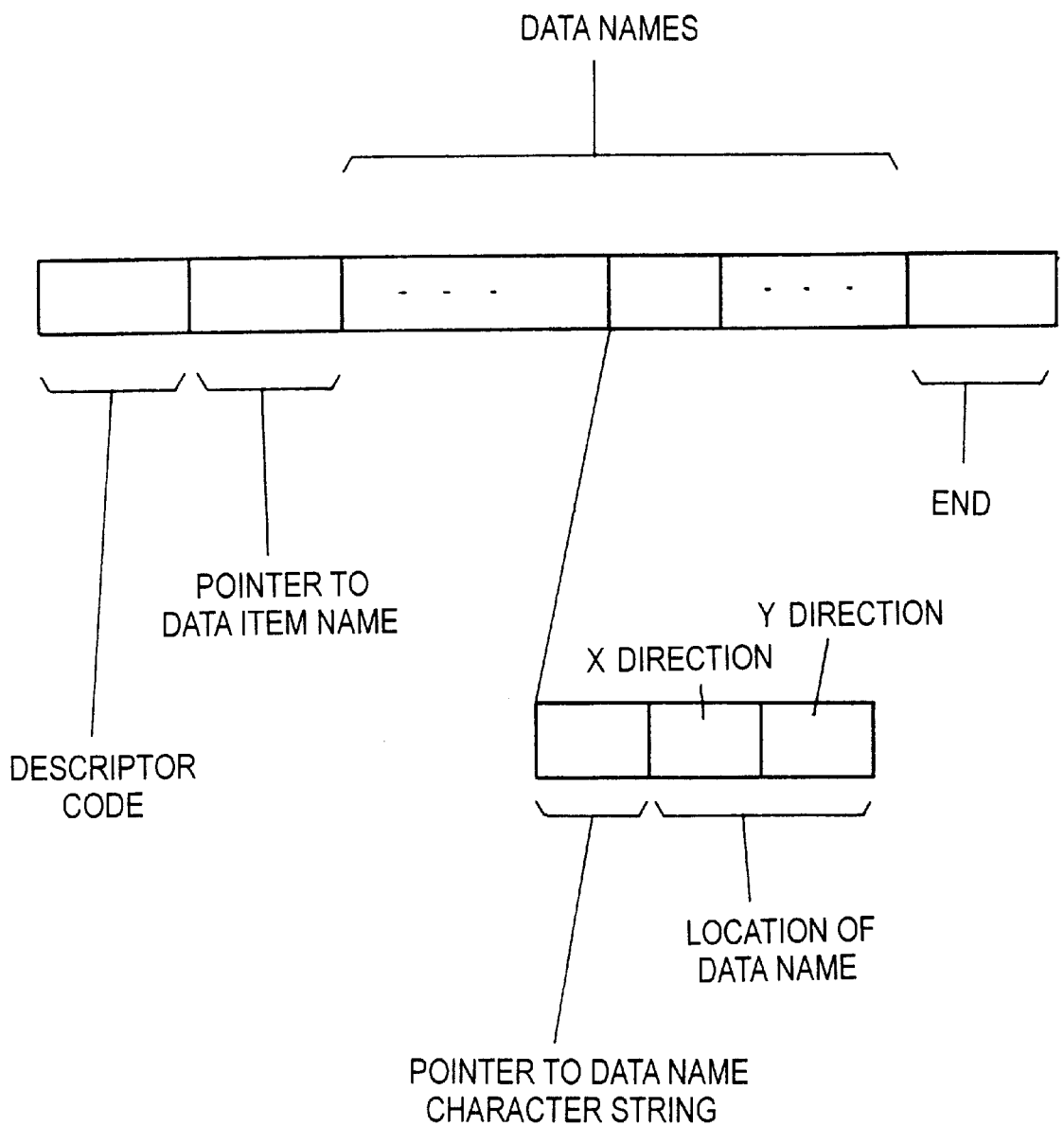
FIG. 58 shows a data format of a bar location descriptor in accordance with the embodiment.

FIG. 56 illustrates another graph format defined source document (map) according to which bars are arranged in two dimensions. In the example of FIG. 56, a blank character string of "xxx" is used to be filled with or specified by data of graph (sales data), and additional written signs for descriptors have been entered. From the graph format defined document, the present system makes a bar norm descriptor, such as the one shown in FIG. 57, and bar location descriptors, such as the one shown in FIG. 58.

Figure 60:
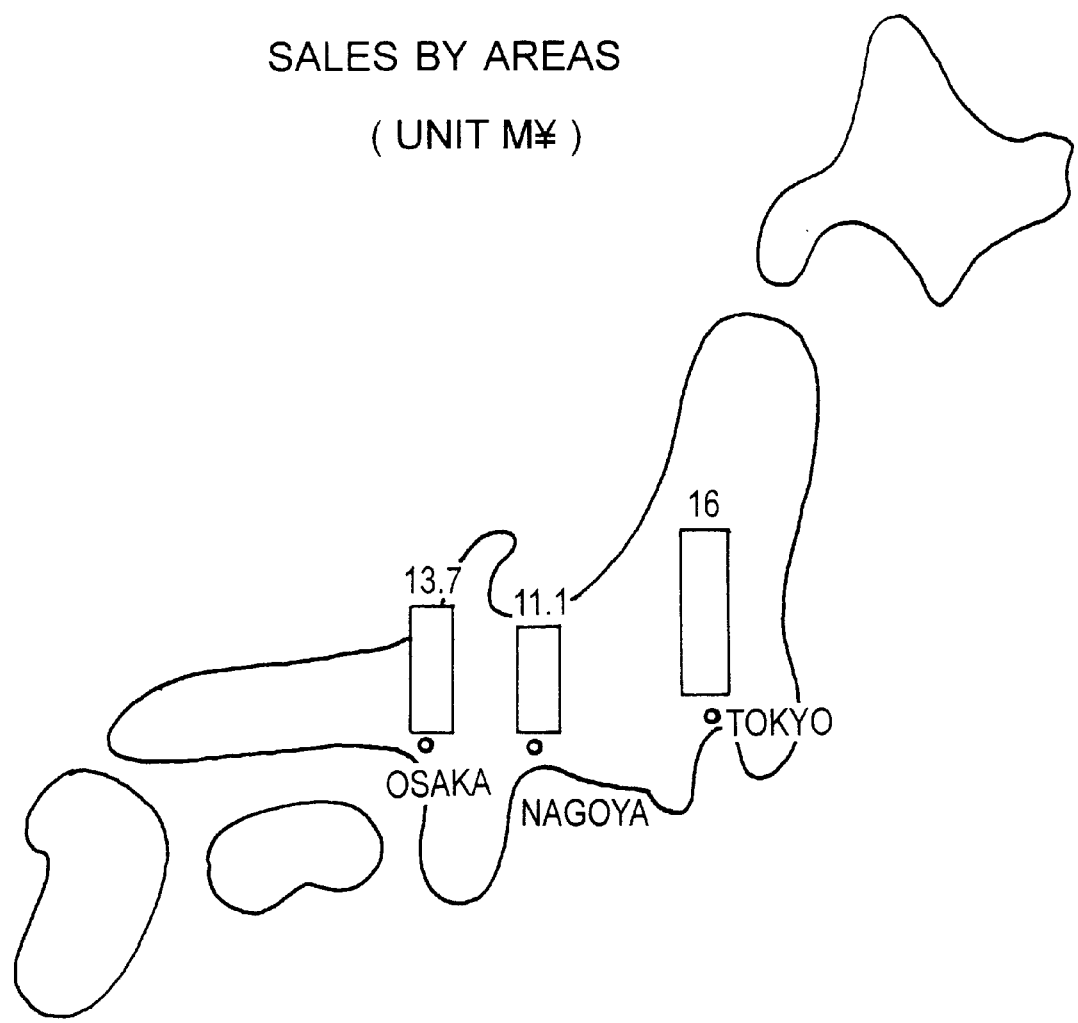
FIG. 60 illustrates an object map with a two-dimensional bar arrangement in accordance with the embodiment.

To this end, step S7 in FIG. 36 (creating a nonnumeral axis descriptor) is modified so as to create a bar location descriptors which specify locations of bars arranged in two dimensions. Using the descriptors thus created and the source data from a source document of tabular form, such as the one shown in FIG. 59, the system makes and outputs an object document or map on which bars are arranged such as the one shown in FIG. 60.

In accordance with the present system, data can also be transferred from one tabular document to another. The system first executes command type descriptors of the data source tabular document according to the executing order rule base, then executes data transfer from the source tabular document to the destination tabular document, and finally executes other command type descriptors of the destination tabular document.

The invention uses programs or software for implementing the features of the invention. The software may be installed in a system of the invention by any medium on which the software is recorded or by an on-line system. Therefore, selling a medium in which the software of the invention is recorded or installing the software into a system on an on-line basis without authority may constitute practice of the invention.

I claim:

1. A method for use in an information processing apparatus for defining a graph, said method comprising:

entering written signs in the form of characters, symbols, and/or graphicals in a document, the entered written signs having an attribute distinct from those of ordinary writings representative of contents of the document, and the entered written signs specifying a format of a graph represented by the ordinary writings;

recognizing unitary descriptors having a unitary meaning on the basis of the entered written signs;

recognizing composite descriptors on the basis of a plurality of the unitary descriptors corresponding to a plurality of the entered written signs having association with one another according to predetermined association rules; and producing graph definition data defining contents of the unitary descriptors and/or the composite descriptors.

2. A method as claimed in claim 1, wherein said recognizing unitary descriptors further comprises recognizing, as one of the unitary descriptors, a variable graph element instance descriptor to specify a form of variable graph element of an object graph defined in the document with respect to a predetermined data item.

3. A method as claimed in claim 1, wherein said recognizing composite descriptors further comprises recognizing, as one of the composite descriptors, a graph axis descriptor to specify a set of data item name, graph axis, and data names associated with one another according to the association rules.

4. A method as claimed in claim 1, wherein the association rules include conditions for determining whether a plurality of individual written items, including at least one of the entered written signs, are disposed with respect to one another in a predetermined layout.

5. A method as claimed in claim 1, wherein said recognizing composite descriptors further comprises recognizing more composite descriptors on the basis of a plurality of the composite descriptors and/or the unitary descriptors having association with one another according to the association rules.

6. A method for use in an information processing apparatus for defining a graph, said method:

entering written signs in the form of characters, symbols, and/or graphicals in a document, the entered written signs specifying a format of a graph represented by ordinary writings representative of contents of the document;

recognizing unitary descriptors having a unitary meaning on the basis of the entered written signs;

recognizing composite descriptors on the basis of a plurality of the unitary descriptors corresponding to a plurality of the entered written signs having association with one another according to predetermined association rules, the association rules including conditions for determining whether a plurality of individual written signs have association with one another by a predetermined descriptor-dedicated sign; and producing graph definition data defining contents of the unitary descriptors and/or the composite descriptors.

7. A method as claimed in claim 6, wherein the descriptor-dedicated sign has an attribute distinct from those of the ordinary writings.

8. A method for use in an information processing apparatus for defining a graph, said method comprising:

entering written signs in the form of characters, symbols, and/or graphicals in a document, the entered written signs having an attribute distinct from those of ordinary writings representative of contents of the document, and the entered written signs specifying a format of a graph represented by the ordinary writings;

recognizing unitary descriptors having a unitary meaning on the basis of the entered written signs;

recognizing composite descriptors on the basis of a plurality of the unitary descriptors corresponding to a plurality of the entered written signs having association with one another according to predetermined association rules;

producing graph definition data defining contents of the unitary descriptors and/or the composite descriptors; and executing predetermined processes specified by the graph definition data in a predetermined order to make an object graph defined in the document.

9. A method as claimed in claim 8, wherein said executing predetermined processes further comprises executing a transfer of desired data from a selected tabular document to a graph with respect to common data items.

10. A method as claimed in 8, wherein said executing predetermined processes further comprises executing a transfer of desired data from a source data file to a graph with respect to common data items.

11. An apparatus for making a graph, said apparatus comprising:

entering means for entering written signs in the form of characters, symbols, and/or graphicals in a sheet-carried or electronic documents;

first recognizing means for recognizing unitary descriptors having a unitary meaning from the entered written signs;

second recognizing means for recognizing, from the recognized unitary descriptors, composite descriptors based on a plurality of the unitary descriptors corresponding to a plurality of the entered written signs having association with one another according to predetermined association rules;

producing means for producing graph definition data defining contents of the unitary descriptors and/or the composite descriptors; and executing means for selecting, from the produced graph definition data, those graph definition data which command a predetermined process, and for executing contents defined by the graph definition data in a predetermined order.

12. An apparatus for making a graph, said apparatus comprising:

entering means for entering written signs in the form of characters, symbols, and/or graphicals in a sheet-carried or electronic documents, the entered written signs having an attribute distinct from those of ordinary writings representative of contents of the document, and the entered written signs specifying a format of a graph represented by the ordinary writings;

first recognizing means for recognizing unitary descriptors having a unitary meaning from the entered written signs;

second recognizing means for recognizing, from the recognized unitary descriptors, composite descriptors based on a plurality of the unitary descriptors corresponding to a plurality of the entered written signs having association with one another according to predetermined association rules;

producing means for producing graph definition data defining contents of the unitary descriptors and/or the composite descriptors; and executing means for selecting, from the produced graph definition data, those graph definition data which command a predetermined process, and for executing contents defined by the graph definition data in a predetermined order.

13. A computer program embodied on a computer readable medium for use with a computer for defining a graph, said computer program comprising:

computer readable program code means for causing the computer to accept entered written signs in the form of characters, symbols, and/or graphicals in a document, the entered written signs having an attribute distinct from those of ordinary writings representative of contents of the document, and the entered written signs specifying a format of a graph represented by the ordinary writings;

computer readable program code means for causing the computer to recognize unitary descriptors having a unitary meaning on the basis of the entered written signs;

computer readable program code means for causing the computer to recognize composite descriptors on the basis of a plurality of the unitary descriptors corresponding to a plurality of the entered written signs having association with one another according to predetermined association rules; and computer readable program code means for causing the computer to produce graph definition data defining contents of the unitary descriptors and/or the composite descriptors.

14. A computer program embodied on a computer readable medium for use with a computer for defining a graph, said computer program comprising:

computer readable program code means for causing the computer to accept entered written signs in the form of characters, symbols, and/or graphicals in a document, the entered written signs having an attribute distinct from those of ordinary writings representative of contents of the document, and the entered written signs specifying a format of a graph represented by the ordinary writings;

computer readable program code means for causing the computer to recognize unitary descriptors having a unitary meaning on the basis of the entered written signs;

computer readable program code means for causing the computer to recognize composite descriptors on the basis of a plurality of the unitary descriptors corresponding to a plurality of the entered written signs having association with one another according to predetermined association rules;

computer readable program code means for causing the computer to produce graph definition data defining contents of the unitary descriptors and/or the composite descriptors; and computer readable program code means for causing the computer to execute predetermined processes specified by the graph definition data in a predetermined order to make an object graph defined in the document.

* * * * *